(12) United States Patent
Musselman

(10) Patent No.: US 10,636,640 B2
(45) Date of Patent: Apr. 28, 2020

(54) APPARATUS AND METHOD FOR CHEMICAL PHASE SAMPLING ANALYSIS

(71) Applicant: IonSense Inc., Saugus, MA (US)

(72) Inventor: Brian D Musselman, Melrose, MA (US)

(73) Assignee: IONSENSE, INC., Saugus, MA (US)

( * ) Notice: Subject to any disclaimer, the term of this patent is extended or adjusted under 35 U.S.C. 154(b) by 0 days.

(21) Appl. No.: 16/029,353

(22) Filed: Jul. 6, 2018

(65) Prior Publication Data

US 2019/0013190 A1 Jan. 10, 2019

Related U.S. Application Data

(60) Provisional application No. 62/593,764, filed on Dec. 1, 2017, provisional application No. 62/529,469, filed on Jul. 6, 2017.

(51) Int. Cl.
| | | |
|---|---|---|
| *H01J 49/10* | (2006.01) | |
| *H01J 49/04* | (2006.01) | |
| *B01J 20/281* | (2006.01) | |
| *G01N 30/72* | (2006.01) | |
| *G01N 30/12* | (2006.01) | |

(52) U.S. Cl.
CPC .......... *H01J 49/0409* (2013.01); *G01N 30/48* (2013.01); *H01J 49/10* (2013.01); *G01N 30/12* (2013.01); *G01N 30/72* (2013.01)

(58) Field of Classification Search
USPC .......................................................... 250/282
See application file for complete search history.

(56) References Cited

U.S. PATENT DOCUMENTS

| | | |
|---|---|---|
| 3,633,027 A | 1/1972 | Rhyage |
| 3,957,470 A | 5/1976 | Dawes |
| 4,016,421 A | 4/1977 | Hull |
| 4,144,451 A | 3/1979 | Kambara |
| 4,213,326 A | 7/1980 | Brodasky |

(Continued)

FOREIGN PATENT DOCUMENTS

| | | |
|---|---|---|
| DE | 102007015542 | 10/2007 |
| EP | 1434050 | 6/2004 |

(Continued)

OTHER PUBLICATIONS

The AccuTOF-DART Mass Spectrometer, Jan. 1, 2006, pp. 1-6; www.jeolusa.com/SERVICESUPPORT/ApplicationsResources/AnalyticalInstruments/Documents/Downloads/tabid/337/DMXModule/693/CommandCore_Download/Default.aspx?EntryId=171.

(Continued)

*Primary Examiner* — Phillip A Johnston
(74) *Attorney, Agent, or Firm* — Sci-Law Strategies, PC

(57) ABSTRACT

In various embodiments of the invention, a sorbent coated mesh or grid introduced into contact with a sample can be monitored at appropriate temperatures, positions and time intervals to determine species present in the sample. The monitoring utilizes reactive species produced from an atmospheric analyzer to ionize analyte molecules present on the sorbent coated mesh or grid which are then analyzed by an appropriate spectroscopy system. In an embodiment of the invention, a sorbent surface can be used to absorb, adsorb or condense analyte molecules from the sample whereafter the sorbent surface can be interrogated with the reactive species to generate analyte species characteristic of the sample.

20 Claims, 26 Drawing Sheets

(56) References Cited

U.S. PATENT DOCUMENTS

| | | |
|---|---|---|
| 4,542,293 A | 9/1985 | Fenn |
| 4,546,253 A | 10/1985 | Tsuchiya |
| 4,654,052 A | 3/1987 | Sharp |
| 4,662,914 A | 5/1987 | Hansen |
| 4,861,988 A | 8/1989 | Henion |
| 5,012,052 A | 4/1991 | Hayes |
| 5,055,677 A | 10/1991 | Amirav |
| 5,137,553 A | 8/1992 | Dawes |
| 5,192,865 A | 3/1993 | Zhu |
| 5,306,412 A | 4/1994 | Whitehouse |
| 5,352,892 A | 10/1994 | Mordehai |
| 5,367,163 A | 11/1994 | Otsuka |
| 5,381,008 A | 1/1995 | Tanner |
| 5,412,208 A | 5/1995 | Covey |
| 5,448,062 A | 9/1995 | Cooks |
| 5,552,599 A | 9/1996 | Giessmann |
| 5,559,326 A | 9/1996 | Goodley |
| 5,614,711 A | 3/1997 | Li |
| 5,624,537 A | 4/1997 | Turner |
| 5,684,300 A | 11/1997 | Taylor |
| 5,716,825 A | 2/1998 | Hancock |
| 5,736,741 A | 4/1998 | Bertsch |
| 5,788,166 A | 8/1998 | Valaskovic |
| 5,859,433 A | 1/1999 | Franzen |
| 5,868,322 A | 2/1999 | Loucks, Jr. |
| 5,877,495 A | 3/1999 | Takada |
| 5,889,404 A | 3/1999 | Abdel-Rahman |
| 5,959,297 A | 9/1999 | Weinberg |
| 5,997,746 A | 12/1999 | Valaskovic |
| 6,085,601 A | 7/2000 | Linker |
| 6,107,628 A | 8/2000 | Smith |
| 6,124,675 A | 9/2000 | Betrand |
| 6,190,559 B1 | 2/2001 | Valaskovic |
| 6,225,623 B1 | 5/2001 | Turner |
| 6,297,499 B1 | 10/2001 | Fenn |
| 6,359,275 B1 | 3/2002 | Bertsch |
| 6,395,183 B1 | 5/2002 | Valaskovic |
| 6,562,211 B1 | 5/2003 | Kunnecke |
| 6,583,408 B2 | 6/2003 | Smith |
| 6,600,155 B1 | 7/2003 | Andrien, Jr. |
| 6,646,256 B2 | 11/2003 | Gourley |
| 6,649,907 B2 | 11/2003 | Ebeling |
| 6,670,608 B1 | 12/2003 | Taylor |
| 6,690,006 B2 | 2/2004 | Valaskovic |
| 6,713,757 B2 | 3/2004 | Tanner |
| 6,717,139 B2 | 4/2004 | Taniguchi |
| 6,723,985 B2 | 4/2004 | Schultz |
| 6,744,041 B2 | 6/2004 | Sheehan |
| 6,744,046 B2 | 6/2004 | Valaskovic |
| 6,753,523 B1 | 6/2004 | Whitehouse |
| 6,784,424 B1 | 8/2004 | Willoughby |
| 6,794,642 B2 | 9/2004 | Bateman |
| 6,803,565 B2 | 10/2004 | Smith |
| 6,806,468 B2 | 10/2004 | Laiko |
| 6,818,889 B1 | 11/2004 | Sheehan |
| 6,861,647 B2 | 3/2005 | Reilly |
| 6,875,980 B2 | 4/2005 | Bateman |
| 6,878,930 B1 | 4/2005 | Willoughby |
| 6,888,132 B1 | 5/2005 | Sheehan |
| 6,914,243 B2 | 7/2005 | Sheehan |
| 6,943,347 B1 | 9/2005 | Willoughby |
| 6,949,739 B2 | 9/2005 | Franzen |
| 6,949,740 B1 | 9/2005 | Sheehan |
| 6,949,741 B2 | 9/2005 | Cody |
| 6,956,205 B2 | 10/2005 | Park |
| 6,977,372 B2 | 12/2005 | Valaskovic |
| 6,979,816 B2 | 12/2005 | Tang |
| 6,987,264 B1 | 1/2006 | Whitehouse |
| 6,992,299 B2 | 1/2006 | Lee |
| 7,015,466 B2 | 3/2006 | Takats |
| 7,019,289 B2 | 3/2006 | Wang |
| 7,034,292 B1 | 4/2006 | Whitehouse |
| 7,041,972 B2 | 5/2006 | Bajic |
| 7,049,584 B1 | 5/2006 | Whitehouse |
| 7,053,368 B2 | 5/2006 | Thakur |
| 7,064,317 B2 | 6/2006 | McLuckey |
| 7,071,464 B2 | 7/2006 | Reinhold |
| 7,081,618 B2 | 7/2006 | Laprade |
| 7,081,621 B1 | 7/2006 | Willoughby |
| 7,095,019 B1 | 8/2006 | Sheehan |
| 7,098,452 B2 | 8/2006 | Schneider |
| 7,112,785 B2 | 9/2006 | Laramee |
| 7,138,626 B1 | 11/2006 | Karpetsky |
| 7,157,698 B2 | 1/2007 | Makarov |
| 7,161,145 B2 | 1/2007 | Oser |
| 7,196,525 B2 | 3/2007 | Sparkman |
| 7,247,495 B2 | 7/2007 | Amirav |
| 7,253,406 B1 | 8/2007 | Sheehan |
| 7,332,345 B2 | 2/2008 | Darrach |
| 7,423,261 B2 | 9/2008 | Truche |
| 7,429,731 B1 | 9/2008 | Karpetsky |
| 7,462,826 B2 | 12/2008 | Schneider |
| 7,544,933 B2 | 6/2009 | Cooks |
| 7,569,812 B1 | 8/2009 | Karpetsky |
| 7,582,864 B2 | 9/2009 | Verentchikov |
| 7,700,913 B2 | 4/2010 | Musselman |
| 7,705,297 B2 | 4/2010 | Musselman |
| 7,714,281 B2 | 5/2010 | Musselman |
| 7,772,546 B2 | 8/2010 | Jackson |
| 7,777,181 B2 | 8/2010 | Musselman |
| 7,858,926 B1 | 12/2010 | Whitehouse |
| 7,893,408 B2 | 2/2011 | Hieftje |
| 7,915,579 B2 | 3/2011 | Chen |
| 7,923,681 B2 | 4/2011 | Collings |
| 7,928,364 B2 | 4/2011 | Musselman |
| 7,929,138 B1 | 4/2011 | Webb |
| 7,982,183 B2 | 7/2011 | Marakov |
| 7,982,185 B2 | 7/2011 | Whitehouse |
| 8,003,935 B2 | 8/2011 | Robinson |
| 8,026,477 B2 | 9/2011 | Musselman |
| 8,044,346 B2 | 10/2011 | Kostiainen |
| RE43,078 E | 1/2012 | Cody |
| 8,101,910 B2 | 1/2012 | Loboda |
| 8,207,497 B2 | 6/2012 | Musselman |
| 8,217,341 B2 | 7/2012 | Musselman |
| 8,242,459 B2 | 8/2012 | Sun |
| 8,278,619 B2 | 10/2012 | Makarov |
| 8,304,718 B2 | 11/2012 | Ouyang |
| 8,308,339 B2 | 11/2012 | Karpetsky |
| 8,334,507 B1 | 12/2012 | Whitehouse |
| 8,362,418 B2 | 1/2013 | Xu |
| 8,410,431 B2 | 4/2013 | Ouyang |
| 8,421,005 B2 | 4/2013 | Musselman |
| 8,440,965 B2 | 5/2013 | Musselman |
| 8,481,922 B2 | 7/2013 | Musselman |
| 8,487,245 B2 * | 7/2013 | Fernandez ............ G01N 27/622 250/288 |
| 8,497,474 B2 | 7/2013 | Musselman |
| 8,519,354 B2 | 8/2013 | Charipar |
| 8,525,109 B2 | 9/2013 | Musselman |
| 8,563,945 B2 | 10/2013 | Musselman |
| RE44,603 E | 11/2013 | Cody |
| 8,592,756 B2 | 11/2013 | Ouyang |
| 8,592,758 B1 | 11/2013 | Nilles |
| 8,604,423 B2 | 12/2013 | Enke |
| 8,648,295 B2 | 2/2014 | Enke |
| 8,664,000 B2 | 3/2014 | Yang |
| 8,686,351 B2 | 4/2014 | Ouyang |
| 8,704,167 B2 | 4/2014 | Cooks |
| 8,710,437 B2 | 4/2014 | Cooks |
| 8,729,496 B2 | 5/2014 | Musselman |
| 8,754,365 B2 | 6/2014 | Krechmer |
| 8,766,178 B2 | 7/2014 | Ouyang |
| 8,803,085 B2 | 8/2014 | Ouyang |
| 8,816,275 B2 | 8/2014 | Ouyang |
| 8,822,949 B2 | 9/2014 | Musselman |
| 8,853,627 B2 | 10/2014 | Ouyang |
| 8,859,956 B2 | 10/2014 | Ouyang |
| 8,859,957 B2 | 10/2014 | Ouyang |
| 8,859,958 B2 | 10/2014 | Ouyang |
| 8,859,959 B2 | 10/2014 | Ouyang |
| 8,859,986 B2 | 10/2014 | Cooks |
| 8,890,063 B2 | 11/2014 | Ouyang |
| 8,895,916 B2 | 11/2014 | Musselman |

(56) References Cited

U.S. PATENT DOCUMENTS

| | | |
|---|---|---|
| 8,895,918 B2 | 11/2014 | Cooks |
| 8,927,926 B2 | 1/2015 | Shimada |
| 8,932,875 B2 | 1/2015 | Cooks |
| 8,933,398 B2 | 1/2015 | Ouyang |
| 8,937,288 B1 | 1/2015 | Cooks |
| 8,963,079 B2 | 2/2015 | Ouyang |
| 8,963,101 B2 | 2/2015 | Krechmer |
| 9,024,254 B2 | 5/2015 | Cooks |
| 9,064,674 B2 | 6/2015 | Ouyang |
| 9,105,435 B1 | 8/2015 | Musselman |
| 9,116,154 B2 | 8/2015 | Ouyang |
| 9,159,540 B2 | 10/2015 | Ouyang |
| 9,165,752 B2 | 10/2015 | Cooks |
| 9,224,587 B2 | 12/2015 | Musselman |
| 9,230,792 B2 | 2/2016 | Cooks |
| 9,337,007 B2 * | 5/2016 | Musselman ............ H01J 49/16 |
| 9,484,195 B2 | 11/2016 | Ouyang |
| 9,500,630 B2 | 11/2016 | Cooks |
| 9,514,923 B2 | 12/2016 | Krechmer |
| 9,538,945 B2 | 1/2017 | Cooks |
| 9,546,979 B2 | 1/2017 | Cooks |
| 9,548,192 B2 | 1/2017 | Cooks |
| 9,551,079 B2 | 1/2017 | Cooks |
| 9,558,926 B2 | 1/2017 | Musselman |
| 9,607,306 B2 | 3/2017 | Hieftje |
| RE46,366 E | 4/2017 | Cody |
| 9,620,344 B2 | 4/2017 | Cooks |
| 9,700,251 B2 | 7/2017 | Cooks |
| 9,704,700 B2 | 7/2017 | Cooks |
| 9,719,181 B2 | 8/2017 | Cooks |
| 9,733,228 B2 | 8/2017 | Cooks |
| 9,824,875 B2 | 11/2017 | Musselman |
| 9,941,105 B2 | 4/2018 | Cooks |
| 9,960,029 B2 | 5/2018 | Krechmer |
| 10,004,440 B2 | 6/2018 | Cooks |
| 10,008,374 B2 | 6/2018 | Ouyang |
| 10,014,169 B2 | 7/2018 | Cooks |
| 10,056,243 B2 | 8/2018 | Musselman |
| 2002/0121596 A1 | 9/2002 | Laiko |
| 2002/0121598 A1 | 9/2002 | Park |
| 2002/0162967 A1 | 11/2002 | Atkinson |
| 2002/0185593 A1 | 12/2002 | Doring |
| 2002/0185595 A1 | 12/2002 | Smith |
| 2002/0185606 A1 | 12/2002 | Smith |
| 2003/0052268 A1 | 3/2003 | Doroshenko |
| 2004/0094706 A1 | 5/2004 | Covey |
| 2004/0129876 A1 | 7/2004 | Franzen |
| 2004/0159784 A1 | 8/2004 | Doroshenko |
| 2005/0230635 A1 | 10/2005 | Takats |
| 2005/0236374 A1 | 10/2005 | Blankenship |
| 2006/0266941 A1 | 11/2006 | Vestal |
| 2007/0114389 A1 | 5/2007 | Karpetsky |
| 2007/0228271 A1 | 10/2007 | Truche |
| 2008/0156985 A1 | 7/2008 | Venter |
| 2008/0202915 A1 | 8/2008 | Hieftje |
| 2008/0217254 A1 | 9/2008 | Anderson |
| 2009/0090197 A1 | 4/2009 | Finlay |
| 2009/0090858 A1 | 4/2009 | Musselman |
| 2010/0078550 A1 | 4/2010 | Wiseman |
| 2010/0140468 A1 | 6/2010 | Musselman |
| 2011/0215798 A1 | 9/2011 | Beer |
| 2012/0006983 A1 | 1/2012 | Cody |
| 2012/0145890 A1 | 6/2012 | Goodlett |
| 2012/0208004 A1 | 8/2012 | Wolcott |
| 2012/0223226 A1 | 9/2012 | Rafferty |
| 2012/0312980 A1 | 12/2012 | Whitehouse |
| 2012/0322683 A1 | 12/2012 | Liu |
| 2013/0020482 A1 | 1/2013 | Enke |
| 2013/0037710 A1 | 2/2013 | Wu |
| 2013/0092832 A1 | 4/2013 | Enke |
| 2013/0273552 A1 | 10/2013 | Ohashi |
| 2013/0284915 A1 | 10/2013 | Shimada |
| 2013/0299688 A1 | 11/2013 | Balogh |
| 2014/0024822 A1 | 1/2014 | Connolly |
| 2016/0314956 A1 | 10/2016 | Cooks |
| 2017/0082604 A1 | 3/2017 | Ouyang |
| 2017/0084438 A1 | 3/2017 | Cooks |
| 2017/0103879 A1 | 4/2017 | Cooks |
| 2017/0130352 A1 | 5/2017 | Cooks |
| 2017/0135613 A1 | 5/2017 | Cooks |
| 2017/0148622 A1 | 5/2017 | Musselman |
| 2017/0154761 A1 | 6/2017 | Ouyang |
| 2017/0168032 A1 | 6/2017 | Cooks |
| 2017/0221695 A1 | 8/2017 | Cooks |
| 2017/0229299 A1 | 8/2017 | Musselman |
| 2017/0248607 A1 | 8/2017 | Cooks |
| 2017/0273605 A1 | 9/2017 | Cooks |
| 2017/0287690 A1 | 10/2017 | Cooks |
| 2017/0309462 A1 | 10/2017 | Cooks |
| 2017/0335477 A1 | 11/2017 | Cooks |
| 2017/0343526 A1 | 11/2017 | Cooks |
| 2017/0349547 A1 | 12/2017 | Cooks |
| 2018/0017535 A1 | 1/2018 | Cooks |
| 2018/0024108 A1 | 1/2018 | Cooks |
| 2018/0033603 A1 | 2/2018 | Cooks |
| 2018/0040464 A1 | 2/2018 | Cooks |
| 2018/0043327 A1 | 2/2018 | Cooks |
| 2018/0047552 A1 | 2/2018 | Cooks |
| 2018/0061620 A1 | 3/2018 | Cooks |
| 2018/0076015 A1 | 3/2018 | Musselman |
| 2018/0188273 A1 | 7/2018 | Cooks |
| 2018/0204712 A1 | 7/2018 | Cooks |

FOREIGN PATENT DOCUMENTS

| | | |
|---|---|---|
| GB | 2263578 | 7/1993 |
| JP | 50-106694 | 8/1975 |
| JP | 51-120288 | 10/1976 |
| JP | 52-91494 | 8/1977 |
| JP | 60-41748 | 3/1985 |
| JP | 2003185635 | 7/2003 |
| JP | 2003222574 | 8/2003 |
| JP | 2005-150027 | 6/2005 |
| JP | 2007525677 | 6/2007 |
| JP | 2009539114 | 11/2009 |
| WO | WO03025973 | 3/2003 |
| WO | WO03081205 | 10/2003 |
| WO | WO2004068131 | 8/2004 |
| WO | WO2005094389 | 10/2005 |
| WO | WO2008054393 | 5/2008 |
| WO | WO2008082603 | 7/2008 |
| WO | WO2015195599 | 12/2015 |
| WO | WO2016145041 | 9/2016 |
| WO | WO2017040359 | 3/2017 |
| WO | WO2017053911 | 3/2017 |
| WO | WO2017070478 | 4/2017 |
| WO | WO2017079193 | 5/2017 |
| WO | WO2017127670 | 7/2017 |
| WO | WO2017132444 | 8/2017 |
| WO | WO2017180871 | 10/2017 |

OTHER PUBLICATIONS

Cody, R.B. et al., "Versatile New Ion Source for the Analysis of Materials in Open Air under Ambient Conditions" Anal. Chem., 2005, 77, 2297-2302.

Cooks, R.G. et al., "Ambient Mass Spectrometry", Science, 2006, 311, 1566-1570.

Dalton, C.N. et al., "Electrospray-Atmospheric Sampling Glow Discharge Ionization Source for the Direct Analysis of Liquid Samples", Analytical Chemistry, Apr. 1, 2003, vol. 75, No. 7, pp. 1620-1627.

Garimella, S. et al., "Gas-flow assisted ion transfer for mass spectrometry", J. Mass Spectrom. 2012, 17, 201-207.

Guzowski, J.P. Jr. et al., "Development of a Direct Current Gas Sampling Glow Discharge Ionization Source for the Time-of-Flight Mass Spectrometer", J. Anal. At. Spectrom., 14, 1999, pp. 1121-1127.

Haddad, R., et al., "Easy Ambient Sonic-Spray Ionization Mass Spectrometry Combined with Thin-Layer Chromatography," *Analytical Chemistry*, vol. 80, No. 8, Apr. 15, 2008, pp. 2744-2750.

(56) References Cited

OTHER PUBLICATIONS

Harris, Glenn A. et al., Ambient Sampling/Ionization Mass Spectrometry: Applications and Current Trends, Apr. 15, 2011, Anal. Chem. 2011, 83, pp. 4508-4538.
Harris, Glenn A. et al., Simulations and Experimental Investigation of Atmospheric Transport in an Ambient Metastable-Induced Chemical Ionization Source, Anal. Chem. 2009, 81, pp. 322-329.
Hill, C.A. et al., "A pulsed corona discharge switchable high resolution ion mobility spectrometer-mass spectrometer", Analyst, 2003, 128, pp. 55-60.
Hiraoka, K. et al., "Atmospheric-Pressure Penning Ionization Mass Spectrometry", Rapid Commun. Mass Spectrom., 18, 2004, pp. 2323-2330.
McLuckey, S.A. et al., "Atmospheric Sampling Glow Discharge Ionization Source for the Determination of Trace Organic Compounds in Ambient Air", Anal. Chem., 60, 1988, pp. 2220-2227.
Otsuka, K. et al., "An Interface for Liquid Chromatograph/Liquid Ionization Mass Spectrometer", Analytical Sciences, Oct. 1988, vol. 4, pp. 467-472.
Takáts et al., "Mass Spectrometry Sampling Under Ambient Conditions with Desorption Electrospray Ionization," Science, vol. 306, No. 5695, Oct. 15, 2004, pp. 471-473.
Tembreull, R., et al., "Pulsed Laser Desorption with Resonant Two-Photon Ionization Detection in Supersonic Beam Mass Spectrometry," Anal. Chem., vol. 58, 1986, pp. 1299-1303, p. 1299.
Zhao, J. et al., Liquid Sample Injection Using an Atmospheric Pressure Direct Current Glow Discharge Ionization Source, Analytical Chemistry, Jul. 1, 1992, vol. 64, No. 13, pp. 1426-1433.
International Search Report, Application No. PCT/US2007/63006, dated Feb. 5, 2008, 8 pages.
Extended European Search Report, Application No. 07757665.0 PCT/US2007/063006 dated Jan. 7, 2010, 8 pages.
Article 94(3) European Communication, Application No. 07757665.0 PCT/US2007/063006, dated Mar. 14, 2012, 9 pages.
International Search Report, Application No. PCT/US2007/69823, dated Feb. 15, 2008, 8 pages.
Extended European Search Report, Application No. 07797812.0 PCT/US2007/069823, dated Apr. 4, 2010, 9 pages.
Article 94(3) European Communication, Application No. 07797812.0 PCT/US2007/069823, dated Jul. 27, 2012, 9 pages.
International Search Report, Application No. PCT/US2007/69821, dated Feb. 7, 2008.
Extended European Search Report, Application No. 07797811.2 PCT/US2007/069821, dated Mar. 25, 2010, 9 pages.
European Summons, Application No. 07797811.2 PCT/US2007/069821, Feb. 18, 2013, 8 pages.
International Search Report, Application No. PCT/US2007/81439, dated Mar. 20, 2008, 9 pages.
Extended European Search Report, Application No. 07844307.4 PCT/US2007/081439, dated Apr. 14, 2010, 12 pages.
Japanese Office Action, Application No. 2008-558459 PCT/US2007/063006, dated Jan. 19, 2012, 4 pages.
Unofficial Translation of Japanese Office Action, Application No. 2008-558459 PCT/US2007/063006, dated Jan. 19, 2012, 5 pages.
Chinese Office Action, Application No. 200780015974.5 PCT/US2007/063006, dated Feb. 2, 2012, 5 pages.
Chinese Office Action, Application No. 200780015974.5 PCT/US2007/063006, dated Sep. 25, 2012, 8 pages.
Chinese Office Action, Application No. 200780015974.5 PCT/US2007/063006, dated Dec. 26, 2012, 7 pages.
International Search Report, Application No. PCT/US2012/000061, dated Aug. 6, 2013, 8 pages.
Oral Proceedings European Communication, Application No. 07757665.0 PCT/US2007/063006, Sep. 3, 2013, 5 pages.
Korean Patent Application 7024130/2008 Office Action, dated Jun. 29, 2013, 3 pages.
Korean Patent Application 7024130/2008 Office Action, translation, dated Jun. 29, 2013, 3 pages.
Article 94(3) European Communication, Application No. 07797811.2 PCT/US2007/069821, dated Feb. 2, 2012, 8 pages.
Summons Application No. 07797811.2 PCT/US2007/069821, Feb. 18, 2013, 10 pages.
Chinese Office Action, Application No. 201280003101.3 PCT/US12/00061, dated Jan. 22, 2016, 3 pages.
Translation of Chinese Office Action, Application No. 201280003101.3 PCT/US12/00061, dated Jan. 22, 2016, 18 pages.
Japanese Office Action, Application No. 2013552527 PCT/US12/00061, dated Jan. 22, 2016, 3 pages.
Translation of Japanese Office Action, Application No. 2013552527 PCT/US12/00061, dated Jan. 22, 2016, 4 pages.
Extended European Search Report, Application No. 12742544.5 PCT/US20012/0000061, dated Sep. 12, 2017, 9 pages.
Gibbins, J.R., 'Variable Heating Rate Wire Mesh Pyrolysis Apparatus' Rev. Sci. Instr. 60 (1989) pp. 1129-1139.
Korean Patent Application, Application No. 10-2013-7008108, Notice of Final Rejection, dated Jun. 7, 2018, 2 pages.

* cited by examiner

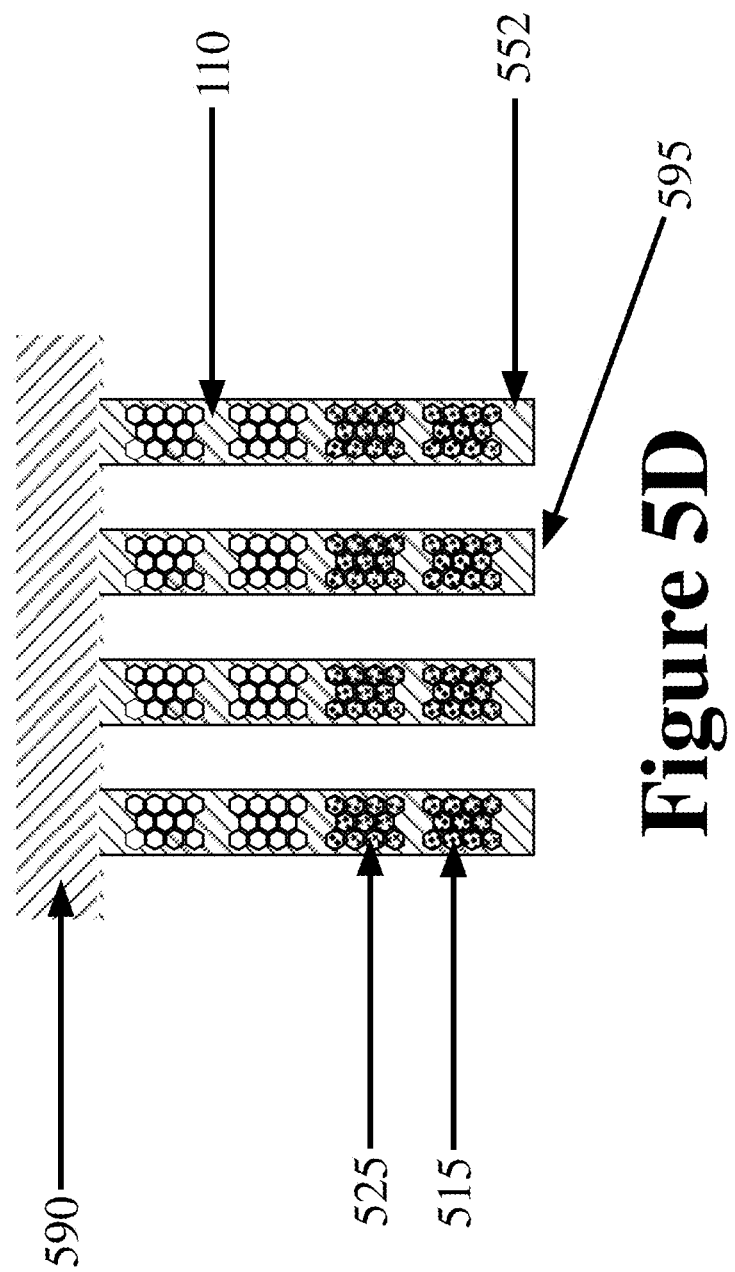

US 10,636,640 B2

APPARATUS AND METHOD FOR CHEMICAL PHASE SAMPLING ANALYSIS

PRIORITY CLAIM

This application claims priority to (1) U.S. Provisional Patent Application No. 62/529,469 entitled "APPARATUS AND METHOD FOR SECURE RAPID CHEMICAL ANALYSIS SAMPLING", inventor Brian D. Musselman, filed Jul. 6, 2017; and (2) U.S. Provisional Patent Application No. 62/593,764 entitled "APPARATUS AND METHOD FOR SECURE RAPID CHEMICAL ANALYSIS SAMPLING", inventor Brian D. Musselman, filed Dec. 1, 2017, the contents of each of which are incorporated herein by reference in their entireties.

FIELD OF THE INVENTION

The present invention relates to methods and devices for chemical analysis of more than one phase of a sample in order to permit complete analysis of the sample.

BACKGROUND OF THE INVENTION

Many industrial and environmental processes involve turbulent dispersed two-phase flows, such as gaseous flows laden with solid particles or liquid drops and liquids containing solid particles or bubbles. In such flows, discrete particles, i.e., drops or bubbles constitute a disperse phase, whereas the carrier liquid or gas represents a continuum or continuous phase. The disperse phase can move somewhat differently from the continuous phase and the motion of both phases can be complicated. Examples include the combustion of coal, tobacco and other plant material.

Tobacco smoke is a complex and dynamic matrix consisting of more than 4800 compounds. It is composed of a gas phase and a particulate phase and many semi-volatile substances are partitioned between these two phases. The majority of substances can be found in the particulate phase. Even so, the gas phase consists of 400 to 500 individual compounds of which about 300 can be classified as semi-volatiles. Most of these smoke constituents are at trace levels (less than 100 parts per million). The chemical composition and partition between both phases can change continuously and is strongly influenced by time, temperature, chemistry and dilution of the tobacco smoke in the matrix. More recently, electronic cigarettes, e-cigarettes, have grown in popularity. These e-cigarettes utilize solutions containing both a variety of chemicals found in tobacco as well as low vapor pressure polymers that are used to produce the smoke phenomena. This combination of materials presents a challenge to the laboratory employing classical analytical methods and makes the development of new methods for determination of the composition of the solution for molecules that are present pre- and post-vaporization critical.

Similarly, the development of medical marijuana and its commercialization has led to the need for improved methods for drug and drug metabolite isolation and detection when they are present in body fluids including urine and oral fluid. As commercial oral fluid sampling devices utilize surfactants and polymers to disrupt microbiological activity and stabilize those samples for future analysis, being able to eliminate or separate surfactants and/or polymers from the sample presents a challenge that classically trained analytical chemist will need tools to address.

SUMMARY OF THE INVENTION

In an embodiment of the present invention, a tri-sorbent coated grid comprising at least a first tine and a second tine, where one or both the first tine and the second tine contains at least a proximate area, an intermediate area and a distal area, where a first sorbent material is applied to at least the proximate area of the first tine and the proximate area of the second tine, where the first sorbent material is adapted to collect one or more first analyte molecules on contacting the first sorbent material and the sample. The grid further comprises a second sorbent material applied to at least the intermediate area of the first tine and the intermediate area of the second tine adapted to collect one or more second analyte molecules on introduction of a sample to the second sorbent material. The grid further comprises a third sorbent material applied to at least the distal area of the first tine and the distal area of the second tine adapted to collect one or more second analyte molecules on introduction of a sample to the second sorbent material. In an embodiment of the present invention, the tri-sorbent coated grid can be used to simultaneously collect different phases of a sample for analysis. In an alternative embodiment of the present invention, the proximal, intermediate and distal areas allow for three (3) separate analysis of a sample. It is envisioned that a first analysis can be carried out on a proximate area and the data used in a proceeding and the device with the remaining intact intermediate and distal areas can be retained for further analysis as required by the proceeding. In another alternative embodiment of the present invention, the proximal, intermediate and distal areas allow for selective retention of components from a sample for analysis.

BRIEF DESCRIPTION OF THE DRAWINGS

Various embodiments of the present invention will be described in detail based on the following figures, where:

FIG. 5D is a schematic showing the sorbent coated mesh or grid of FIG. 5C in which the bottom approximately six (6) mm of the proximate end of the sorbent coated mesh or grid has been dipped in a first and a second sorbent coated material solution, while the area corresponding to the bottom approximately twelve (12) mm to the bottom approximately six (6) mm of the proximate end of the sorbent coated mesh or grid has been dipped in the second sorbent coated material solution, according to an embodiment of the invention;

DETAILED DESCRIPTION OF THE INVENTION

Figure 1:
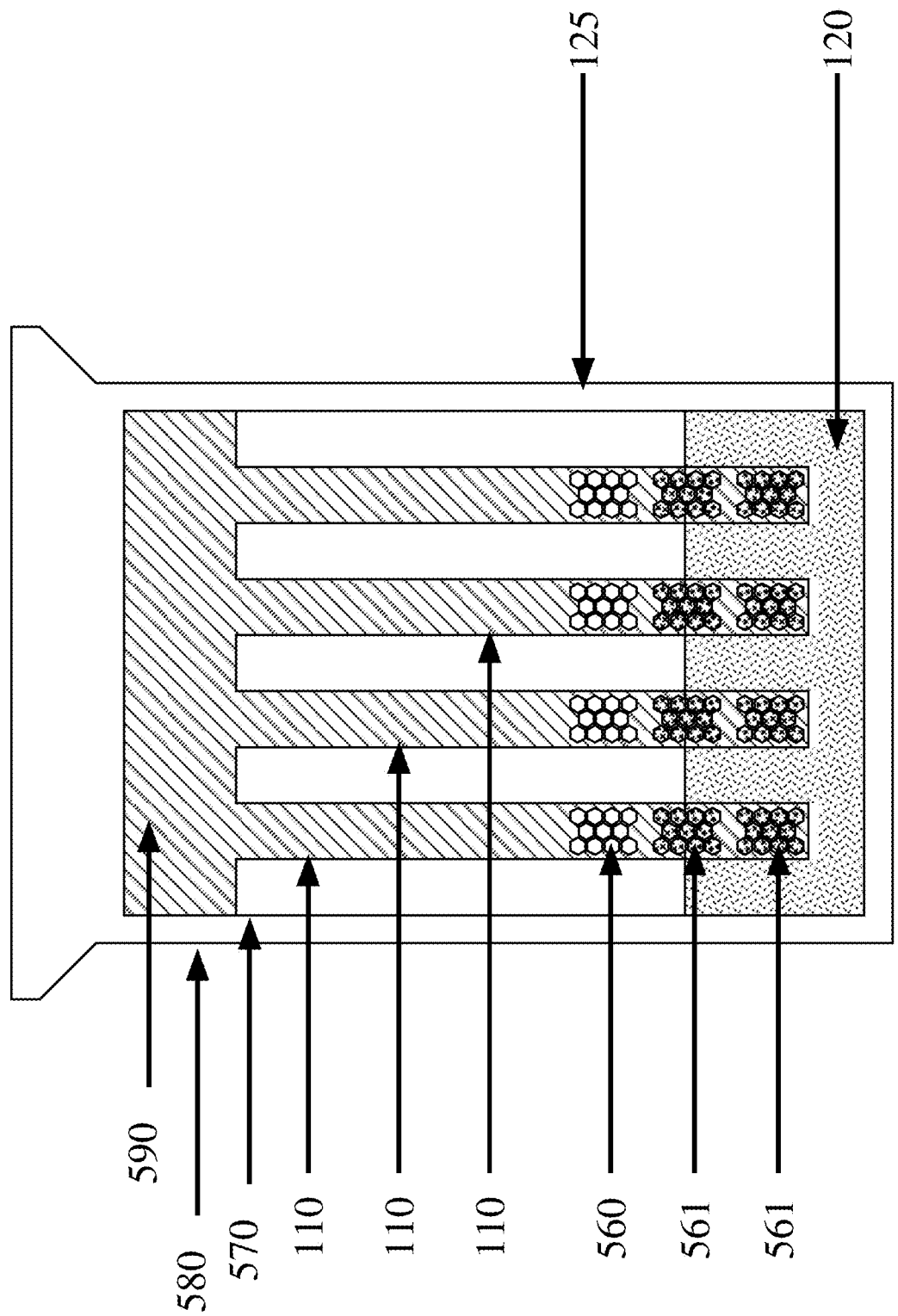
FIG. 1 is a schematic diagram of mesh or grid made up of four (4) tines, where each tine has three (3) areas for analysis resulting in each tine being a triple desorption device, inserted in a beaker, where each tine has three (3) areas for analysis and where the proximate area of each of the four tines is fully submersed in the solution in the beaker and the distal are of each of the four tines is not submersed in the solution and thereby available for sampling the gaseous phase, showing the simultaneous liquid and headspace extraction for analysis, according to an embodiment of the invention.

Abbreviations include:

AISM=atmospheric ionization sorbent material; API=atmospheric pressure ionization; AS=analyte species; DART=direct analysis real time; DESI=desorption electrospray ionization; DMS=differential mobility spectrometer; GIS=gas ion separator; IMS=ion mobility spectrometer; MS=mass spectrometry; RS=reactive species.

Definitions of certain terms that are used hereinafter include:

The transitional term "comprising" is synonymous with "including," "containing," or "characterized by," is inclusive or open-ended and does not exclude additional, unrecited elements or method steps.

The transitional phrase "consisting of" excludes any element, step, or ingredient not specified in the claim, but does not exclude additional components or steps that are unrelated to the invention such as impurities ordinarily associated with a composition.

The transitional phrase "consisting essentially of" limits the scope of a claim to the specified materials or steps and those that do not materially affect the basic and novel characteristic(s) of the claimed invention.

The term Gas-Ion Separator (GIS) will be used to refer to a device which separates ions from one or both neutral molecules and neutral atoms allowing the pre-concentration and transfer of the ions to an analysis system. The term 'inlet tube' will be used to refer to the low vacuum side of a GIS. The term 'outlet tube' will be used to refer to the high vacuum side of the GIS. In various embodiments of the invention, the contained tube can be an inlet tube. Active ionization refers to the process where an atmospheric analyzer not utilizing a radioactive nucleus can be used to ionize analyte ions. Passive ionization refers to any process where a radioactive nuclei results in analyte ions. A capacitive surface is a surface capable of being charged with a potential. A surface is capable of being charged with a potential, if a potential applied to the surface remains for the typical duration time of an experiment, where the potential at the surface is greater than 50% of the potential applied to the surface. A vacuum of atmospheric pressure is approximately 760 torr. Here, 'approximately' encompasses a range of pressures from below $10^1$ atmosphere=$7.6 \times 10^3$ torr to $10^{-1}$ atmosphere=$7.6 \times 10^1$ torr. A vacuum of below $10^{-3}$ torr would constitute a high vacuum. Here, 'approximately' encompasses a range of pressures from below $5 \times 10^{-3}$ torr to $5 \times 10^{-6}$ torr. A vacuum of below $10^{-6}$ torr would constitute a very high vacuum. Here, 'approximately' encompasses a range of pressures from below $5 \times 10^{-6}$ torr to $5 \times 10^{-9}$ torr. In the following, the phrase 'high vacuum' encompasses high vacuum and very high vacuum.

The word 'contact' is used to refer to any process by which molecules of a sample in one or more of the gas, liquid and solid phases becomes adsorbed, absorbed or chemically bound to a surface.

A grid becomes 'coated' with a substrate when a process results in substrate molecules becoming adsorbed, absorbed or chemically bound to a surface. A grid can be coated when beads are adsorbed, absorbed or chemically bound to the grid. A grid can be coated when nanobeads are adsorbed, absorbed or chemically bound to the grid.

A filament means one or more of a loop of wire, a segment of wire, a metal ribbon, a metal strand or an un-insulated wire, animal string, paper, perforated paper, fiber, cloth, silica, fused silica, plastic, plastic foam, polymer, Teflon, polymer impregnated Teflon, cellulose and hydrophobic support material coated and impregnated filaments. In various embodiments of the invention, a filament has a diameter of approximately 50 microns to approximately 2 mm. In measuring the diameter of a filament, approximately indicates plus or minus twenty (20) percent. In an embodiment of the invention, the length of the filament is approximately 1 mm to approximately 25 mm. In measuring the length of a filament, approximately indicates plus or minus twenty (20) percent.

A 'major axis' of a tine means an imaginary line passing through the length of the tine such that 360° rotation with respect to that line returns the tine to an indistinguishable position from its original position.

Two tines are parallel when the first major axis of a first tine and the second major axis of a second tine are positioned such that the distance continuously between the first major axis of a first tine and the second major axis remains constant.

Two tines are co-planar when the first major axis of a first tine and the second major axis of a second tine both lie in the same plane.

Two tines are co-linear means lying in the same straight line.

Two tines are 'symmetric' when they are made up of exactly similar parts facing each other or around an axis.

The term 'orientation' means the position of a tine with respect to another tine or with respect to a sample holder.

The term 'proximity' means the position of a tine with respect to another tine or of a tine with respect to a mesh.

The terms '$C_n$', '$C_n$ rotation' or '$C_n$ axis of rotation' (but not C4, C8 or C18) refer to the proper axis of rotation. The rotation is with respect to a line (axis of rotation) about which a tine can rotate where each 360° rotation returns the tine to an indistinguishable position from its original position, where a $C_n$ rotation is a rotation of $(360/n)°$.

The term 'registration' means when an area of a tine (e.g., the proximal area) lines up with the mesh to deliver the heat from the mesh to the proximal area of the tine.

The term 'contacting' means the coming together or touching of objects or surfaces such as the sampling of a surface with an area of a tine.

The shape of a tine can be a cylinder, an elliptical cylinder, a long square block, a long rectangular block or a long thin blade.

The term 'hole' refers to a hollow space in an otherwise solid object, with an opening allowing light and/or particles to pass through the otherwise solid object. A hole can be circular, ellipsoid, pear shaped, a slit, or polygonal (including triangular, square, rectangular, pentagonal, hexagonal, heptagonal, and the like).

The term 'convectively heating' refers to both convective and radiative heating that occurs when a current is passed through a mesh resulting in mostly convective and some small (or no) amount of radiative heating of an area of a tine in close proximity.

A first sorbent material is adapted to collect a first sample molecule when the first sorbent material is chemically attractive to a chemical characteristic of the first sample molecule. For example, a long chain (C18) aliphatic species present in the sorbent material will be attractive to bind hydrophobic molecules in the presence of a non-hydrophobic phase. In contrast, a short chain (C4) aliphatic species present in the sorbent material will be attractive to bind less hydrophobic molecules in the presence of a non-hydrophobic phase.

A metal comprises one or more elements consisting of lithium, beryllium, boron, carbon, nitrogen, oxygen, sodium, magnesium, aluminum, silicon, phosphorous, sulfur, potassium, calcium, scandium, titanium, vanadium, chromium, manganese, iron, cobalt, nickel, copper, zinc, gallium, germanium, arsenic, selenium, rubidium, strontium, yttrium, zirconium, niobium, molybdenum, technetium, ruthenium, rhodium, palladium, silver, cadmium, indium, tin, antimony, tellurium, cesium, barium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, polonium, francium and radium. Thus, a metal includes for example, a nickel titanium alloy known as nitinol or a chromium iron alloy used to make stainless steel.

A plastic comprises one or more of polystyrene, high impact polystyrene, polypropylene, polycarbonate, low density polyethylene, high density polyethylene, polypropylene, acrylonitrile butadiene styrene, polyphenyl ether alloyed with high impact polystyrene, expanded polystyrene, polyphenylene ether and polystyrene impregnated with pentane, a blend of polyphenylene ether and polystyrene impregnated with pentane or polyethylene and polypropylene.

A polymer comprises a material synthesized from one or more reagents selected from the group comprising of styrene, propylene, carbonate, ethylene, acrylonitrile, butadiene, vinyl chloride, vinyl fluoride, ethylene terephthalate, terephthalate, dimethyl terephthalate, bis-beta-terephthalate, naphthalene dicarboxylic acid, 4-hydroxybenzoic acid, 6-hyderoxynaphthalene-2-carboxylic acid, mono ethylene glycol (1,2-ethanediol), cyclohexylene-dimethanol, 1,4-butanediol, 1,3-butanediol, polyester, cyclohexane dimethanol, terephthalic acid, isophthalic acid, methylamine, ethylamine, ethanolamine, dimethylamine, hexamethylamine diamine (hexane-1,6-diamine), pentamethylene diamine, methylethanolamine, trimethylamine, aziridine, piperidine, N-methylpiperideine, anhydrous formaldehyde, phenol, bisphenol A, cyclohexanone, trioxane, dioxolane, ethylene oxide, adipoyl chloride, adipic, adipic acid (hexanedioic acid), sebacic acid, glycolic acid, lactide, caprolactone, aminocaproic acid and or a blend of two or more materials synthesized from the polymerization of these reagents.

A plastic foam is a polymer or plastic in which a gaseous bubble is trapped including polyurethane, expanded polystyrene, phenolic foam, XPS foam and quantum foam.

A mesh means one or more of two or more connected filaments, two or more connected strings, foam, a grid, perforated paper, screens, paper screens, plastic screens, fiber screens, cloth screens, polymer screens, silica screens, Teflon screens, polymer impregnated Teflon screens, and cellulose screens. In various embodiments of the invention, a mesh includes one or more of three or more connected filaments, three or more connected strings, mesh, foam, a grid, perforated paper, screens, plastic screens, fiber screens, cloth, and polymer screens. In an embodiment of the invention, a mesh can have approximately 10 filaments per cm. In an alternative embodiment of the invention, a mesh can have approximately 100 filaments per cm. In designing the number of filaments per cm, approximately indicates plus or minus twenty (20) percent.

A 'substratum' is a polymer, a metal, and or a plastic.

A 'grid' is a substratum in which either gaps, spaces or holes have been punched or otherwise introduced into the substratum or in which a window or section has been cut out or otherwise removed from the substratum and a mesh has been inserted into the removed window or section. In an embodiment of the invention, the grid can have a thickness between a lower limit of approximately 1 micron and an upper limit of approximately 1 cm. In this range, approximately means plus or minus twenty (20) percent.

A 'tine' means a three (3) dimensional grid where the cross section of the tine has a length that is larger than its width, e.g., a rectangle, a rhombus, a rectangle with rounded corners, a rectangle with angled corners, a half ellipse or a partial ellipse. In an embodiment of the invention, the holder is part of the substratum that forms the tine and the tine cannot be separated or released from the holder without breaking the substratum. In an embodiment of the invention, a tine can include a substratum that is perforated or otherwise deformed to allow a portion of the tine to be broken after the tine has been used to sample. In this manner, the tine can be prepared with a sorbent material, used to sample and then the sample can be divided for analysis, later analysis and or storage and analysis. The perforation can longitudinal or latitudinal. In an embodiment of the invention, a device comprising two or more connected tines includes a holder, i.e., the holder forms part of the two or more tines. In an alternative embodiment of the invention, a device comprising two or more connected tines can include a separate holder, i.e., the holder attaches to the two or more tines.

A holder is a polymer, a metal, and or a plastic clamp or clasp in which one or more tines can be secured or otherwise held in order to be able to: prepare the tines with a sorbent coating, collect samples, analyze the tines, or store the tines.

A 'storage container' means a device to house a plurality of devices comprising two or more connected tines, where the storage container is able to be accessed to insert a device comprising two or more connected tines and then sealed to control the atmosphere within the storage container. The storage container can be indexed to allow correlation of the position of a device comprising two or more connected tines in the storage container with the identity of the samples on the device comprising two or more connected tines.

A coating 'covers' and/or 'coats' a surface when the coating has contacted the surface and a portion of the coating remains in contact with the surface.

A 'phase' is a part of a sample that is at least partially immiscible with other part(s) of the sample. Examples of phases are solid, liquid and gas phases.

The phrase 'ionizing species' means a source of energy that is sufficient to form a charged ion from a neutral molecule. Examples of ionizing species include electrons (e.g., EI), charged reagent gases (e.g., CI), fast atoms (e.g., FAB), ions (e.g., SI, ESI), photons (e.g. LD) and metastable neutrals (e.g., DART).

A. Active Ionization

DESI

Desorption Electrospray Ionization (DESI) is an atmospheric ionizer of analytes. DESI occurs when a gas under high pressure is use to project a stream of highly charged liquid particles onto a surface in order to desorb ions at atmospheric pressure into the space above the surface. Thus, DESI utilizes a liquid to complete the desorption ionization. The desorbed ions can be pulled into the vacuum envelope of a mass spectrometer inlet for subsequent mass determination or ion mobility determination. In these circumstances, the transfer of ions into the inlet of the MS relies in large part on the action of the vacuum to draw the ions into the MS inlet. MS sources often contain multiple pumping stages separated by small orifices, which serve to reduce the gas pressure along the path that the ions of interest travel to an acceptable level for mass analysis; these orifices also operate as ion focusing lenses when an electrical potential is applied to their surface.

Laser Vaporization

Laser vaporization is the process of irradiating a solid or liquid surface with a laser beam. At low laser flux, the material is heated by the absorbed laser energy and ablates, evaporates or sublimates. At high laser flux, the material can be converted to plasma. Laser vaporization can refer to removing material with a pulsed laser, or a continuous wave laser beam. Laser vaporization can generate ions of the ablated sample. Laser vaporization can be combined with other ionization methods in order to volatilize and ionize a sample. For example, laser ablation can be combined with electrospray ionization.

DART®

DART® is another atmospheric ionization method suitable for the analysis of analytes. Various embodiments of DART® are described in U.S. Pat. No. 7,112,785 to Laramee (hereinafter referred to as the '785 patent) which are herein expressly incorporated by reference in their entireties. The '785 patent is directed to desorption ionization of molecules from surfaces, liquids and vapor using a carrier gas containing reactive species (RS). The DART® atmospheric ionizer can use a large volume of carrier gas, e.g., helium is suitable although other inert gases that can generate RS can be used.

Nitrogen DART

An atmospheric ionizer can ionize analyte molecules without the use of solvents to dissolve the analyte. The ionization occurs directly from solids and liquids. Molecules present in the gas phase can also be ionized by the reactive species exiting the atmospheric ionizer. In an embodiment of the invention, the reactive species utilized can be excited nitrogen atoms or molecules. In an embodiment of the invention, the reactive species can produce long lived metastables to impact the analyte molecules at atmospheric pressure and effect ionization.

The recent commercialization of a DART® atmospheric ionizer with increased capability for functioning with naturally abundant nitrogen as the metastable carrier gas is a significant advance. This can enable the utilization of the DART® atmospheric ionizer in more diverse climates, and with minimal requirement for compressed gases or any liquids commonly used with alternative atmospheric ionization systems. In an embodiment of the invention, processing of ambient air to remove the oxygen can be accomplished by placing a tube containing an oxygen scavenger in the path of gas flow from the air to the inlet of the DART® atmospheric ionizer. An oxygen absorbent (see U.S. Pat. No. 4,127,503 to Yoshikawa et al., which is incorporated by reference in its entirety) such as a mixture of finely divided moist $Fe_2O_3$ and KCl can be used to reduce the level of oxygen present in an air stream. In an alternative embodiment of the invention, a process for separating air by cryogenic distillation (U.S. Pat. No. 7,219,514 to Gamier et al., which is incorporated by reference in its entirety) using an apparatus comprising a medium-pressure column and a low-pressure column that are thermally coupled, where a quantity of compressed and purified air is cooled in an exchange line down to a cryogenic temperature and is sent at least partly to the medium-pressure column, and a nitrogen-enriched stream is sent from the medium-pressure column to the low-pressure column and the nitrogen-enriched stream can be withdrawn from the low-pressure column. In another embodiment of the invention, an oxygen absorbent can be used in combination with cryogenic distillation to further reduce the level of oxygen present in the nitrogen-enriched stream or more efficiently reduce the level of oxygen. An atmospheric ionizer therefore can be an ideal device for sampling of confined spaces into which introduction of solvents to mix with analytes might create an unstable chemical condition.

Gas-Ion Separator (GIS)

In various embodiments of the invention, devices and methods for transferring analyte ions desorbed from the sorbent surface using an atmospheric analyzer into the inlet of a mass spectrometer can utilize a Gas-Ion Separator (GIS). Embodiments of this invention include devices and methods for collecting and transferring analyte ions and/or other analyte species formed within a carrier to the inlet of a mass spectrometer.

In an embodiment of the invention, one or both the inlet and the outlet GIS tubing can be made of one or more materials selected from the group consisting of stainless steel, non-magnetic stainless steel, steel, titanium, metal, flexible metal, ceramic, silica glass, plastic and flexible plastic. In an embodiment of the invention, the GIS tubing can range in length from 10 millimeters to 10 meters. In an embodiment of the invention, the GIS tubing can be made of non-woven materials. In an embodiment of the invention, the GIS tubing can be made from one or more woven materials.

In various embodiments of the invention, a GIS comprising two or more co-axial tubes with a gap between the tubes and a vacuum applied in the gap region is used to allow large volumes of carrier gas to be sampled. In various embodiments of the invention, a GIS is made up of an inlet tube and an outlet tube. In an embodiment of the invention, the proximal end of the inlet tube is closest to the sorbent surface and the distal end of the inlet tube can be some distance away from the proximal end where a vacuum can be applied. In various embodiments of the invention, the proximal end of the outlet tube is adjacent the distal end of the inlet tube and the distal end of the outlet tube enters the spectroscopy system.

Sorbent Material

In an embodiment of the present invention, a sorbent material is applied to a mesh or to a grid. The sorbent material can be selected from the group consisting of normal phase, reverse phase (e.g., C4, C8, C18, amino, cyano, phenyl, nitrile, pentafluorophenyl), anionic phase material (e.g., SAX), cationic phase material (e.g., SCX), polydimethylsiloxane, polydivinylbenzene, poly(methacrylic acid), poly(divinylbenzene-co-methacrylic acid) and siloxane. In an embodiment of the present invention, the sorbent material is attached to a polymer microsphere with a silica core, e.g., a 3-(methacryloxy)propyl trimethoxysilane modified silica core. In an alternative embodiment of the present invention, the sorbent material is attached to a bead with a silica core. The resulting sorbent material can be selected from the group consisting of C4 silica, C8 silica, C18 silica, pure silica, cyano bonded silica, phenyl bonded silica, anionic phase silica (e.g., triethylammonium silica, cetyltriethylammonium silica), cationic phase silica (e.g., polyamine silica, pyrazolyl silica, pyrazolyl C8 silica, pyrazolyl C18 silica), mixed anionic/cationic silica, polydimethylsiloxane silica, polydivinylbenzene silica, poly(methacrylic acid) silica, poly(divinylbenzene-co-methacrylic acid) silica and siloxane silica. The size of the beads can range from 1 micron to 100 micron in diameter. In an embodiment of the present invention, the sorbent material is attached to a nanobead. The size of the nanobeads can range from 10 nanometers to 1000 nanometers in diameter. The sorbent material (either as a compound or as a column which can then be unpacked)

can be purchased from a variety of suppliers including ACE, Alibaba, All Thigs RO, Aurora Borealis Control, B&W Megtec, Canadian Life Sciences, ES Industries Inc., GE Healthcare, GS Tek, Hamilton, Hichrom, iChromatography, Jordi Labs LLC, Merck, MZ Analysentechnik, Rose Scientific Ltd., Separation Methods Technologies, Inc. Sigma, SiliCycle Inc., Spectrum, Supelco, ThermoFischer and YMC America, Inc. In various embodiments of the present invention, the sorbent material is mixed with a liquid to form a slurry to apply the sorbent material to a surface. Examples of liquids include acetone, acetonitrile, DMF, DMSO, ether, ethanol, methanol, propanol, TEAP/water, TFA/water, THF, and water. In various embodiments of the present invention, the sorbent material is mixed with a liquid to form a colloidal dispersion. In an embodiment of the present invention, the sorbent material is applied to a grid or mesh. In an embodiment of the present invention, the sorbent material can then be introduced into contact with the sample. In an alternative embodiment of the present invention, the sample can then be introduced into contact with the sorbent material. The sample related materials are collected by the sorbent material in preparation for analysis. Analysis can include exposure of the sorbent material to a reactive species (RS) in order to ionize analyte species (AS) present on the sorbent material and transfer the AS to an analytical spectroscopy detection system.

In an embodiment of the invention, collection of chemical vapors for analysis can be carried out by using a sorbent material such as but not limited to Tenax, silica gel, charcoal, alumina and more recently fullerenes. In various embodiments of the invention, a wide variety of chemical analysis methods can utilize various solvents to enable trace detection of substances of interest. In an alternative embodiment of the invention, sorbent materials can be chemically modified to permit enhanced capability for retention of specific analyte molecules or classes of chemicals thereby improving the potential for detection of those analyte molecules. In an embodiment of the invention, a sorbent material can be heat stable to permit reuse. In an alternative embodiment of the invention, a sorbent material can be consumed in the process of the analysis. In the case of desorption ionization at ambient pressure the sorbent material provides a substrate for the desorption ionization event when it is positioned at the distal end (i.e., in front) of the atmospheric ionizer or in contact with the gas or ionized liquid droplets exiting the atmospheric ionizer. In an embodiment of the invention, the sorbent material can be derivatized with a specific reactive group to react with specific analyte molecules of interest (e.g., reaction of surface impregnated potassium chloride with volatile nitrate to form nitrosyl chloride). In an alternative embodiment of the invention, the sorbent material can be derivatized with a reactive metal such as gold to form a reactive surface for a general analyte molecule of interest.

Mesh or Grid

Figure 5A:
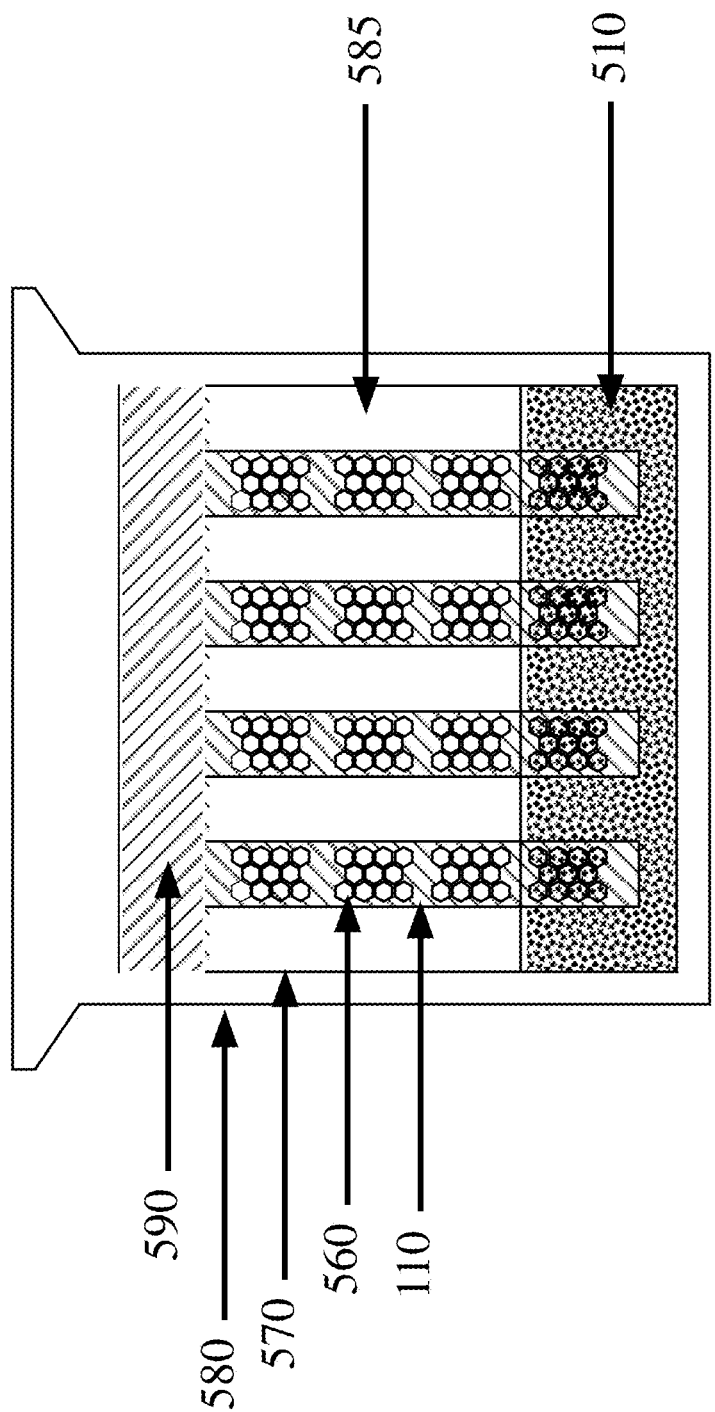
FIG. 5A is a schematic showing a sorbent coated mesh or grid with four (4) tines, where each tine has three (4) areas for analysis resulting in each tine being a quadruple desorption device, where the bottom approximately six (6) mm of the proximate end of the sorbent coated mesh or grid has been dipped in a first sorbent coated material solution, according to an embodiment of the invention.

In an embodiment of the present invention, the mesh or a grid can comprise two or more separate tines 110 clamped in a holder 590. In an alternative embodiment of the present invention, the tines are not separate and the holder is part of the tines 110. In an embodiment of the invention, a plurality of tines 110, where each tine 110 in a mesh or grid is made up of a plurality of meshed or gridded areas. In an embodiment of the present invention, a mesh or a grid is coated with two sorbent materials. As shown in FIG. 5A, a sorbent coated mesh or grid with four (4) tines 110, where each tine 110 has four (4) grid areas 560 for analysis resulting in each tine 110 being a quadruple desorption device, where the bottom six (6) mm of proximate end of the mesh or grid can be immersed in a first beaker 570 within a vessel 580 with an atmosphere 585, where the beaker contains a first solution 510 made up of a first sorbent material to coat the bottom approximately six (6) mm of each tine 110 with the first sorbent material 510. Here, 'approximately' means plus or minus twenty (20) percent. In an embodiment of the invention, the material applied to the tine is allowed to air dry for approximately one (1) to approximately ten (10) minutes. In an alternative embodiment of the invention, the material applied to the tine is allowed to dry in an inert atmosphere such as helium for approximately one (1) to ten (10) minutes. In another embodiment of the invention, the material applied to the tine is allowed to dry for approximately one (1) to twenty-four (24) hours.

The proportion of the tine dipped in the solution to apply the porous substrate is a proportion of the length of the tine. As a result, it is envisioned that in an embodiment of the invention the whole length of the tine is dipped in a first solution, dried and then the whole length of the tine is dipped in a second solution in order to apply a composite of the porous substrates from the first and second solutions. Further, it is also envisioned that the drying time can be altered to change the relative concentration of the two (2) porous substrates. That is, in an embodiment of the invention, the first porous substrate is not allowed to completely dry prior to dipping the tine in a second solution in order to reduce the first porous substrate relative to the second porous substrate.

In an embodiment of the present invention, the dipping solution is generated by mixing two or more solutions, where the two or more solutions are made of miscible liquids each with a different substrate. All tines of the mesh or grid are then dipped in the dipping solution. In an alternative embodiment of the invention, the dipping solution is generated by mixing two or more solutions, where the two or more solutions are made of non-miscible liquids each with a different substrate. All tines of the mesh or grid are then dipped in the dipping solution.

In an embodiment of the present invention, a solution containing a substrate is applied to the mesh or grid while the mesh or grid is spinning to spin coat the porous substrate onto the mesh or grid. In an alternative embodiment of the invention, a first treatment includes the solution can be applied to one or more first tines to apply the porous substrate onto the one or more first tines, while one or more second tines remain intact from the first treatment and allow for a second treatment. In another alternative embodiment of the invention, a first treatment includes the solution can be applied to one or more portions of the first tines to apply the porous substrate onto the one or more portions of the first tines, while one or more portions of the first tines remain intact from the first treatment and allow for a second treatment.

In an embodiment of the present invention, a solution containing a substrate is mixed with an insert stream of gas and sprayed onto the mesh or grid to spray coat the porous substrate onto the mesh or grid. In an alternative embodiment of the invention, a first treatment includes the solution can be sprayed onto one or more first tines to apply the porous substrate onto the one or more first tines, while one or more second tines remain intact from the first treatment and allow for a second treatment. In another alternative embodiment of the invention, a first treatment includes the solution can be sprayed onto one or more portions of the first tines to apply the porous substrate onto the one or more portions of the first tines, while one or more portions of the first tines remain intact from the first treatment and allow for a second treatment.

In an embodiment of the present invention, a solution containing a substrate is loaded into a capillary with a needle and a high voltage applied to the needle in order to electrospray the solution onto the mesh or grid. In an alternative embodiment of the invention, a first treatment includes the solution can be electrosprayed onto one or more first tines to apply the porous substrate onto the one or more first tines, while one or more second tines remain intact from the first treatment and allow for a second treatment. In another alternative embodiment of the invention, a first treatment includes the solution can be electrosprayed onto one or more portions of the first tines to apply the porous substrate onto the one or more portions of the first tines, while one or more portions of the first tines remain intact from the first treatment and allow for a second treatment.

In an embodiment of the present invention, a mesh or grid comprising one or more first tines having a first porous substrate applied and one or more second tines having a second porous substrate applied is inserted into a sample solution, withdrawn after a period of time and then analyzed by directing ionizing species at one or more positions of the one or more first tines and one or more positions of the one or more second tines. In an alternative embodiment of the invention, a mesh or grid comprising one or more first tines having a first porous substrate applied and one or more second tines having a second porous substrate applied is inserted into a mixture of a gas phase sample and a sample solution, withdrawn after a period of time and then analyzed by directing ionizing species at the two or more positions on the one or more first tines and two or more positions on the one or more second tines.

In an embodiment of the present invention, one or more meshes or grids each comprising two or more tines having a porous substrate applied and where at least one of the two or more tines having been inserted into a sample solution or otherwise having contacted a sample, where the one or more meshes or grids can be stored in a sealable controlled atmosphere mesh or grid container for later analysis. In an alternative embodiment of the invention, the mesh or grid container contains a desiccant to control the atmosphere in the container. In an embodiment of the invention, the mesh or grid container is opaque to reflect UV and other wavelength light. In an alternative embodiment of the invention, the mesh or grid container contains an indicator to monitor the moisture in the container. In an embodiment of the invention, the mesh or grid container contains a pH indicator to monitor the acidity in the container. In an embodiment of the invention, the mesh or grid container has a translucent area to allow viewing of the indicator.

Figure 6:
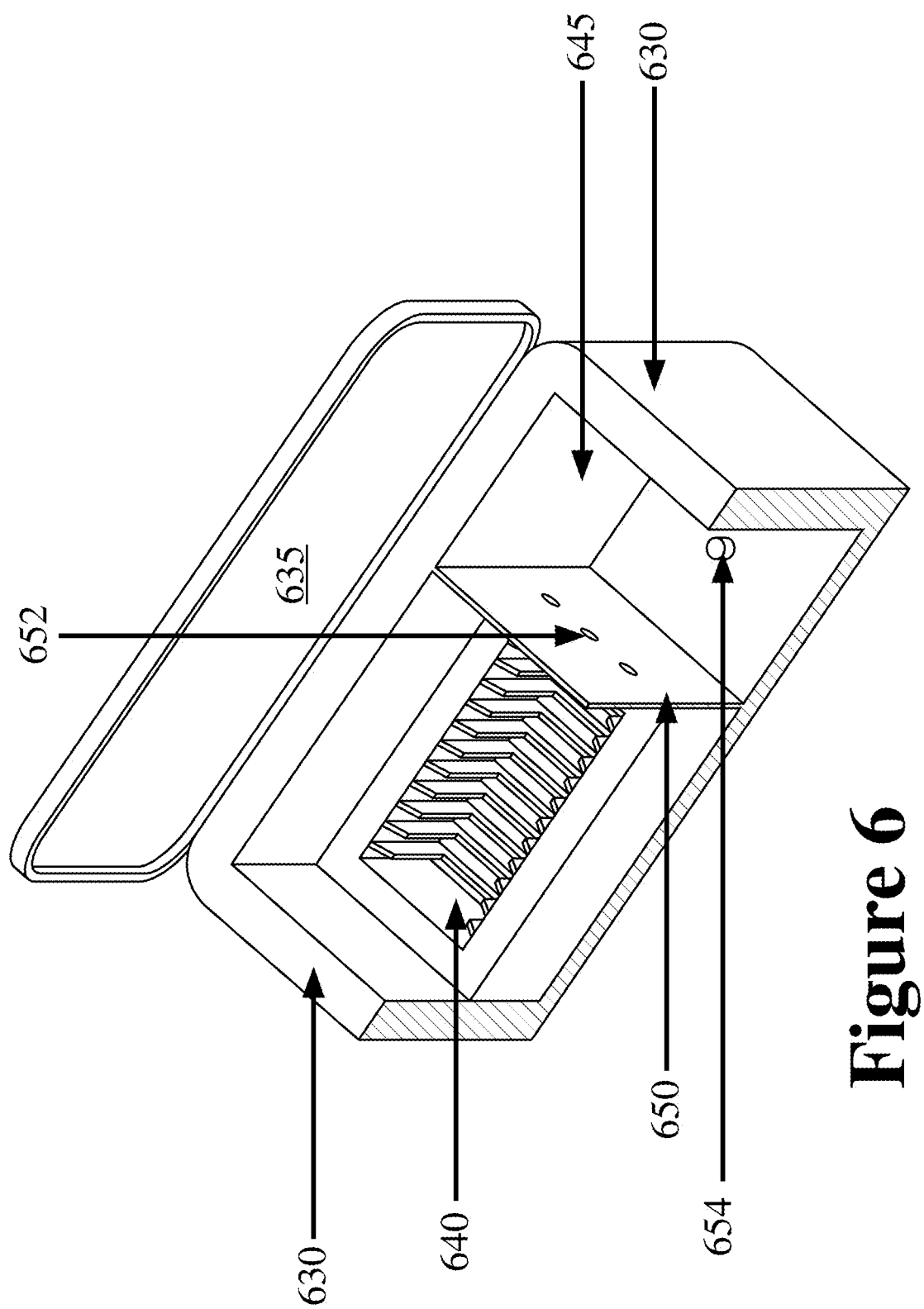
FIG. 6 shows a cut away diagram of a storage container, according to an embodiment of the invention.
Figure 7:
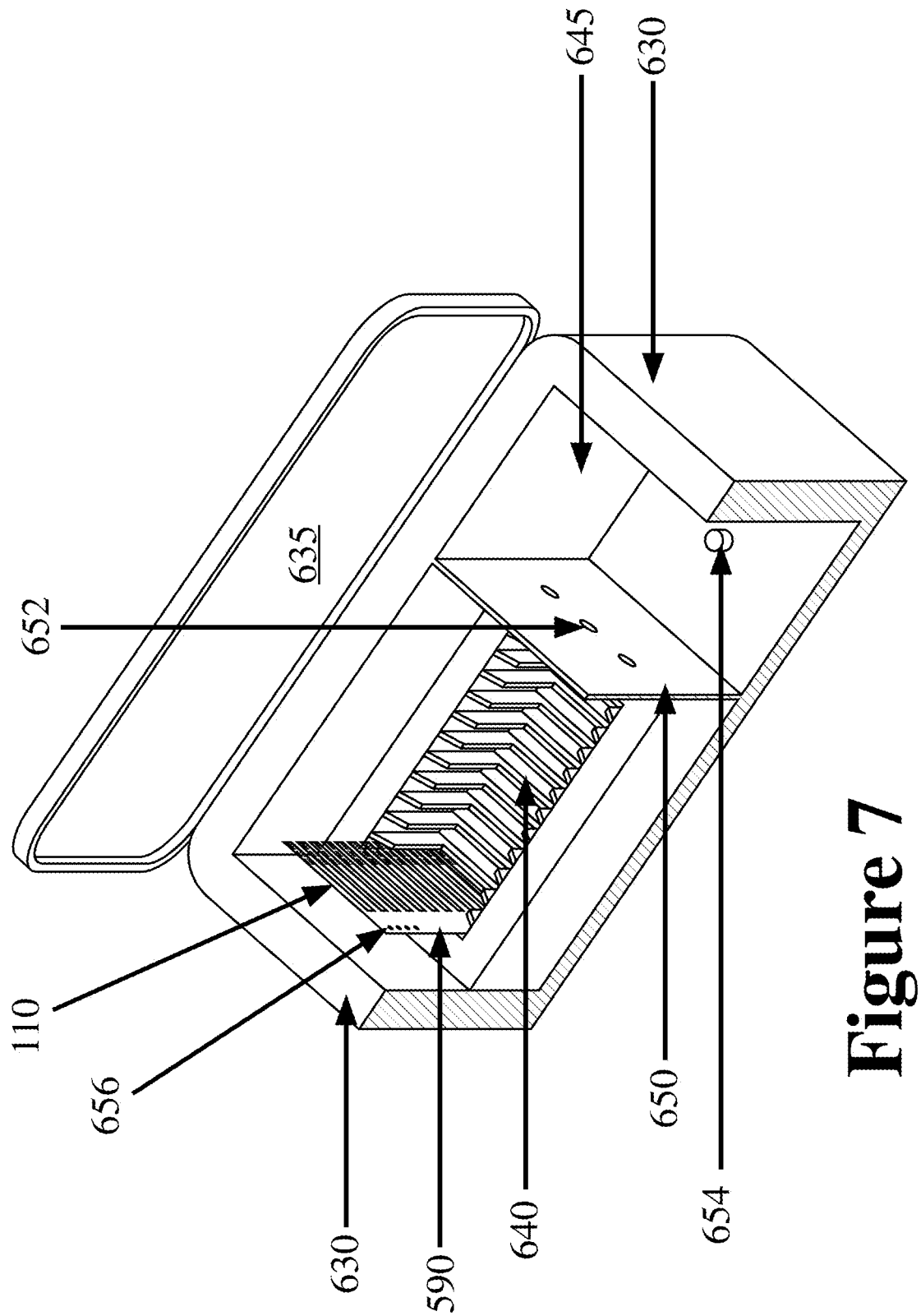
FIG. 7 shows a cut away diagram of a single device with twelve connected tines inserted in a storage container capable of storing eight or more such devices, according to an embodiment of the invention.
Figure 8:
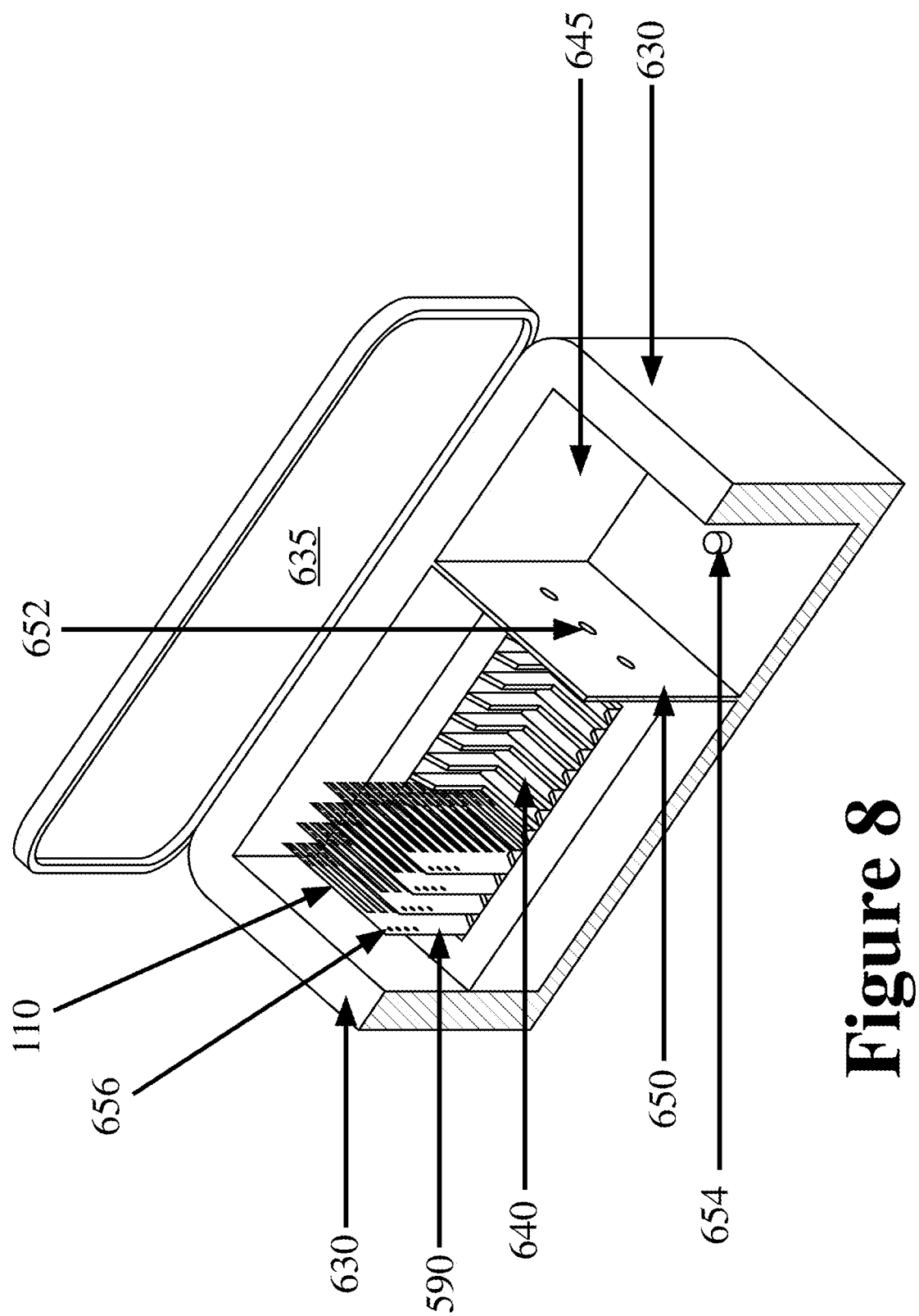
FIG. 8 shows a cut away diagram of four devices each comprising twelve connected tines inserted in a storage container, according to an embodiment of the invention.
Figure 9:
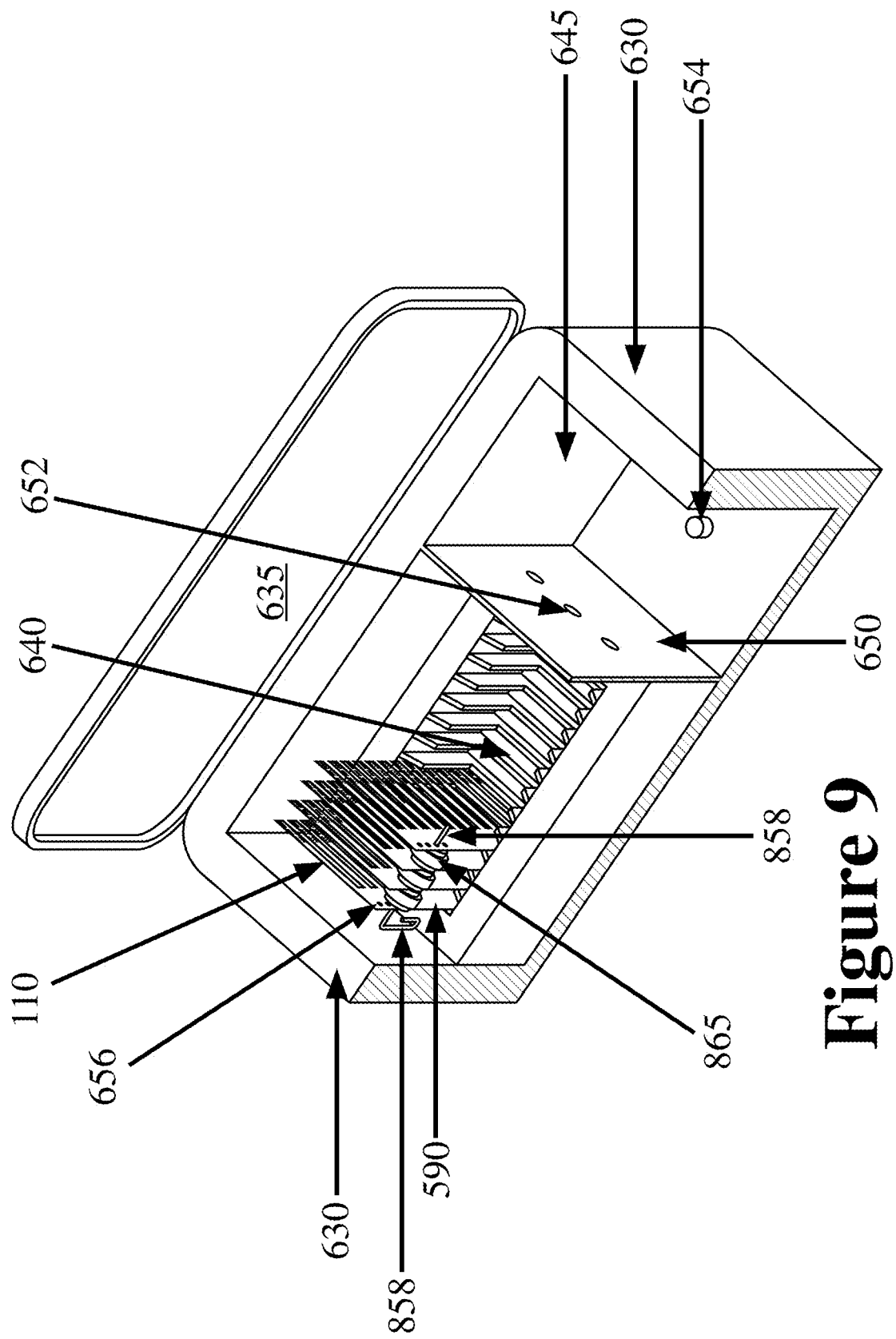
FIG. 9 shows a cut away diagram of four devices each comprising twelve connected tines inserted in a storage container with a register to handle and separate the four devices, according to an embodiment of the invention.

FIG. 6 shows a cut away diagram of a storage container 630 with slots 640 designed to allow the storage container 630 to store twelve devices (not shown). The storage container 630 can be divided into an area holding devices (not shown) and a reagent compartment 645 by a wall 650. FIG. 7 shows a cut away diagram of a single device 656 with twelve connected tines 110 inserted in a storage container 630 with slots 640 designed to allow the storage container 630 to store twelve devices 656. The storage container 630 can be divided into an area holding devices 656 and a reagent compartment 645 by a wall 650. The device can be inserted into the storage container 630 using a holder 590. The holder 590 can be used to retain the device 656 in the slot 640 and thereby insure that the sample is not degraded. One or more reagent compartments 645 within the storage container 630 can contain one or more reagents 654. The reagent compartment(s) can be separated from the area containing the devices 656 by a wall 650 that can have holes 652 to allow the atmosphere including gasses in the reagent compartment 645 to enter the atmosphere in the entire storage container 630. The storage container 630 is able to be accessed through one or more hinged lids 635 to insert a device comprising two or more connected tines 110 and then the hinged lid 635 closed or the storage container otherwise sealed to control the atmosphere in the separate compartment 645 within the storage container 630. The storage container 630 is able to be accessed through one or more hinged lids 635 to replenish the one or more reagents 654. The storage container 630 can be indexed to allow correlation of the position of a device 656 comprising two or more connected tines 110 in the storage container 630 with the identity of the samples on the device 656 comprising two or more connected tines 110. FIG. 8 shows a cut away diagram of four devices 656 each comprising twelve connected tines 110 inserted in a storage container 630. FIG. 9 shows a cut away diagram of four devices 656 each comprising twelve connected tines 110 inserted in a storage container 630 with a register 858 to hold multiple devices 656 and spacers 865 to separate the four devices 656. an indexing rod designed to insert the mesh or grid into the sealable container.

In an embodiment of the present invention, a UV light sensitive standard (compound) is applied to a first tine of a multiple tine mesh or grid prior to storage of a sample on a second tine to allow confirmation that the sample applied to the second tine of the mesh or grid has undergone no UV light associated degradation during storage. In an alternative embodiment of the invention, a moisture sensitive standard is applied to a first tine of a multiple tine mesh or grid prior to storage of a sample on a second tine to allow confirmation that the sample applied to the second tine of the mesh or grid has undergone no moisture associated degradation during storage. In an alternative embodiment of the invention, an acid sensitive standard is applied to a first tine of a multiple tine mesh or grid prior to storage of a sample on a second tine to allow confirmation that the sample applied to the second tine of the mesh or grid has undergone no acidic degradation during storage. In an alternative embodiment of the invention, a base sensitive standard is applied to a first tine of a multiple tine mesh or grid prior to storage of a sample on a second tine to allow confirmation that the sample applied to the second tine of the mesh or grid has undergone no base degradation during storage.

In an embodiment of the present invention, the mesh and grid can be stored for extended periods of time in an appropriate environment to permit reanalysis of the sample. Utilization of the storage container 630 for storage of samples that might otherwise have to be stored in their native state, as a liquid perhaps, individuals at extremely cold temperatures, reduces the volume of space required for that storage. Further, the reanalysis of samples stored in container (630) may be completed in seconds per sample without requirement for an extended period for sample thaw to room temperature, pipetting, and otherwise extensive sample preparation commonly necessary for completion of biological assays.

In an embodiment of the invention the utilization of the tine samplers and storage container will facilitate more reliable tracking of samples for subsequent analysis by physically linking the samples to each other on each individual tine.

In an embodiment of the invention the retention of samples utilizing a storage device 630 and the samples already prepared for analysis present on each tine facilitates the retention of samples for reanalysis as often required for forensic analysis. In an embodiment of the invention the areas of the tine already examined may be marked as used by placement of solution containing a trace of easily ionized material or materials that when ionized will populate the spectrum reducing the potential for false negative measurements.

In an embodiment of the present invention, the mesh or grid is perforated to allow the bottom portion of one or more tines to be broken off from the holder, in order to submit the bottom portion for analysis. In an alternative embodiment of the invention, the mesh or grid is perforated to allow the bottom portion of one or more tines to be broken off from the remaining mesh or grid to allow separate analysis of the bottom portion and the remainder of the mesh or grid. In an alternative embodiment of the invention, the bottom portion of one or more tines can be clipped from the holder, in order to submit the bottom portion for analysis. In another alternative embodiment of the invention, the bottom portion of one or more tines can be clipped from the remaining mesh or grid to allow separate analysis of the bottom portion and the remainder of the mesh or grid.

Figure 5B:
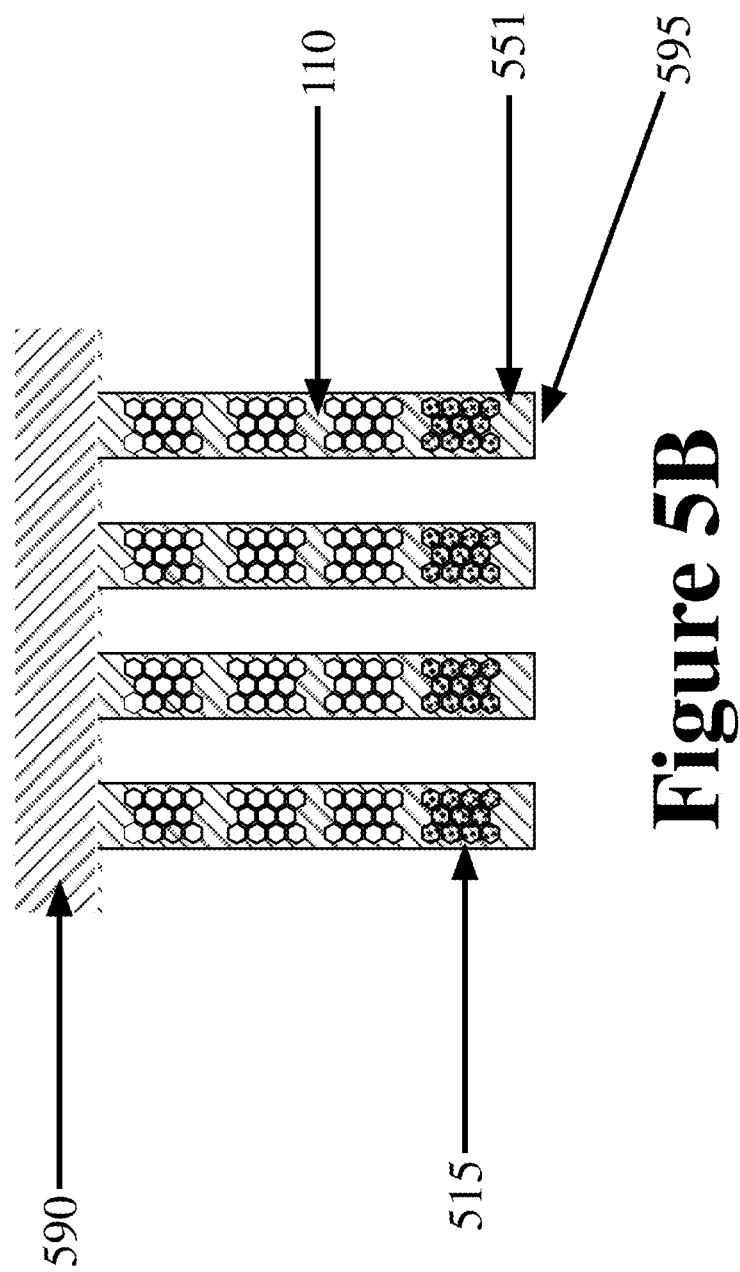
FIG. 5B is a schematic showing the sorbent coated mesh or grid of FIG. 5A in which the bottom approximately six (6) mm of the proximate end of the sorbent coated mesh or grid has been dipped in a first sorbent coated material solution, according to an embodiment of the invention.

As shown in FIG. 5B the sorbent coated mesh or grid of FIG. 5A attached to the holder 590 in which the bottom approximately six (6) mm of the proximate end 595 of the sorbent coated mesh or grid has been dipped in the first sorbent coated material solution results in the bottom approximately six (6) mm of the proximate end 595 of each tine 110 being coated with the first sorbent material 551 including the proximate grid area 515, according to an embodiment of the invention. Here, 'approximately' means plus or minus twenty (20) percent.

Figure 5C:
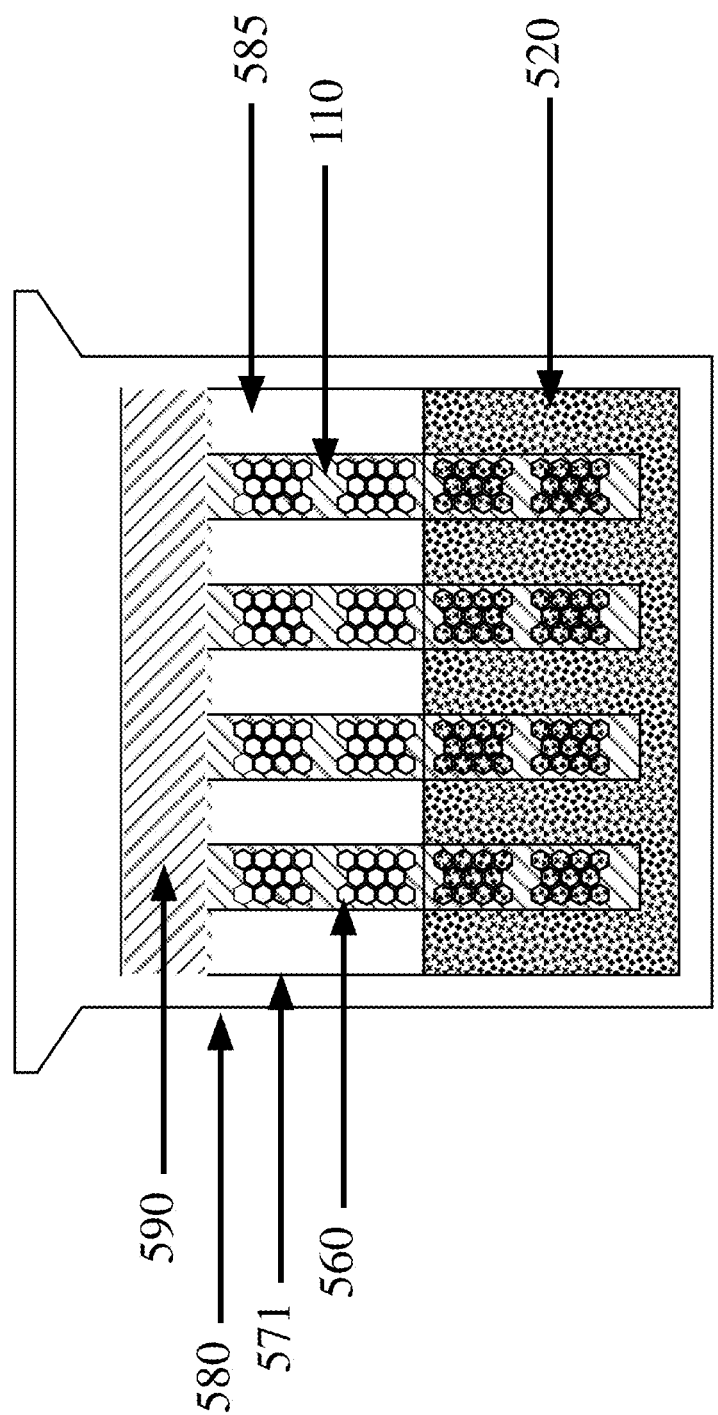
FIG. 5C is a schematic showing the sorbent coated mesh or grid of FIG. 5B which has been placed in a second vessel containing a second sorbent coated material solution such that the bottom approximately twelve (12) mm of the proximate end of the sorbent coated mesh or grid is immersed in the second sorbent coated material solution, according to an embodiment of the invention.

The proximate end of the same mesh or grid can be immersed in a second beaker 571 within the vessel 580 containing a second sorbent coated material solution 520 containing a second sorbent material to coat the bottom approximately twelve (12) mm of the proximate end of each tine 110 with the second sorbent material 520, as shown in FIG. 5C. Here, 'approximately' means plus or minus twenty (20) percent. The uncoated grid area 560 is exposed only to the atmosphere 585 inside the vessel 580. As shown in FIG. 5D the sorbent coated mesh or grid of FIG. 5C attached to the holder 590 has a first grid area 515 corresponding to a mixture of the first sorbent material and the second sorbent material, i.e., the coated tine 552 and the grid area 515 will have both materials closest to the proximate end 595, and a second grid area 525 will have the second sorbent material alone. Each tine 110 changes physical characteristics from coated 552 to uncoated 110.

Figure 5E:
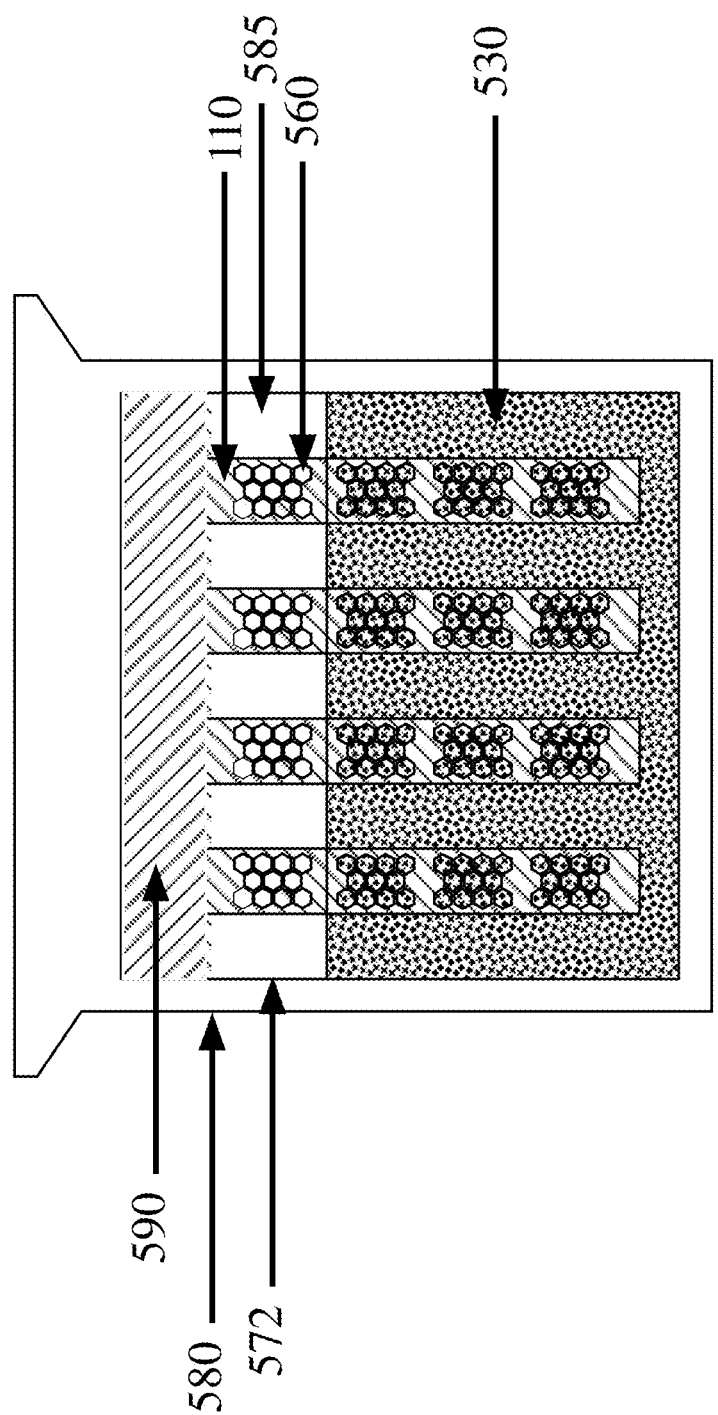
FIG. 5E is a schematic showing the sorbent coated mesh or grid of FIG. 5D which has been placed in a third vessel containing a third sorbent coated material solution such that the bottom approximately eighteen (18) mm of the proximate end of the sorbent coated mesh or grid has been immersed in the third sorbent coated material solution, according to an embodiment of the invention.
Figure 5F:
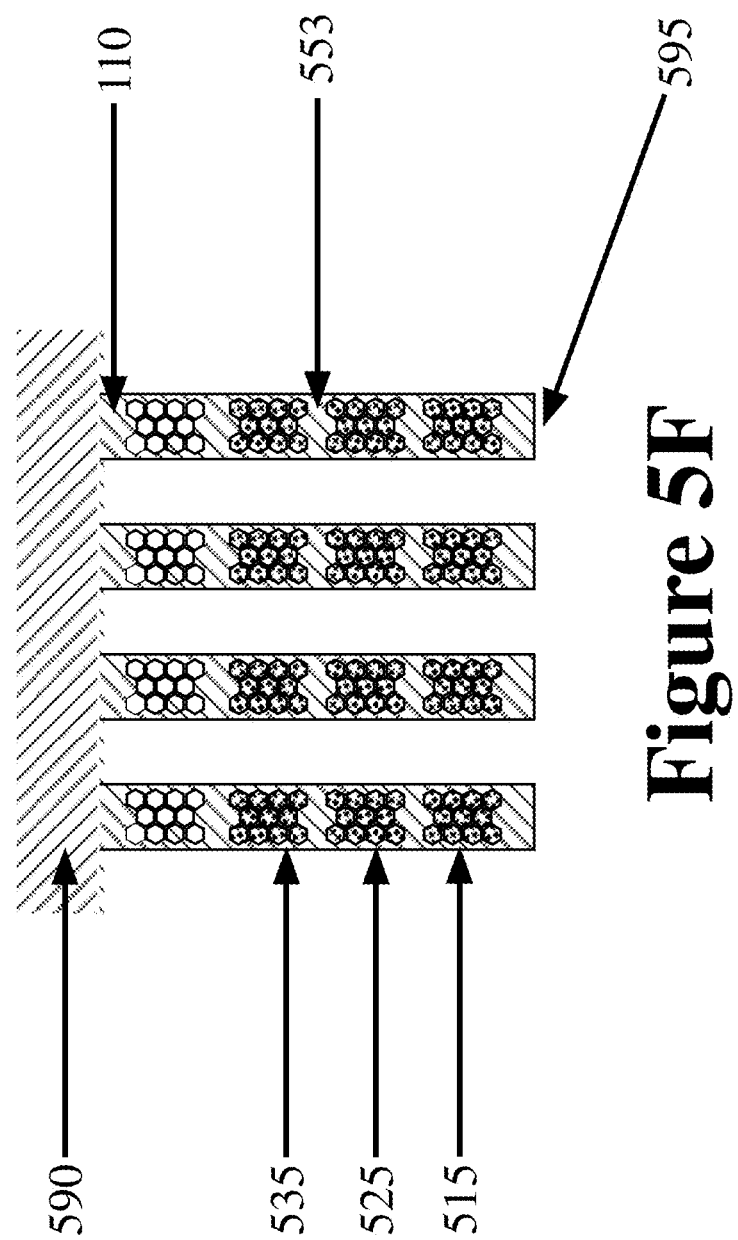
FIG. 5F is a schematic showing the sorbent coated mesh or grid of FIG. 5E in which the bottom approximately six (6) mm of the proximate end of the sorbent coated mesh or grid has been dipped in a first, a second and a third sorbent coated material solution, while the area corresponding to the bottom approximately twelve (12) mm to the bottom approximately six (6) mm of the proximate end of the sorbent coated mesh or grid has been dipped in the second and the third sorbent coated material solution, while the area corresponding to the bottom approximately eighteen (18) mm to the bottom approximately twelve (12) mm of the proximate end of the sorbent coated mesh or grid has been dipped in the third sorbent coated material solution, according to an embodiment of the invention.

In an alternative embodiment of the present invention, a mesh or a grid is coated with three or more sorbent materials. The proximate end 595 of the same tine 110 as shown in FIG. 5D can be immersed in a third beaker 572 within the vessel 580 containing a third sorbent coated material solution 530 containing a third sorbent material to coat the bottom approximately eighteen (18) mm of the proximate end 595 of each tine 110 with the third sorbent material 530, as shown in FIG. 5E. The uncoated grid area 560 is exposed only to the atmosphere 585 inside the vessel 580. The resulting sorbent coated mesh or grid of the treatment shown in FIG. 5E attached to the holder 595 is shown in FIG. 5F, in which the bottom approximately six (6) mm of the proximate end 595 of the tines 110 is coated in a first 510, a second 520 and a third sorbent coated material solution 530, while the area corresponding to the bottom approximately twelve (12) mm to the bottom approximately six (6) mm of the proximate end 595 of the tines 110 has been dipped in the second 520 and the third sorbent coated material solution 530, while the area corresponding to the bottom approximately eighteen (18) mm to the bottom approximately twelve (12) mm of the proximate end 595 of the tines 110 has been dipped in the third sorbent coated material solution 530. Here, 'approximately' means plus or minus twenty (20) percent. In FIG. 5F, a first grid area 515 corresponding to a mixture of the first sorbent material, the second sorbent material and the third sorbent material, a second grid area 525 corresponding to a mixture of the second sorbent material and the third sorbent material and a third grid area 535 corresponding to the third sorbent material alone, according to an embodiment of the invention. In FIG. 5F, each tine 110 is coated with the third sorbent material 553, according to an embodiment of the invention. Here, 'approximately' means plus or minus twenty (20) percent.

Figure 5G:
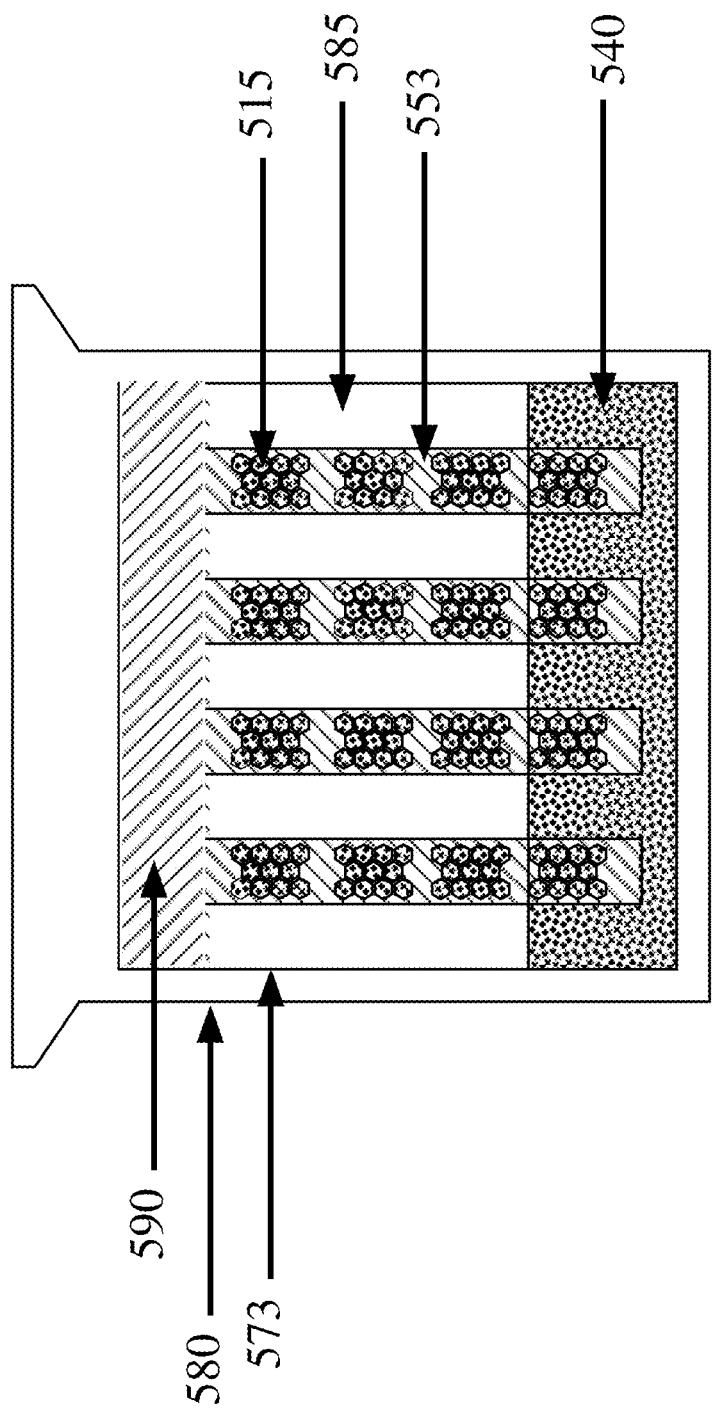
FIG. 5G is a schematic showing the sorbent coated mesh or grid of FIG. 5F in which the bottom approximately six (6) mm of the distal end of the sorbent coated mesh or grid has been immersed in a fourth sorbent coated material solution, according to an embodiment of the invention.
Figure 5H:
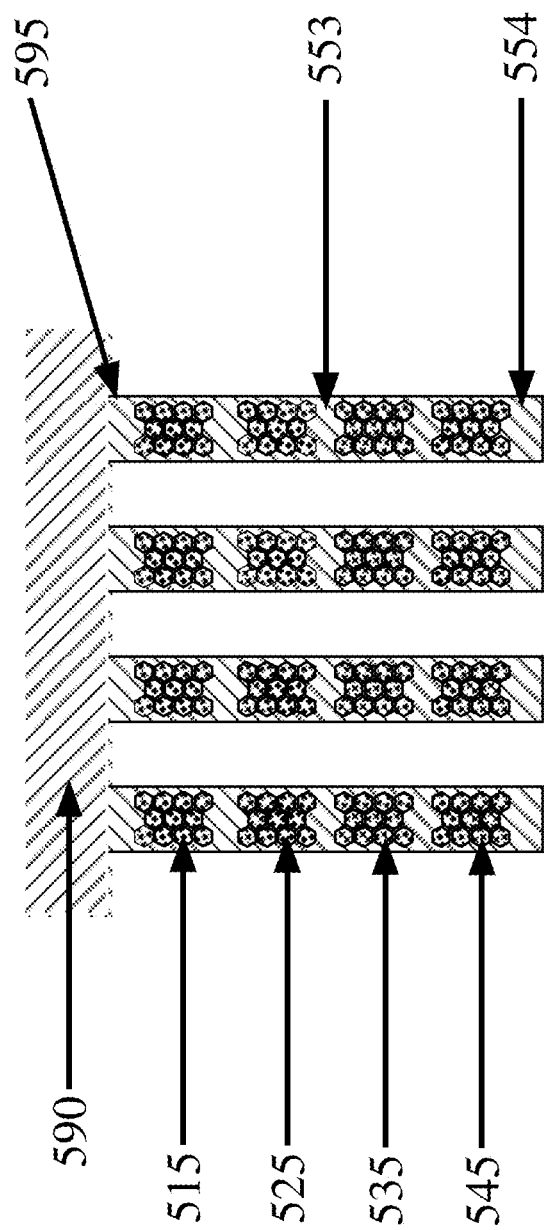
FIG. 5H is a schematic showing the sorbent coated mesh or grid of FIG. 5G in which the bottom approximately six (6) mm of the proximate end of the sorbent coated mesh or grid has been dipped in a first, a second and a third sorbent coated material solution, while the area corresponding to the bottom approximately twelve (12) mm to the bottom approximately six (6) mm of the proximate end of the sorbent coated mesh or grid has been dipped in the second and the third sorbent coated material solution, while the area corresponding to the bottom approximately eighteen (18) mm to the bottom approximately twelve (12) mm of the proximate end of the sorbent coated mesh or grid has been dipped in the third sorbent coated material solution and the bottom approximately six (6) mm of the distal end of the sorbent coated mesh or grid has been dipped in a fourth sorbent coated material solution, according to an embodiment of the invention.

In an alternative embodiment of the present invention, a mesh or a grid is coated with four or more sorbent materials. In an embodiment of the present invention, the procedure outlined above can be iterated to produce N sorbent materials, where N is an integer. In an alternative embodiment of the present invention, as shown in FIG. 5G, the mesh or grid, treated as described in FIG. 5F, can then be released from the holder 590 used to clamp the tines and the tines 110 can be reversed to clamp the proximate end 595 or otherwise the bottom six (6) mm of the distal end of the coated tines 553 and the uncoated distal end of the tines can be immersed in a fourth beaker 573 within the vessel 580 containing a fourth solution 540 made up of a fourth sorbent material to coat the bottom approximately six (6) mm of the distal end of the tines 110 with the fourth sorbent material. Here, 'approximately' means plus or minus twenty (20) percent. As shown in FIG. 5G the sorbent coated mesh or grid has a first grid area 515 corresponding to a mixture of the first sorbent material, the second sorbent material and the third sorbent material. The proximate end 595 of the tines are exposed only to the atmosphere in the vessel 580, according to an embodiment of the invention. As shown in FIG. 5H, according to an embodiment of the invention the resulting sorbent coated mesh or grid has a first grid area 515 corresponding to a mixture of the first sorbent material, the second sorbent material, and a third sorbent material which is closest to the proximate end 595 held in the holder 590, a second grid area 525 corresponding with the second sorbent material which is adjacent the first grid area 515, a third sorbent material, a third grid area 535 corresponding with the third sorbent material alone adjacent the second grid area 525, and a fourth grid area 545 corresponding with the fourth sorbent material alone which is adjacent the third grid area 535 and closest to the distal end. The coated tine 554 containing the fourth sorbent material changes in physical property to the coated tine 553 containing at least the third sorbent material, according to an embodiment of the invention.

In a further alternative embodiment of the present invention, a mesh or a grid can be coated with only two sorbent materials. As shown in the above examples, the bottom six (6) mm of proximate end 595 of the mesh or grid can be dipped in a first solution 510 containing a first sorbent material to coat the bottom half of the mesh or grid with the first sorbent material. Here, 'approximately' means plus or minus twenty (20) percent. After drying, the distal end of the same mesh or grid can be dipped in a second solution 540 containing a second sorbent material to coat the bottom half of the mesh or grid with the second sorbent material. The resulting sorbent coated mesh or grid has a first grid area 515 corresponding to a first sorbent material alone and a second grid area 545 corresponding with the second sorbent material alone.

In an embodiment of the invention, a sorbent coated mesh or grid can provide for the rapid inspection of more than one phase of a sample. In an embodiment of the present invention, a mesh or a grid containing multiple tines can be used to analyze the two or more phases of a sample. FIG. 1 is a schematic diagram of mesh or grid made up of four (4) tines, where each tine has three (3) areas for analysis resulting in each tine being a triple desorption device, inserted in a beaker, where each tine has three (3) areas for analysis and where the proximate area of each of the four (4) tines is fully submersed in the solution in the beaker and the distal area of each of the four (4) tines is not submersed in the solution and thereby available for sampling the gaseous phase, showing the simultaneous liquid and headspace extraction for analysis, according to an embodiment of the invention. Separate tines can be dedicated to control samples or different specimens, while each tine can have multiple areas. In FIG. 1 each tine has three (3) available areas to allow for a first testing at the proximate area and two (2) subsequent testings' of fresh samples at two (2) independent and separate later times points to verify the original analysis.

In an embodiment of the invention, a sorbent coated mesh or grid with multiple tines and/or multiple areas on a tine can provide for a latter verification analysis of a sample. In an embodiment of the invention, such a system would allow rapid and facile verification of test results used in a courtroom setting or other legal or regulatory procedure. In an embodiment of the present invention, a mesh or a grid containing multiple tines can be used to enable sequential analysis of different phases of a sample. FIG. 1 is a schematic diagram of mesh or grid made up of four (4) tines 110 inserted in a beaker 570 inserted in an air tight container 580, where each tine 110 has three (3) areas for analysis and where the proximate area of each of the four tines is fully submersed in the solution 120 in the beaker 570 and the distal are of each of the four tines 110 is not submersed in the solution 120 and thereby available for sampling the gaseous phase 125. FIG. 1 shows the simultaneous liquid extraction at the proximate areas of each of the four (4) tines 110 and headspace extraction at the distal areas of each of the four (4) tines 110 (where the intermediate areas of each of the four (4) tines 110 are sampling both liquid and headspace) for analysis, according to an embodiment of the invention.

Figure 2:
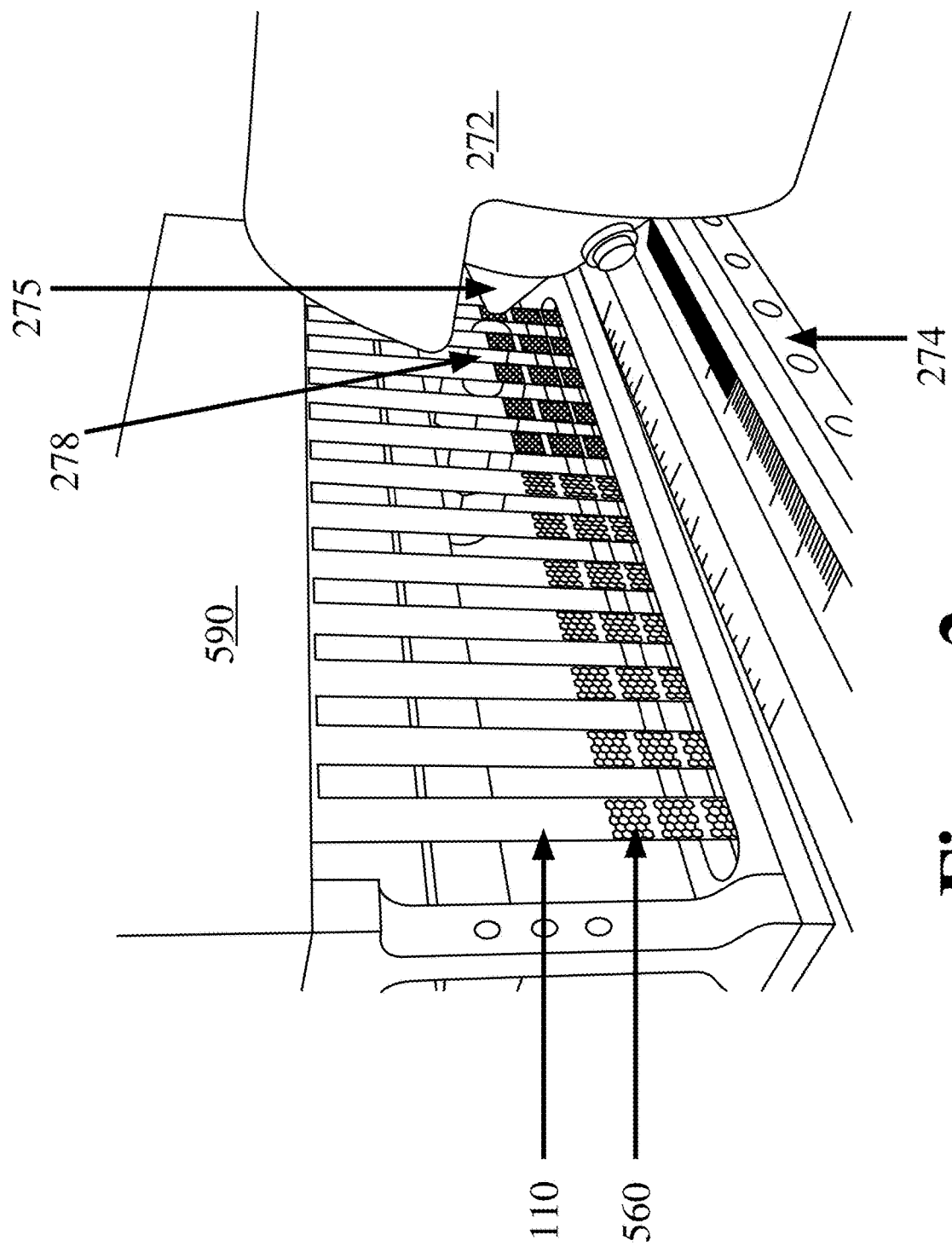
FIG. 2 is a schematic diagram of mesh or grid made up of twelve (12) tines, where each tine has three (3) areas for analysis resulting in each tine being a triple desorption device, where the DART source is aimed at the intermediate area of the eleventh tine in order to analyze the sample present in that area, according to an embodiment of the invention.

FIG. 2 is a schematic diagram of mesh or grid made up of twelve (12) tines 110, clamped into a holder 590 mounted on a Vernier 274, where each tine 110 has three (3) grid areas (proximal, intermediate and distal, where the proximal area is located closest to the portion of the tine which can be held without disturbing or contaminating the samples) 560 for analysis resulting in each tine 110 being a triple desorption device, where a DART source 272 is directing ionizing species from an aperture 275 at the intermediate area of the eleventh tine 110 in order to ionize sample molecules and direct the ions towards the inlet of a spectrometer 278, according to an embodiment of the invention. Application of control samples on alternate tines of a thirteen-tine sample mesh or grid allows for the analysis of six (6) independent samples, where each independent sample has two (2) dedicated neighboring control tines, according to an embodiment of the invention.

Figure 3:
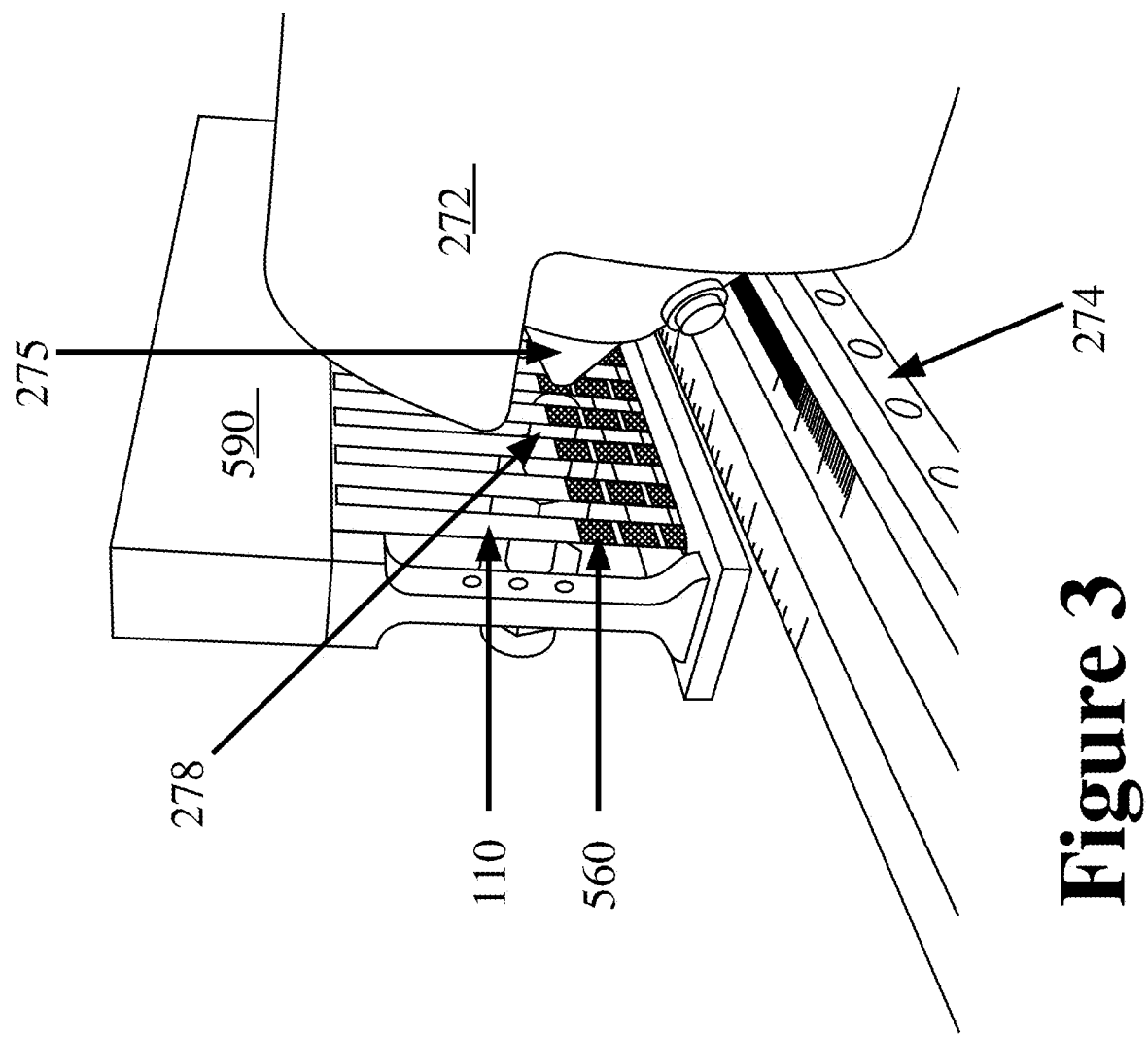
FIG. 3 is a schematic diagram of mesh or grid made up of six (6) tines, where each tine has three (3) areas for analysis resulting in each tine being a triple desorption device, where the DART source is aimed at the distal area of the fourth tine in order to analyze the sample present in that area, according to an embodiment of the invention.

FIG. 3 is a schematic diagram of mesh or grid made up of six (6) tines 110, clamped into a holder 590 mounted on a Vernier 274, where each tine 110 has three (3) grid areas (proximal, intermediate and distal) 560 for analysis resulting in each tine 110 being a triple desorption device, where a DART source 272 is directing ionizing species from an aperture 275 at the intermediate area of the eleventh tine 110 in order to ionize sample molecules and direct the ions towards the inlet of a spectrometer 278, according to an embodiment of the invention, where the DART source is aimed at the distal grid area 560 of the fourth tine 110 in order to analyze the sample present in that area, according to an embodiment of the invention.

Figure 4:
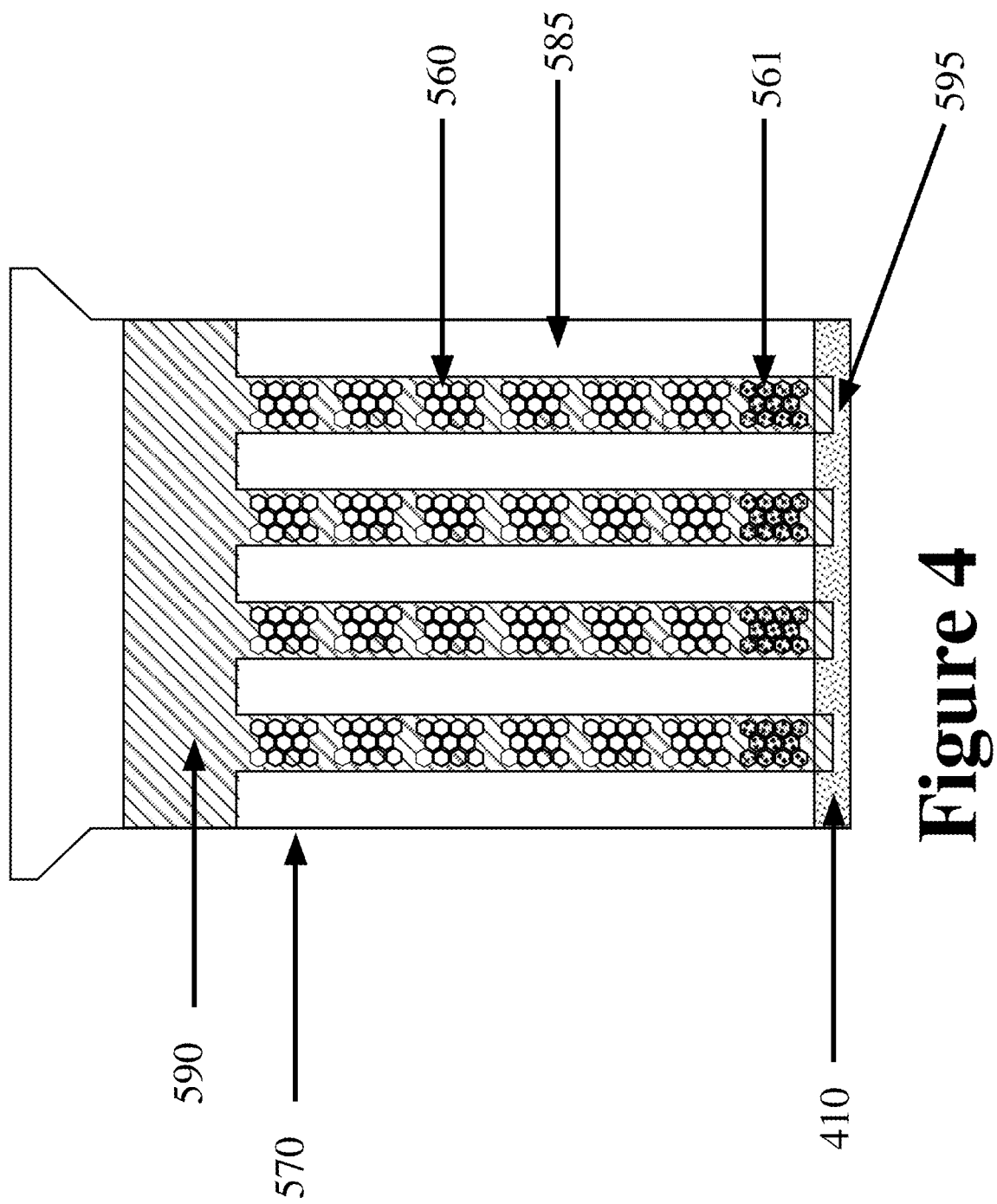
FIG. 4 is a schematic showing a sorbent coated mesh or grid with four (4) tines, where each tine has seven (7) areas for analysis resulting in each tine being a septuple desorption device, where the bottom approximately six (6) mm of the proximate end of the sorbent coated mesh or grid has been dipped in a sorbent coated material solution, where the sorbent coated mesh or grid with four (4) tines is placed in a solution to elute the samples deposited on the sorbent coated mesh or grid, according to an embodiment of the invention.

FIG. 4 is a schematic showing a sorbent coated mesh or grid with four (4) tines 110, where each tine has seven (7) grid areas 560 for analysis resulting in each tine being a septuplet desorption device attached to a holder 590, where the bottom approximately six (6) mm of the proximate end of the sorbent coated mesh or grid has been dipped in a sorbent coated material solution resulting in a sorbent coated grid area 561, where the bottom approximately 1-2 mm of the proximate end 595 of the sorbent coated mesh or grid with four (4) tines 110 is immersed in a beaker 570 containing a solution 410 and an atmosphere 585 to elute the samples deposited on the sorbent coated grid area 561, according to an embodiment of the invention. Here, 'approximately' means plus or minus twenty (20) percent.

In an embodiment of the invention, exposure of a sorbent coated mesh or grid of a single tine to ionizing species heated to a series of increasing temperatures can be used to interrogate the samples present on one or more locations on the sorbent coated mesh or grid of the single tine.

In an embodiment of the invention the simultaneous collection of chemical present in the headspace and in the liquid below the headspace on a single tine links those samples together in space and time thus facilitating more reliable tracking of that chemical.

In an embodiment of the invention the analysis of the headspace and liquid below the headspace on a single tine will provide the analyst with the ability to permit more accurate determination of the concentration of a volatile chemical in the original liquid, from which the chemicals in the headspace were derived, at the time of collection. As accurate determination of the quantity of a chemical in a liquid or solid has utility since the determination of the loss of chemical from the liquid might potentially be used to characterize the time of an event such as chemical environmental contamination, or other criminal activity, thus creating the potential for a more accurate measurement of the origin and time of a human activity.

Figure 12:
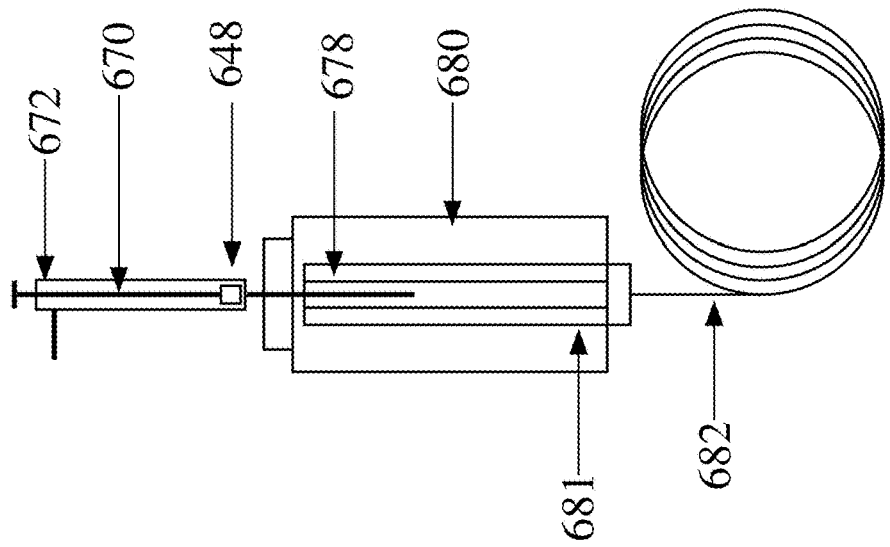
FIG. 12 shows a prior art GC injector being loaded with the chemicals from the headspace gas collected into the volume of the syringe of FIG. 10 in order to permit the analysis of those chemicals using the method of gas chromatography (GC)
Figure 11:
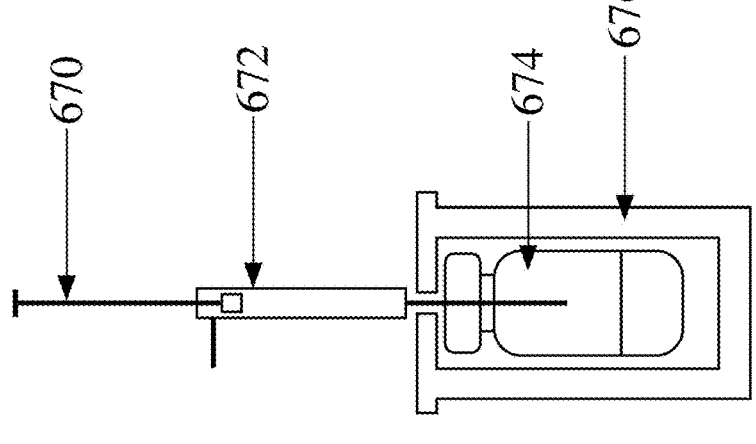
FIG. 11 shows the prior art syringe of FIG. 10 with its needle end inserted through the septum of a vial in order to permit collection of the chemicals in the headspace above the liquid sealed in the vial by the septum.
Figure 10:
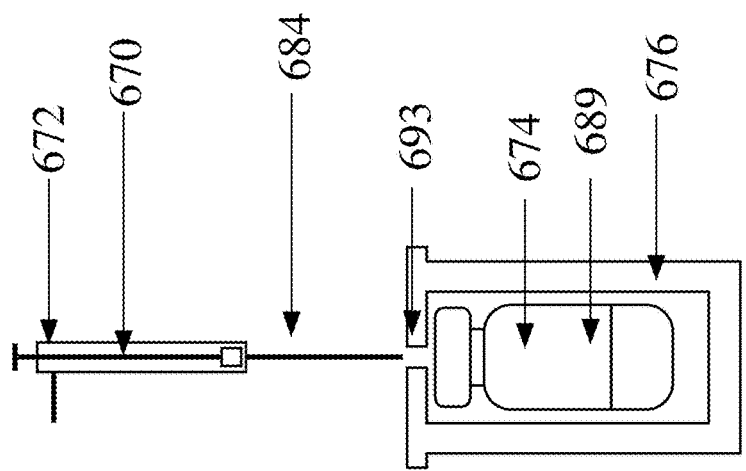
FIG. 10 shows a prior art syringe aligned with the septum of a vial.

When sampling liquids using SPME, the first step of the analysis is to immerse the sorbent coated fiber into the gas, or liquid or headspace above a solid enclosed in a container. The analysis can be improved by either moving the fiber itself or the container holding the sample and the fiber. This movement facilitates interaction between the chemicals in the sample and the sorbent on the fiber. The critical second step of the analytical process is the transfer of compounds trapped on the sorbent coated fiber to an instrument for the analysis to occur. This step typically involves inserting the fiber into a single enclosed region to effect thermal desorption of the target compounds into the gas phase for gas chromatography (GC) or GC/MS analysis. As shown in FIGS. 10-12 for the headspace GC experiment the syringe 672 used to collect a quantity of gas in the headspace 674 above a liquid sample 689 has a hollow needle 684 connected to the syringe 672. The needle is inserted into the headspace volume 674 by pushing the syringe down so that the needle passes through a flexible septum 643 which is pierced. The septum acts to maintain separation between the outside atmosphere and the headspace. A heater block 676 is often used to increase the temperature of the sample vial so that volatile molecules from the sample 689 into the headspace. The headspace sample is drawn into the volume of the syringe 672 by pulling on the syringe plunger 670 as shown in FIG. 11. In FIG. 10 the plunger in depressed before the syringe is pushed through a septum 643 into the headspace region 674 of the sample vial 693. In FIG. 11 the plunger in withdrawn and a portion of the headspace gas drawn up into the syringe 672. The syringe 672 containing the headspace sample is withdrawn from the sample vial by pulling the syringe away from the vial thus removing the needle from the sample vial. In the GC experiment the headspace sample is transferred from the syringe volume into a heated region identified as the injection port 680 as depicted in FIG. 12 by first inserting the needle of the syringe 684 through a flexible septum 648 and then depressing the syringe plunger 670 to expel the gas. Inside the heated injector port a glass liner 678 is used to isolate that the headspace gases from the metal of the heater and this inert liner is designed to minimize retention of chemicals for any length of time. In the gas chromatography instruments the injector volume 678 is maintained at a high temperature in order to efficiently vaporize the compounds from the sorbent coated fiber. Once vaporized the sample exits the injector as the force of flowing gas under high pressure pushes the chemicals through a pressurized fitting 681 into the gas chromatography column 682 which permits separation of two or more of the individual chemicals in the sample from one another. After the individual chemicals spend time in the separation device they exit it and are transferred into the detector for analysis.

In an embodiment of the invention, an alternative application to the prior art analysis of head space volume, the sorbent coated fiber can be inserted into a sample injector loop typically fashioned from a small length of narrow bore capillary tubing (see FIG. 12) in order to complete introduction of a liquid chromatography (LC) or LC/MS system for analysis.

In an embodiment of the invention, in order to complete the introduction of sorbent coated fiber into either the heated, pressurized GC injector, or the loop of a LC system the SPME fiber is protected from interaction with the septum of the injector by positioning it inside a needle 684 (see FIGS. 10-12). The rigid needle is used to puncture the flexible septum 680 which is used to seal this injector hole so that chemicals desorbed from the SPME fiber can only exit the injector by moving into the chromatographic injector volume. Therefore keeping the pressure inside the injector while the needle encasing the SPME fiber is introduced into the injector volume and until the sample is desorbed from that fiber and directed onto the separation column is critical to the prior art. Once the needle has penetrated through the septum the SPME fiber is pushed out of the needle into the open volume of the injector where the heat effects rapid desorption of all chemicals previously bound by the sorbent. The requirement for a syringe needle to be rigid and not bend when being pushed into and through the septum results in the diameter of that metal tube being between approximately 0.2 mm to approximately 0.5 mm. The SPME fiber in prior art therefore does exceed the inside diameter of the syringe. The most popular Solid phase micro extraction (SPME) fibers are commercially available as a polyimide fiber, approximately 300 microns in diameter, with a single type of sorbent materials bound to the surface.

Figure 13:
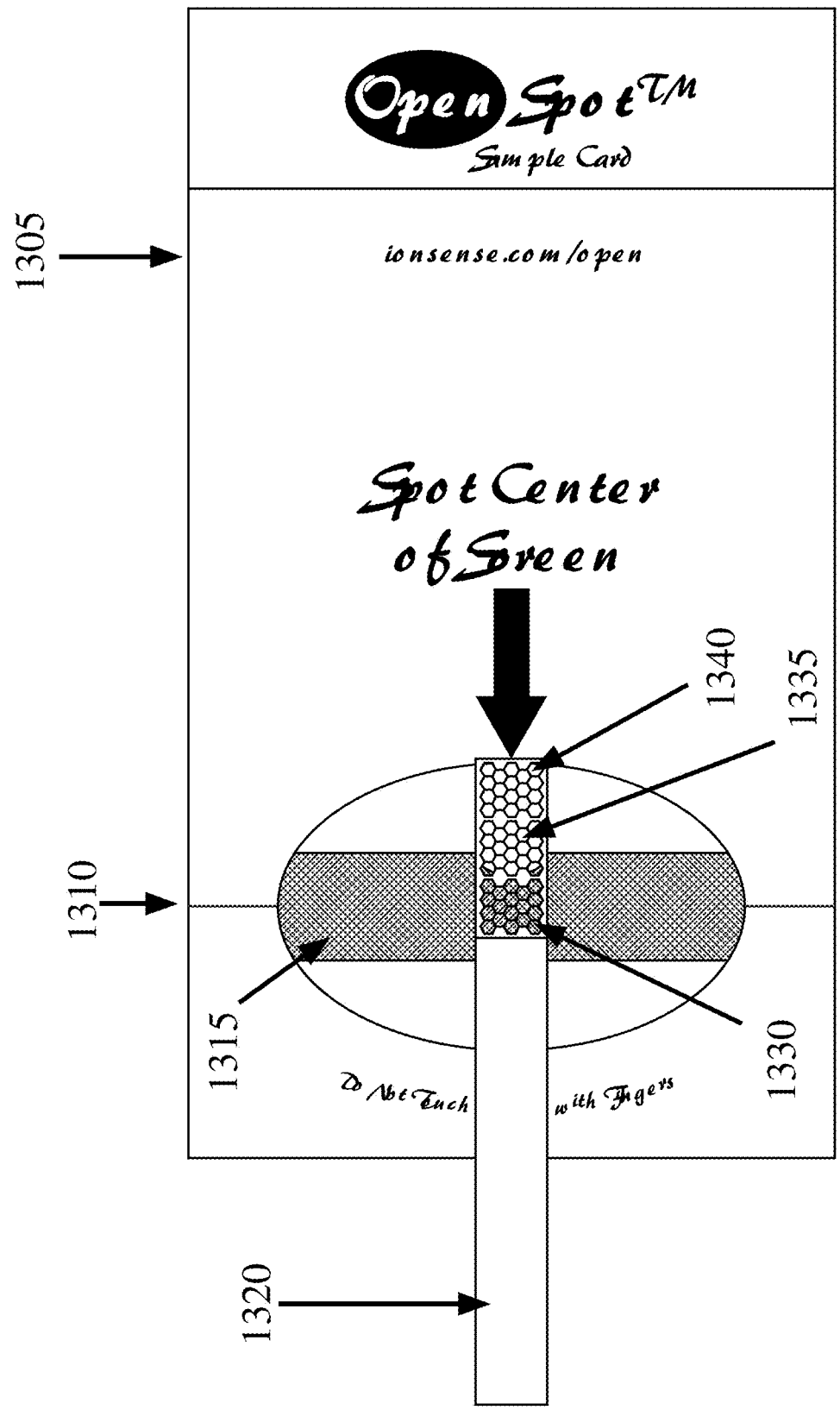
FIG. 13 shows a tine with three (3) areas for analysis (proximal, intermediate and distal, L to R), where the tine is situated in front of a prior art mesh to locate the proximal area directly in front of the mesh, according to an embodiment of the present invention.

FIG. 13 shows a tine 1320 with three (3) areas 1330, 1335, and 1340 for analysis (proximal 1330, intermediate 1335 and distal 1340, L to R), where the tine is situated in front of a prior art OpenSpot® sample analysis card 1305 with metal wire mesh 1315 attached to electrical connection(s) 1310 to allow a heating current to be applied to the mesh 1315, where the proximal area 1330 is registered with the mesh 1315. In an embodiment of the invention, the distance between the proximal area 1330 and the mesh 1315 can be approximately 10 microns, where in this range approximately means plus or minus twenty (20) percent. In an alternative embodiment of the invention, the distance between the proximal area 1330 and the mesh 1315 can be approximately 1 mm, where in this range approximately means plus or minus twenty (20) percent. In another embodiment of the invention, the distance between the proximal area 1330 and the mesh 1315 can be approximately 10 mm, where in this range approximately means plus or minus twenty (20) percent. According to an embodiment of the present invention, the mesh 1315 can be connected with a source and a current passed through the electrical connections 1310 to heat the mesh 1315 and thereby to convectively heat the proximal area 1330 of the tine 1320. Further ionizing species can be directed to the proximal area to generate ions of an analyte absorbed and/or adsorbed to the porous material on the proximal area. The convective heating can reduce the barrier to desorption of neutral analyte molecules from the sorbent surface. The action of the ionizing species can generate analyte ions which can be analyzed with a spectrometer. In various embodiments of the invention, a dopant can be applied to the mesh 1315. The distance between the tine 1320 and the mesh 1315 can be varied based on the ionizing mode (positive or negative), the nature of the ionizing species, the current applied to the mesh 1315, and whether a dopant is applied to the mesh 1315. In an embodiment of the invention, the ionizing species impact first on the tine 1320. In an alternative embodiment of the invention, the ionizing species impact first on the mesh 1315 and then on the tine 1320.

Figure 14:
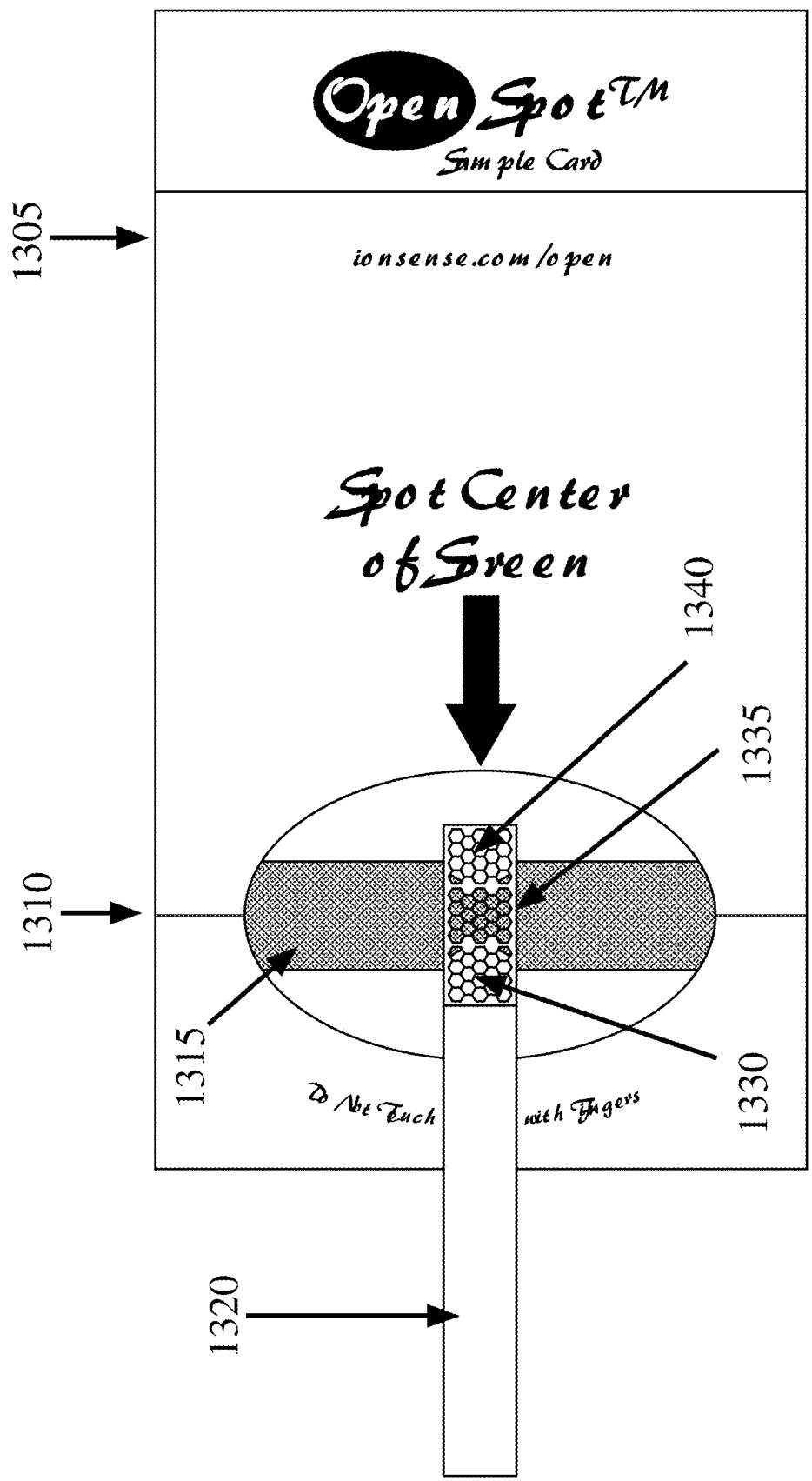
FIG. 14 shows a tine with three (3) areas for analysis (proximal, intermediate and distal, L to R), where the tine is situated in front of a prior art mesh to locate the intermediate area directly in front of the mesh, according to an embodiment of the present invention.

FIG. 14 shows a tine 1320 with three (3) areas 1330, 1335, and 1340 for analysis (proximal 1330, intermediate 1335 and distal 1340), where the tine is situated in front of a prior art mesh 1315 to locate the intermediate area 1335 directly in front of the mesh 1315. According to an embodiment of the present invention, the mesh 1315 can be connected with a source and a current passed through the mesh 1315 to convectively heat the intermediate area 1335 of the tine 1320. Further ionizing species can be directed to the intermediate area 1335 to generate ions of an analyte absorbed and/or adsorbed to the porous material on the intermediate area 1335. The convective heating can reduce the barrier to desorption of neutral analyte molecules from the sorbent surface. The action of the ionizing species can generate analyte ions which can be analyzed with a spectrometer.

Figure 15:
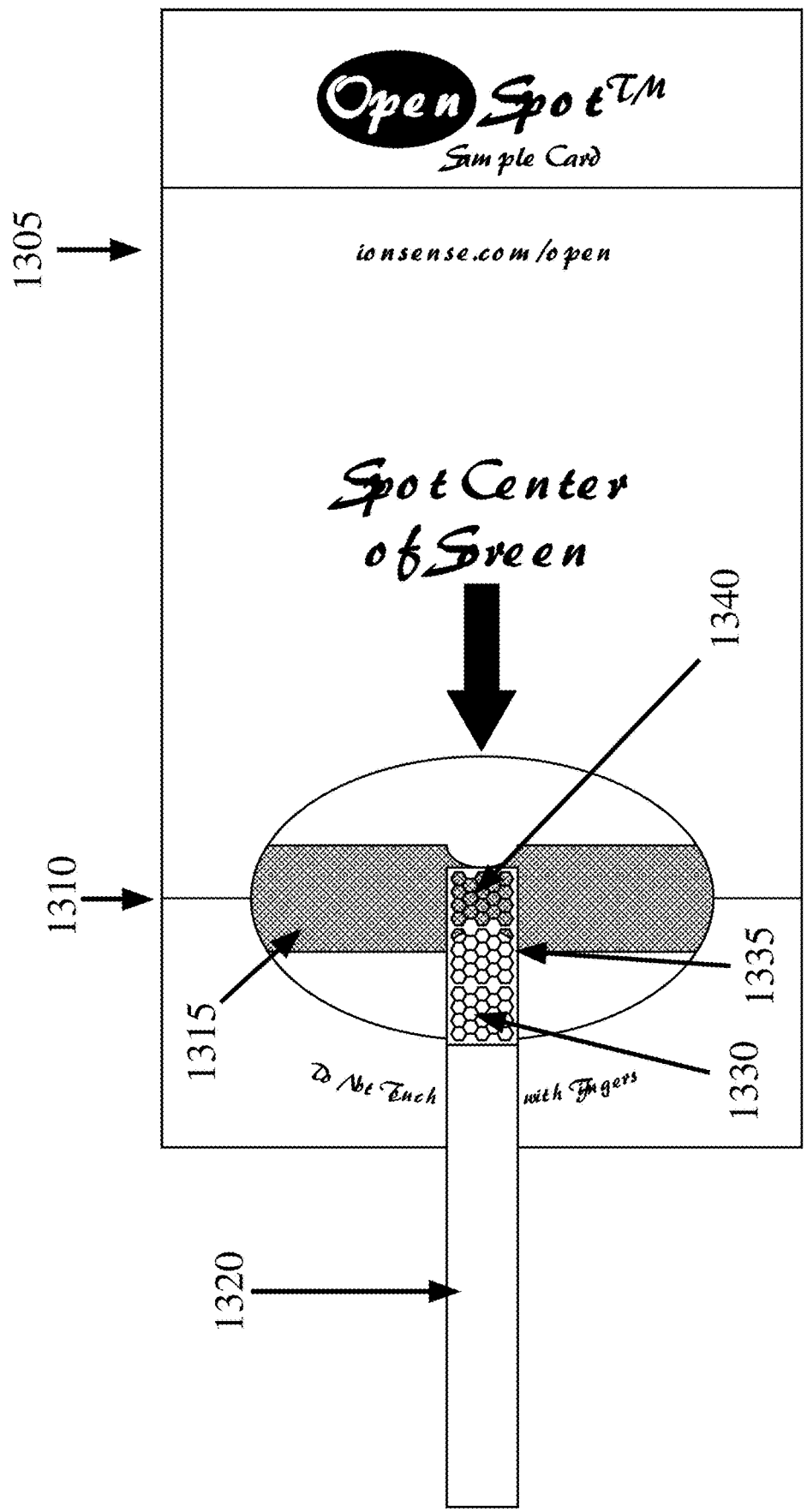
FIG. 15 shows a tine with three (3) areas for analysis (proximal, intermediate and distal, L to R), where the tine is situated in front of a prior art mesh to locate the distal area directly in front of the mesh, according to an embodiment of the present invention.

FIG. 15 shows a 1320 with three (3) areas 1330, 1335, and 1340 for analysis (proximal 1330, intermediate 1335 and distal 1340), where the tine is situated in front of a prior art mesh 1315 to locate the distal area 1340 directly in front of the mesh 1315. According to an embodiment of the present invention, the mesh 1315 can be connected with a source and a current passed through the mesh 1315 to convectively heat the distal area 1340 of the tine 1320. Further ionizing species can be directed to the distal area 1340 to generate ions of an analyte absorbed and/or adsorbed to the porous material on the distal area. The convective heating can reduce the barrier to desorption of neutral analyte molecules from the sorbent surface. The action of the ionizing species can generate analyte ions which can be analyzed with a spectrometer.

Figure 16:
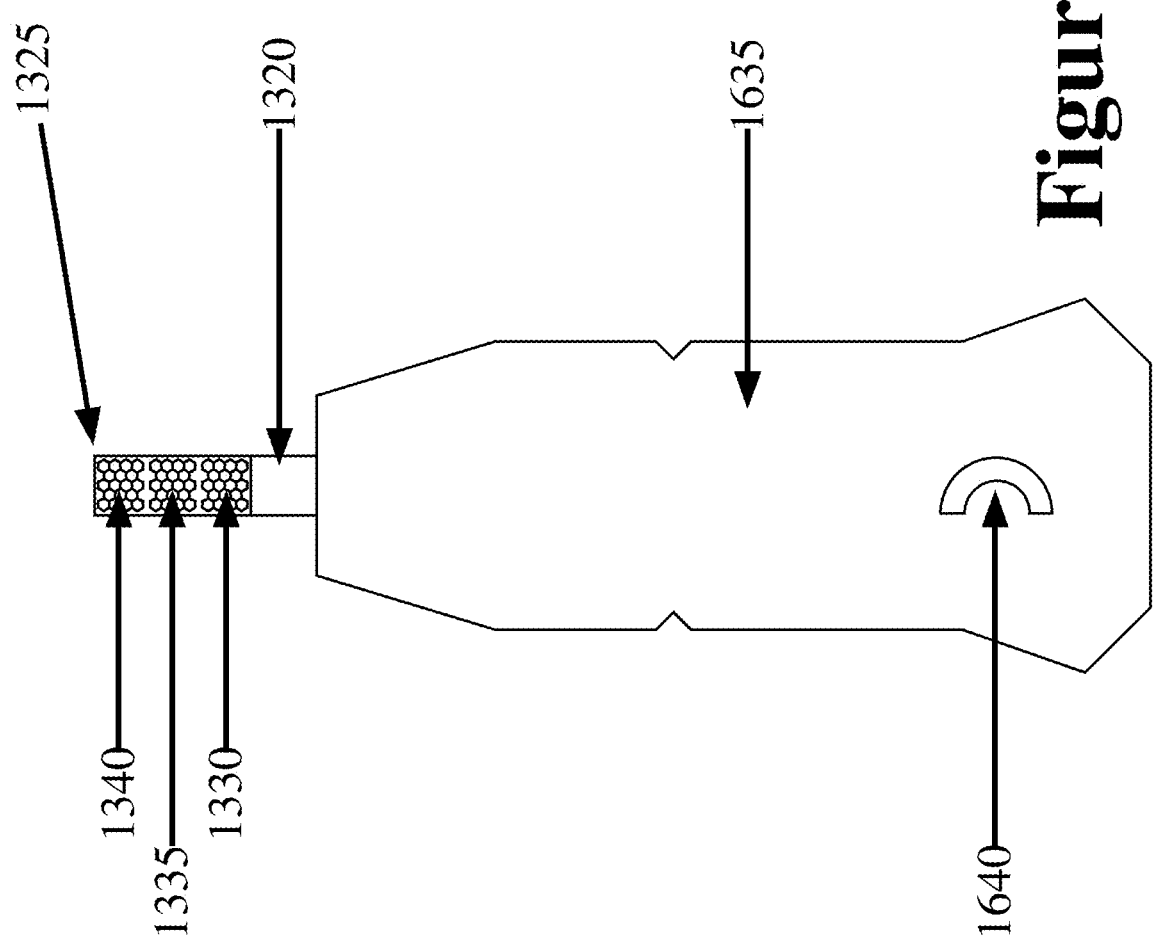
FIG. 16 shows the proximal end of a tine inserted into a holder used for holding the tine while sampling, according to an embodiment of the present invention.
Figure 17:
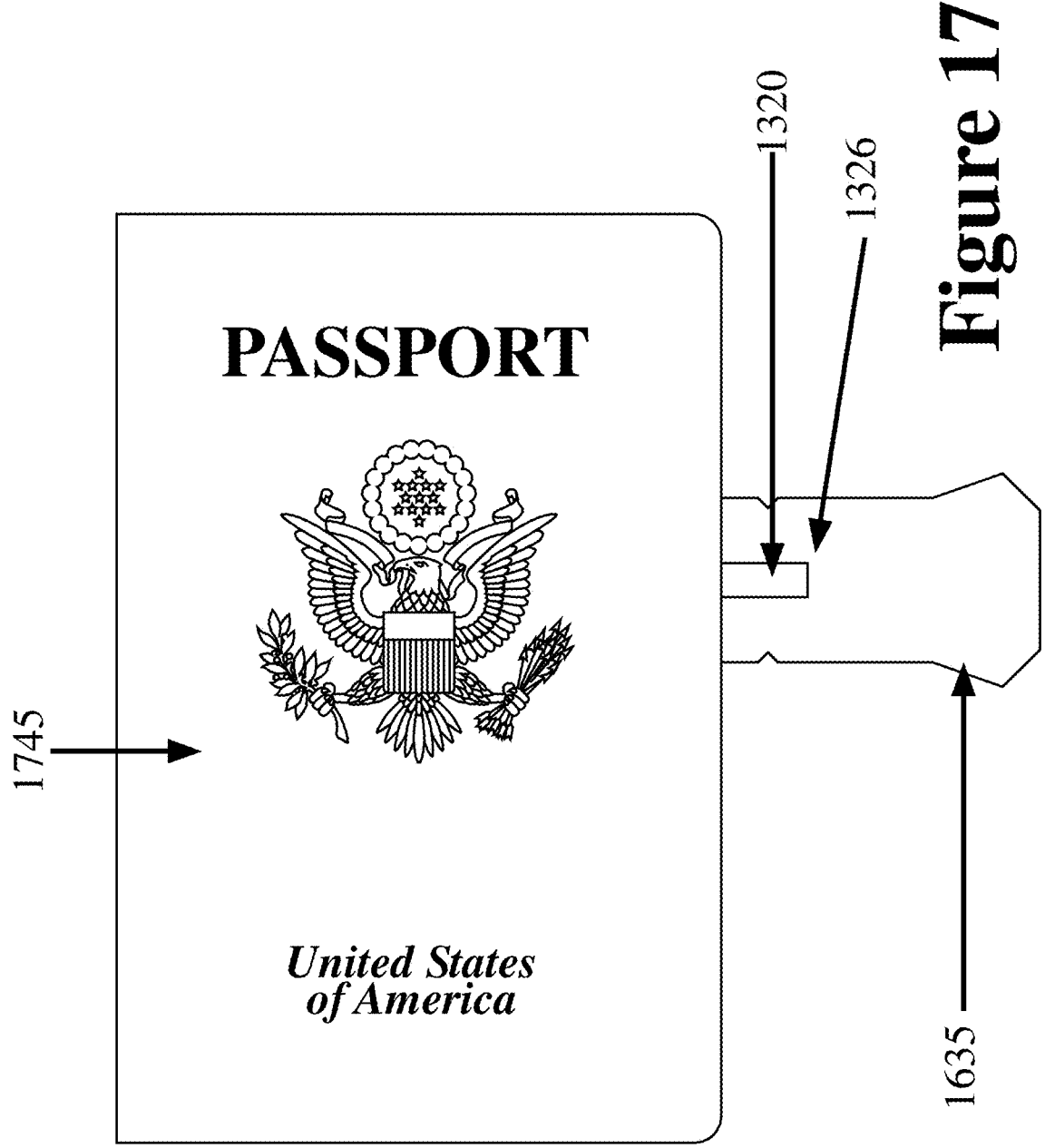
FIG. 17 shows the holder and the proximal end of a tine inserted into the space between the inside pages of a closed passport to collect chemicals, according to an embodiment of the present invention.
Figure 18:
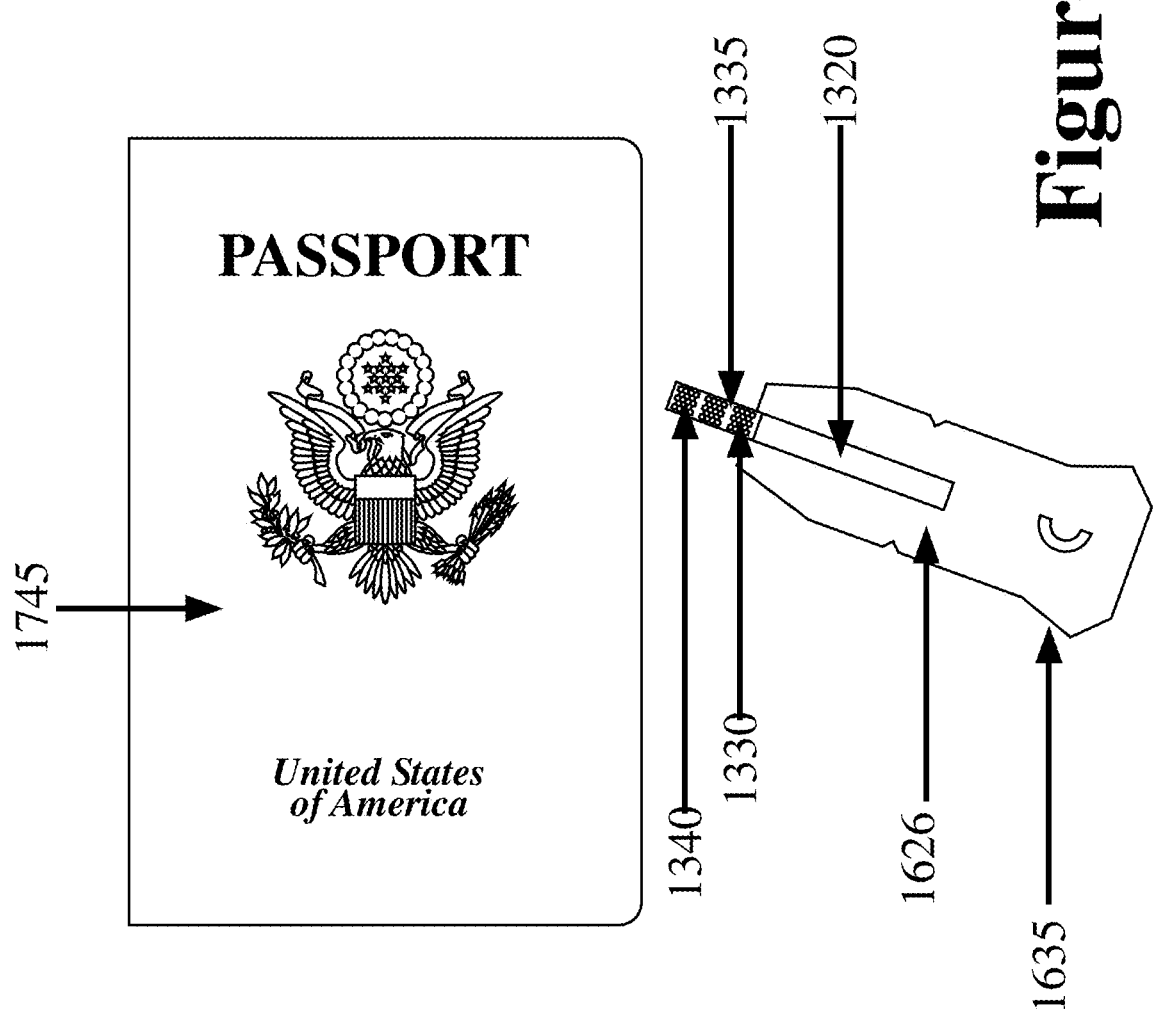
FIG. 18 shows the holder and the tine removed after sampling the inside pages of a passport, according to an embodiment of the present invention.
Figure 19:
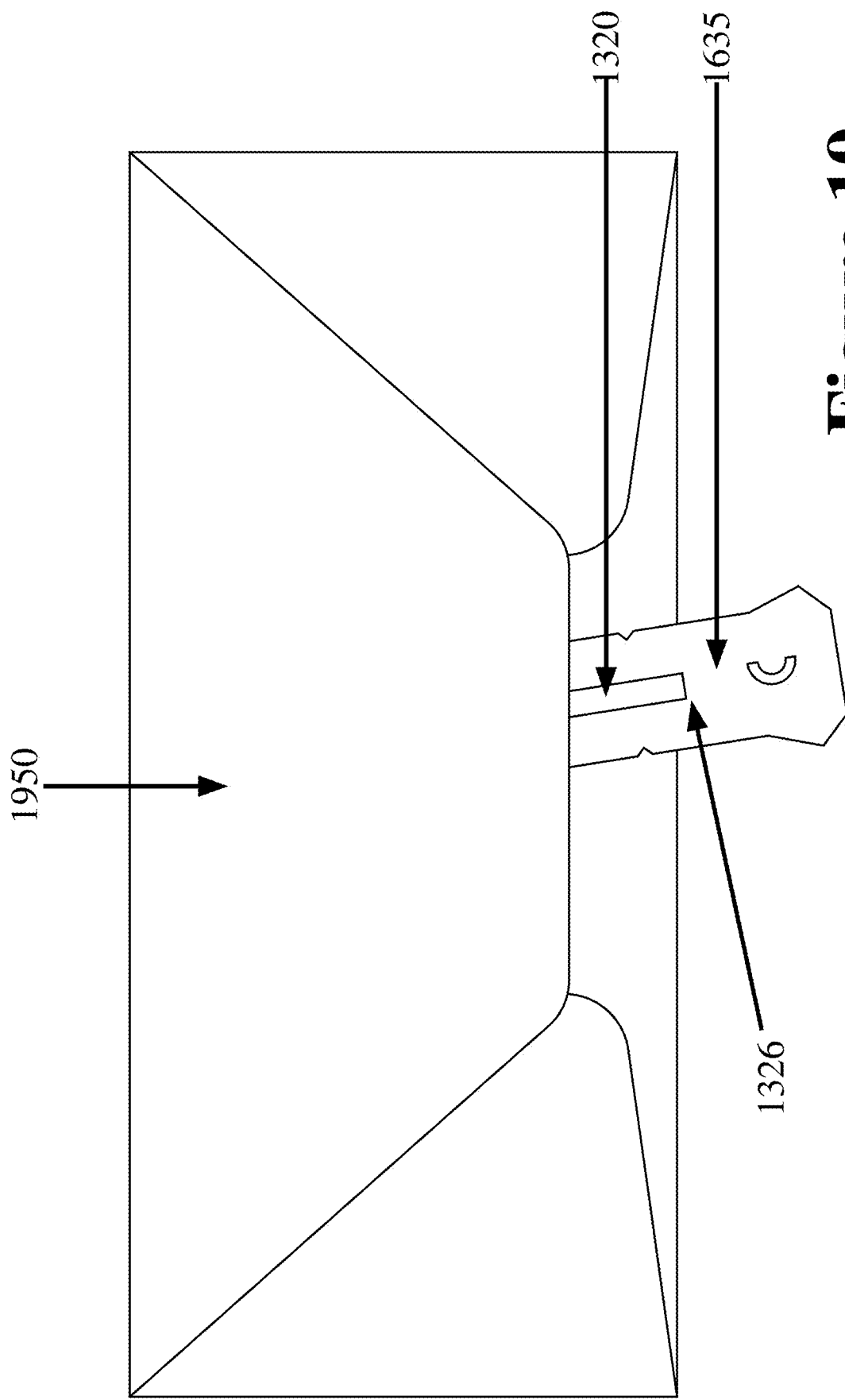
FIG. 19 shows the holder and the proximal end of a tine inserted into an envelope to effect collection of chemicals, according to an embodiment of the present invention.
Figure 20:
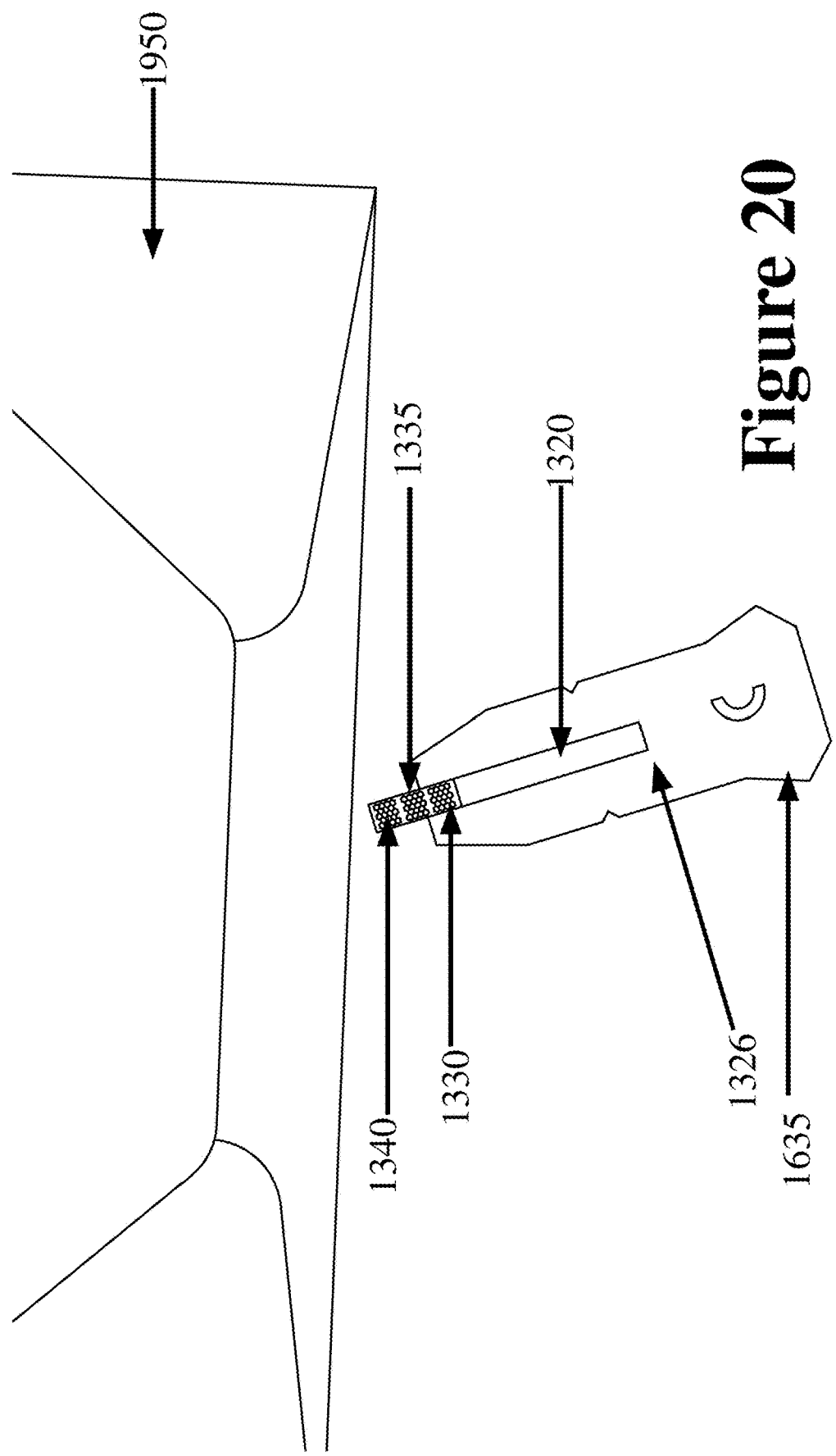
FIG. 20 shows the holder and the tine removed after sampling the inside of an envelope, according to an embodiment of the present invention.
Figure 21:
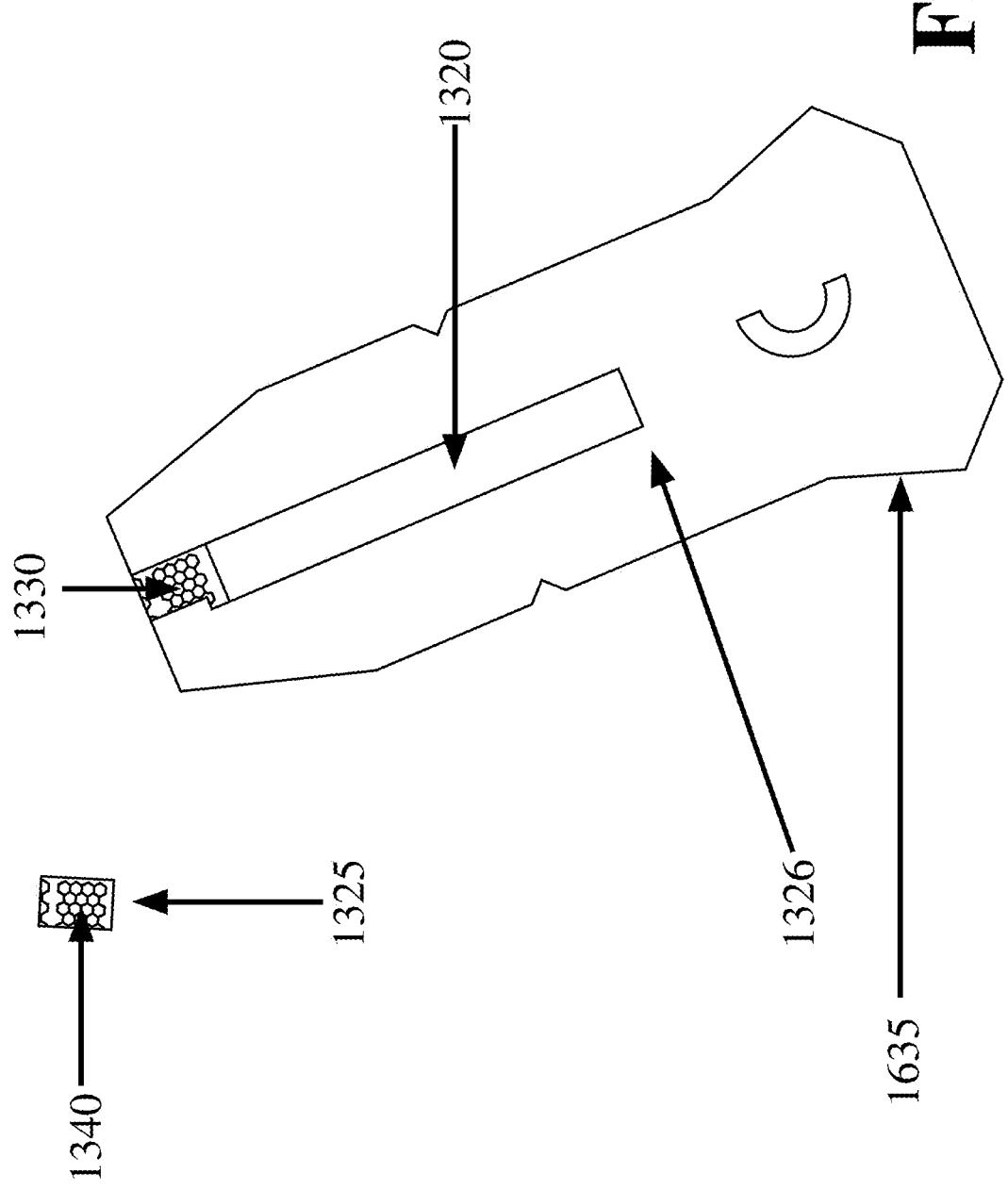
FIG. 21 shows the proximal end of a tine with two (2) areas of analysis, inserted into a holder used for holding the tine while sampling, where the distal area of the tine has been separated away from the tine, according to an embodiment of the present invention.

FIG. 16 shows the distal end 1325 of a tine 1320, where the proximal end (not shown) is inserted into a sampler 1635 used for holding the tine 1320 while sampling, according to an embodiment of the present invention. In an embodiment of the invention, the proximal end of the tine 1320 can be inserted into a semicircle 1640 present in the sampler 1635 which can be used to mount the sampler 1635 on a handle that is used by an operator to insert the sampler 1635 into tight openings or to avoid physical contact with the subject material. For example, the semicircle 1640 present in the sampler 1635 which can be used to mount the sampler 1635 on a wand that the Transport Security Authority (TSA) uses to swab a travelers personal belongings at an airport. As shown in FIG. 17 the sampler 1635 can be used to hold the tine 1320 while inserting the distal end of a tine 1320 into the inside pages of a document such as a passport 1745 in order to sample for analytes present on the pages of the document or passport 1745, while the proximal end 1326 of the tine 1320 is held, according to an embodiment of the present invention. FIG. 18 shows the sampler 1635 and a tine 1320, with three (3) areas 1330, 1335, and 1340 for analysis (proximal 1330, intermediate 1335 and distal 1340), before (or after) sampling the inside pages of a passport 1745, where the tine can be held by the sampler 1635 or the proximal end 1326 of the tine 1320, according to an embodiment of the present invention. As shown in FIG. 19 the sampler 1635 can be used to insert a tine 1320 through a small orifice of a container such as an envelope 1950, where at least the distal end (not shown) of the tine enters into the inside of the container such as an envelope 1950, without otherwise opening the container 1950, in order to contact at least the distal end with analytes present in the container 1950 and thereby sample for analytes present in the container, while the proximal end 1326 of the tine 1320 is held, according to an embodiment of the present invention. FIG. 20 shows the sampler 1635 and the tine 1320, with three (3) areas 1330, 1335, and 1340 for analysis (proximal 1330, intermediate 1335 and distal 1340), before (or after) sampling the inside of an envelope 1950, while the proximal end 1326 of the tine 1320 is held, according to an embodiment of the present invention. FIG. 21 shows the distal end 1325 and the proximal end 1326 of a tine 1320 with two (2) areas for analysis, where after sampling a distal area 1340 of the tine 1320 has been separated away from the tine 1320 to allow for analysis, where the proximate area 1330 of the proximal end 1326 of the tine 1320 remains inserted in a sampler 1635 used for holding the tine 1320 and can be used for further sampling and/or analysis, according to various embodiments of the present invention.

In an embodiment of the invention, after analysis the sorbent coated grid or mesh can be reactivated to allow for a subsequent analysis with the same sorbent surface. In another embodiment of the invention, the sorbent surface can be replaced to allow for a subsequent analysis with a new or regenerated sorbent surface. In an embodiment of the invention, a source of heat can be used to reactivate the sorbent surface. In an embodiment of the invention, heated gas from the atmospheric ionizer can be used to reactivate the sorbent surface. In an alternative embodiment of the invention, a thermoelectric source can be used to heat the sorbent surface. The heat acts at least by vaporizing residual chemical entities from the sorbent surface. In an embodiment of the invention, the reactivation of the sorbent surface enables multiple uses of the sorbent coated mesh or grid without requiring its replacement thus reducing operating cost.

While external ion sources are known for use with MS, the problem of transporting sufficient ions to the MS typically results in lowered sensitivity. The problem is exacerbated with an external ionization source operated at or near atmospheric pressure, since the MS typically operates at high vacuum. In one embodiment of the invention, an atmospheric ionizer and a GIS deliver ions to the MS.

In various embodiments of the invention, a GIS comprising two or more co-axial tubes with a gap between the tubes and a vacuum applied in the gap region is used to allow large volumes of carrier gas to be sampled. In an embodiment of the invention, a GIS is made up of an inlet tube and an outlet tube where the proximal end of the inlet tube is closest to the sorbent coated mesh or grid and the distal end of the inlet tube can be furthest from the atmospheric ionizer. In an embodiment of the invention, the outlet tube can be located within the spectroscopy system and can be used to one or both pre-concentrate and train the ions formed and flowing through the inlet tube of the gas ion separator to enter the spectroscopy system.

In an embodiment of the invention, a Radio Frequency IDentification (RFID) tag is imbedded in one or more sorbent coated mesh or grid. In another embodiment of the invention, a Radio Frequency IDentification (RFID) tag 697 is imbedded in one or more containers used for storing sorbent coated meshes or grids. In one embodiment of the invention, the RFID tag operates using an Ultra High Frequency (UHF) signal. In another embodiment of the invention, the RFID tag operates using a microwave frequency signal. In an embodiment the RFID tag can be positioned so that the RFID tag antenna is least affected by surrounding metal.

In an embodiment the RFID tag is read only. In another embodiment, the RFID tag contains an Electrically Erasable Programmable Read-Only Memory (EPROM), which enables both read and write functions. In an embodiment of the invention, the RFID tag is passive. In another embodiment of the invention, the RFID tag is semi passive containing a source of energy such as a battery to allow the tag to be constantly powered. In a further embodiment of the invention, the RFID tag is active, containing an internal power source, such as a battery, which is used to power any Integrated Circuit's (ICs) in the tag and generate the outgoing signal. In an embodiment, the tag has the ability to enable location sensing. In an embodiment of the invention, the location sensing is enabled through a photo sensor.

In an embodiment of the invention, a cellular modem is imbedded in the sorbent coated mesh or grid. In an embodiment of the invention, a cellular modem 696 is imbedded in the container used for storing the sorbent coated meshes or grids. The cellular modem can be a Code Division Multiple Access (CDMA) modem. In an embodiment of the invention, a RFID reader and associate integrated circuit processor are embedded together with the cellular modem in the sorbent coated mesh or grid or the container.

In an embodiment of the invention, a Global Positioning System (GPS) tracker is located in one or both the one or more tines 110 and the storage container 630. In an embodiment of the invention, the GPS can output longitude, latitude, ground speed, and course direction through the cellular modem to an internal processor or to a processor at a central station. In an alternative embodiment of the invention, the GPS tracker can be monitored remotely from a central station.

In an embodiment of the invention, where a RFID reader and a cellular modem are embedded in the core of one or more of the sorbent coated mesh or grid, the RFID reader is in communication with one or more of the RFID tags of the sorbent coated mesh or grid in the vicinity of the RFID reader. In an embodiment of the invention, where a RFID reader 695 and a cellular modem 696 are embedded in the core of the container used for storing, the RFID reader, where the RDID reader is in communication with one or more of the RFID tags of the sorbent coated mesh or grid in the vicinity of the RFID reader. In an embodiment of the invention, the RFID reader and associate processor are in communication with the embedded cellular modem. In an embodiment of the invention, the cellular modem is in communication with a base station and can transmit one or more parameters selected from the group consisting of one or more RFID tag locations, one or more RFID tag identification codes, present location, storage information, prior time and location information, transport information, analysis information, duration of analysis and time stamp.

In one embodiment of the invention the RFID code uses the IEEE format and is Electronic Product Code (EPC) readable. In another embodiment of the invention the RFID code uses the UCC format and is Universal Product Code (UPC) readable. In another embodiment, the format is compatible for EPC, European Article Number (EAN) and UPC read and write functions.

In an embodiment of the present invention, the sorbent coated mesh or grid can contain a chemical code to verify the integrity of the sorbent surface. The chemical code can be one or more molecules that are stable to oxidation or stable to further oxidation and have sufficiently low vapor pressure that they remain present on the sorbent surface after deposition for a period of approximately twelve (12) months. Here, 'approximately' means plus or minus ten (10) percent. The chemical code can be one or more molecules that do not produce ions that can interfere with the analysis of common controlled substances including explosives, radiation threats or illicit drugs. The chemical code can include one or more polydispersive or monodispersive synthetic organic polymers, paints, dyes, other small (less than approximately 200 Dalton) organic molecules and other small (less than approximately 200 Dalton) inorganic molecules. In an embodiment of the invention, the synthetic polymers include polyether, polyglycol, polyester, polyethylene, poly(halogen)ethylene, polypropylene, polyvinylidene halogen, polymethylmethacrylate, polyacrylonide, polycaprolactone, polylactide, poly butylene succinate, polybutylene succinate adipate, polybutylene succinate terephthalate, poly-hydroxypropionate, poly-hydroxybutyrate, poly-hydroxyvalerate, poly-hydroxyhexanoate, poly-3-hydroxyoctanoate, poly-3-hydroxyphenylvaleric acid and poly-3-hydroxyphenylhexanoic acid. In an embodiment of the invention, the dyes can include one or more dyes selected from the group consisting of methoxycoumarin, coumarins, fluorescein, bodipy-Fl, ethidium bromide, bodipy-R6G, Rhodamine, TAMRA, Cy-3 and Coomassie blue. In an embodiment of the invention, the inorganic molecules include transition metal oxides including FeS, NiO, $SiO_2$, $Ni_2O_3$, $Al_2O_3$, $Fe_2O_3$ and $Fe_3O_4$. In an embodiment of the invention, the chemical code is a (0.5:0.01:1:0.1, wt:wt) mixture of monodisperse polystyrene (n=4), Coomassie blue, fructose and $Fe_2O_3$. The chemical code can be arranged in a specific pattern on the sorbent surface. The pattern can be in the form of a bar code so that the chemical code functions as both a chemical and physical bar code. In an embodiment of the invention, an appropriate wavelength light can be used to scan the sorbent material and a dye which makes up the chemical code can be used to verify the presence of the chemical code on the sorbent surface without the need to use the spectroscopy system. In an embodiment of the invention, a system containing a sorbent surface with a chemical code where reactive species from at least one atmospheric ionizer are directed onto the chemical code of the sorbent surface to verify the integrity of the sorbent surface.

The sorbent coated mesh or grid, where one or more atmospheric ionizer is positioned a distance from the proximal end of one or more GIS inlet tube between a lower limit of approximately $1 \times 10^{-6}$ m and an upper limit of approximately $3\times10^{-2}$ m.

Example embodiments of the methods, systems, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. For example, it is envisaged that, irrespective of the actual shape depicted in the various Figures and embodiments described above, the outer diameter exit of the inlet tube can be tapered or non-tapered and the outer diameter entrance of the outlet tube can be tapered or non-tapered.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions, where the atmospheric ionizer generates ionizing species from one or more carrier gasses selected from the group consisting of helium, nitrogen, oxygen, neon, argon, krypton, and xenon.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions, where one or both the first temperature and the second temperature are between a lower limit of approximately 270 degree K and an upper limit of approximately 600 degree K.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or both the first sorbent substrate coating, and the second sorbent substrate coating, directing the plurality of first sample ions into a mass spectrometer operating in the positive ionization mode, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into a mass spectrometer operating in the positive ionization mode and analyzing the plurality of second sample ions.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or both the first sorbent substrate coating, and the second sorbent substrate coating, directing the plurality of first sample ions into a mass spectrometer operating in the negative ionization mode, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into a mass spectrometer operating in the negative ionization mode and analyzing the plurality of second sample ions.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or both the first sorbent substrate coating, and the second sorbent substrate coating, directing the plurality of first sample ions into a mass spectrometer operating in the positive ionization mode, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into a mass spectrometer operating in the negative ionization mode and analyzing the plurality of second sample ions.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or both the first sorbent substrate coating, and the second sorbent substrate coating, directing the plurality of first sample ions into a mass spectrometer operating in the negative ionization mode, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into a mass spectrometer operating in the positive ionization mode and analyzing the plurality of second sample ions.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the two or more connected bi-sorbent coated tines with a sample, generating a plurality of first sample ions by directing ionizing species from an atmospheric ionizer operated at a first temperature at one or more of the proximate area of the first tine, the proximate area of the second tine, the distal area of the first tine, and the distal area of the second tine, directing the plurality of first sample ions into an analyzer; analyzing the plurality of first sample ions, generating a plurality of second sample ions by directing ionizing species from the atmospheric ionizer operated at a second temperature at one or more of the proximate area of the first tine, the proximate area of the second tine, the distal area of the first tine, and the distal area of the second tine to generate a plurality of second sample ions directing the plurality of second sample ions into an analyzer and analyzing the plurality of second sample ions.

In an embodiment of the invention, a method of analyzing a sample comprises receiving two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first tine with a first sample and the second tine with a second sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises receiving a bi-sorbent coated tine comprising a first tine, where a first sorbent substrate coating covers a proximate area of the first tine, where a second sorbent substrate coats a distal area of the first tine, contacting the proximate area of the first tine with at least a liquid phase of a sample and the distal area of the first tine with a gaseous phase of the sample, generating a plurality of first sample ions by directing ionizing species from an atmospheric ionizer operated at a first temperature at one or both the proximate area of the first tine, and the distal area of the first tine, directing the plurality of first sample ions into an analyzer, analyzing the plurality of first sample ions, generating a plurality of second sample ions by directing ionizing species from the atmospheric ionizer operated at a second temperature at one or both the proximate area of the first tine, and the distal area of the first tine, directing the plurality of second sample ions into an analyzer, and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting one or both the proximate area of the first tine and the proximate area of the second tine with at least a liquid phase of a sample, contacting one or both the distal area of the first tine with a gaseous phase of the sample and the distal area of the second tine with a gaseous phase of the sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, contacting one or both the second sorbent substrate coating with a gaseous phase of the sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, where the liquid phase contacts the proximate area of the first tine and the proximate area of the first tine, contacting one or both the second sorbent substrate coating with a gaseous phase of the sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, where the liquid phase does not contact the distal area of the first tine, and the distal area of at the second tine, contacting one or both the second sorbent substrate coating with a gaseous phase of the sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, contacting one or both the second sorbent substrate coating with a gaseous phase of the sample, where the gaseous phase contacts the distal area of the first tine and the distal area of the second tine, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, where the liquid phase contacts the proximate area of the first tine and the proximate area of the first tine, contacting one or both the second sorbent substrate coating with a gaseous phase of the sample, where the gaseous phase contacts the distal area of the first tine and the distal area of the second tine, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, where the liquid phase does not contact the distal area of the first tine, and the distal area of at the second tine, contacting one or both the second sorbent substrate coating with a gaseous phase of the sample, where the gaseous phase contacts the distal area of the first tine and the distal area of the second tine, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, contacting one or both the second sorbent substrate coating with a gaseous phase of the sample, where the proximate area of the first tine and the proximate area of the second tine pass through the container holding the gaseous phase of the sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, where the liquid phase contacts the proximate area of the first tine and the proximate area of the first tine, contacting one or both the second sorbent substrate coating with a gaseous phase of the sample, where the proximate area of the first tine and the proximate area of the second tine pass through the container holding the gaseous phase of the sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of analyzing a sample comprises two or more connected bi-sorbent coated tines comprising a first tine and at least a second tine, where a first sorbent substrate coating covers one or both a proximate area of the first tine and a proximate area of the second tine, where a second sorbent substrate coats one or both a distal area of the first tine and a distal area of the second tine, contacting the first sorbent substrate coating with at least a liquid phase of a sample, where the liquid phase does not contact the distal area of the first tine, and the distal area of at the second tine, contacting one or both the second sorbent substrate coating with a gaseous phase of the sample, the proximate area of the first tine and the proximate area of the second tine pass through the container holding the gaseous phase of the sample, generating a plurality of first sample ions by directing ionizing species from an atmospheric ionizer operated at a first temperature at one or both the first sorbent substrate coating, and the second sorbent substrate coating, directing the plurality of first sample ions into an analyzer, analyzing the plurality of first sample ions, generating a plurality of second sample ions by directing ionizing species from the atmospheric ionizer operated at a second temperature at one or both the first sorbent substrate coating, and the second sorbent substrate coating, directing the plurality of second sample ions into an analyzer and analyzing the plurality of second sample ions.

In an embodiment of the invention, a method of preparing a bi-sorbent coated tine comprises receiving a tine, immersing a first portion of the tine into a first solution containing a first sorbent sample, where a second portion of the tine is not immersed into the first solution and immersing at least the second portion of the tine into a second solution containing a second sorbent sample.

In an embodiment of the invention, a sample analysis device comprises two or more connected tines comprising a first tine and a second tine, where a first portion of the first tine and a first portion of the second tine are immersed into a first solution containing a first sorbent sample, where a second portion of the first tine and a second portion of the second tine are immersed into a second solution containing a second sorbent sample.

In an embodiment of the invention, a sample analysis device comprises two or more connected tines comprising a first tine and a second tine, where a first portion of the first tine and a first portion of the second tine are immersed into a first solution containing a first sorbent sample, where a second portion of the first tine and a second portion of the second tine are immersed into a second solution containing a second sorbent sample, where the first portion is separated from the second portion by a distance between a lower limit of approximately 0.5 mm, and an upper limit of approximately 10 mm.

In an embodiment of the invention, a sample analysis device comprises two or more connected tines comprising a first tine and a second tine, where a first portion of the first tine and a first portion of the second tine are immersed into a first solution containing a first sorbent sample, where a second portion of the first tine and a second portion of the second tine are immersed into a second solution containing a second sorbent sample, where the length of one or both the first tine and the second tine is between a lower limit of approximately 4 mm and an upper limit of approximately 150 mm.

In an embodiment of the invention, a sample analysis device comprises two or more connected tines comprising a first tine and a second tine, where a first portion of the first tine and a first portion of the second tine are immersed into a first solution containing a first sorbent sample, where a second portion of the first tine and a second portion of the second tine are immersed into a second solution containing a second sorbent sample, where the width of one or both the first tine and the second tine is between a lower limit of approximately 0.03 mm and an upper limit of approximately 1 mm.

In an embodiment of the invention, a sample analysis device comprises two or more connected tines comprising a first tine and a second tine, where a first portion of the first tine and a first portion of the second tine are immersed into a first solution containing a first sorbent sample, where a second portion of the first tine and a second portion of the second tine are immersed into a second solution containing a second sorbent sample, where one or both the first tine and the second tine has a length and a width adapted to permit multiple exposures of one or both the first tine and the second tine with an atmospheric ionizer operating at two or more temperatures.

In an embodiment of the invention, a system comprises two or more connected tines, a first sorbent material applied to at least a proximate area of a first tine of the two or more connected tines and a proximate area of a second tine of the two or more connected tines, a second sorbent material applied to at least a distal area of the first tine and a distal area of the second tine, where the first sorbent material is adapted to collect analytes present in a liquid phase of a sample, where the second sorbent material is adapted to collect analytes present in a gaseous phase of a sample, an atmospheric ionizer adapted to direct a plurality of ionizing species formed at a first temperature at the first sorbent material to generate one or more first analyte ions, an atmospheric ionizer adapted to direct a plurality of ionizing species formed at a second temperature at the second sorbent material to generate one or more second analyte ions and an analyzer.

In an embodiment of the invention, a system comprises two or more connected tines, a first sorbent material applied to at least a proximate area of a first tine of the two or more connected tines and a proximate area of a second tine of the two or more connected tines, a second sorbent material applied to at least a distal area of the first tine and a distal area of the second tine, where the first sorbent material is adapted to collect analytes present in a liquid phase of a sample, where the second sorbent material is adapted to collect analytes present in a gaseous phase of a sample, an atmospheric ionizer adapted to direct a plurality of ionizing species formed at a first temperature at the first sorbent material to generate one or more first analyte ions, an atmospheric ionizer adapted to direct a plurality of ionizing species formed at a second temperature at the second sorbent material to generate one or more second analyte ions and an analyzer, where the length of one or both the first tine and the second tine is between a lower limit of approximately 1 mm and an upper limit of approximately 150 mm.

In an embodiment of the invention, a system comprises two or more connected tines, a first sorbent material applied to at least a proximate area of a first tine of the two or more connected tines and a proximate area of a second tine of the two or more connected tines, a second sorbent material applied to at least a distal area of the first tine and a distal area of the second tine, where the first sorbent material is adapted to collect analytes present in a liquid phase of a sample, where the second sorbent material is adapted to collect analytes present in a gaseous phase of a sample, an atmospheric ionizer adapted to direct a plurality of ionizing species formed at a first temperature at the first sorbent material to generate one or more first analyte ions, an atmospheric ionizer adapted to direct a plurality of ionizing species formed at a second temperature at the second sorbent material to generate one or more second analyte ions and an analyzer, where the width of one or both the first tine and the second tine is between a lower limit of approximately 0.3 mm and an upper limit of approximately 1 mm.

In an embodiment of the invention, a system comprises two or more connected tines, a first sorbent material applied to at least a proximate area of a first tine of the two or more connected tines and a proximate area of a second tine of the two or more connected tines, a second sorbent material applied to at least a distal area of the first tine and a distal area of the second tine, where the first sorbent material is adapted to collect analytes present in a liquid phase of a sample, where the second sorbent material is adapted to collect analytes present in a gaseous phase of a sample, an atmospheric ionizer adapted to direct a plurality of ionizing species formed at a first temperature at the first sorbent material to generate one or more first analyte ions, an atmospheric ionizer adapted to direct a plurality of ionizing species formed at a second temperature at the second sorbent material to generate one or more second analyte ions and an analyzer, where a distance between the first tine and the second tine is between a lower limit of approximately 0.5 mm and an upper limit of approximately 1 dm.

In an embodiment of the invention, a system comprises two or more connected tines, a first sorbent material applied to at least a proximate area of a first tine of the two or more connected tines and a proximate area of a second tine of the two or more connected tines, a second sorbent material applied to at least a distal area of the first tine and a distal area of the second tine, where the first sorbent material is adapted to collect analytes present in a liquid phase of a sample, where the second sorbent material is adapted to collect analytes present in a gaseous phase of a sample, an atmospheric ionizer adapted to direct a plurality of ionizing species formed at a first temperature at the first sorbent material to generate one or more first analyte ions, an atmospheric ionizer adapted to direct a plurality of ionizing species formed at a second temperature at the second sorbent material to generate one or more second analyte ions and an analyzer, where one or both the first tine and the second tine comprises a mesh, where the spacing of the mesh is between a lower limit of approximately 0.2 mm and an upper limit of approximately 1 dm.

In an embodiment of the invention, a system comprises two or more connected tines, a first sorbent material applied to at least a proximate area of a first tine of the two or more connected tines and a proximate area of a second tine of the two or more connected tines, a second sorbent material applied to at least a distal area of the first tine and a distal area of the second tine, where the first sorbent material is adapted to collect analytes present in a liquid phase of a sample, where the second sorbent material is adapted to collect analytes present in a gaseous phase of a sample, an atmospheric ionizer adapted to direct a plurality of ionizing species formed at a first temperature at the first sorbent material to generate one or more first analyte ions, an atmospheric ionizer adapted to direct a plurality of ionizing species formed at a second temperature at the second sorbent material to generate one or more second analyte ions and an analyzer, where one or both the first tine and the second tine comprises a mesh, where the spacing of the mesh is between a lower limit of approximately 0.2 mm and an upper limit of approximately 1 dm, where the diameter of the mesh is between a lower limit of approximately 0.03 mm and an upper limit of approximately 10 mm.

In an embodiment of the invention, a system comprises two or more connected tines, a first sorbent material applied to at least a proximate area of a first tine of the two or more connected tines and a proximate area of a second tine of the two or more connected tines, a second sorbent material applied to at least a distal area of the first tine and a distal area of the second tine, where the first sorbent material is adapted to collect analytes present in a liquid phase of a sample, where the second sorbent material is adapted to collect analytes present in a gaseous phase of a sample, an atmospheric ionizer adapted to direct a plurality of ionizing species formed at a first temperature at the first sorbent material to generate one or more first analyte ions, an atmospheric ionizer adapted to direct a plurality of ionizing species formed at a second temperature at the second sorbent material to generate one or more second analyte ions and an analyzer, where one or both the first tine and the second tine has a length and a width adapted to permit multiple exposures of one or both the first tine and the second tine with the atmospheric ionizer at the first temperature and the second temperature.

In an embodiment of the invention, an analysis system comprises a first tine, where a first sorbent substrate is coated on a proximate area of the first tine to collect at least one or more first analyte molecules on contact of a liquid phase of a first sample, where a second sorbent substrate is coated at least on a distal area of the first tine to collect one or more second analyte molecules on contact of a gaseous phase of a first sample an atmospheric ionizer, where the atmospheric ionizer is adapted to generate a plurality of ions of the first analyte molecules when directed at the proximate area and a plurality of ions of the second analyte molecules when directed at the distal area and an analyzer.

In an embodiment of the invention, a ionization system comprises two or more connected tines, where a first sorbent substrate is coated on a proximate area of a first tine of the two or more connected tines to collect at least one or more first analyte molecules on contact of a liquid phase of a first sample, where a second sorbent substrate is coated at least on the distal area of the first tine to collect one or more second analyte molecules on contact of a gaseous phase of a first sample and an atmospheric ionizer, where the atmospheric ionizer is adapted to generate a plurality of ions of the first analyte molecules when directed at the first sorbent material and a plurality of ions of the second analyte molecules when directed at the second sorbent material.

In an embodiment of the invention, an ionization system comprises two or more connected tines a first sorbent material applied to at least a proximate area of a first tine of the two or more connected tines and a proximate area of a second tine of the two or more connected tines, where the first sorbent material is adapted to collect one or more first analyte molecules on contact of a liquid phase of a first sample to the first sorbent material, a second sorbent material applied to at least a distal area of the first tine and a distal area of the second tine, where the second sorbent material is adapted to collect one or more second analyte molecules on contact of a gaseous phase of a first sample to the second sorbent material and an atmospheric ionizer, where the atmospheric ionizer is adapted to generate a plurality of ions of one or more of the first analyte molecules, and the second analyte molecules when directed at one or more of the first sorbent material, and the second sorbent material.

In an embodiment of the invention, an ionization system comprises two or more connected tines, a first sorbent material applied to at least a proximate area of a first tine of the two or more connected tines and a proximate area of a second tine of the two or more connected tines, where the first sorbent material is adapted to collect one or more first analyte molecules on introduction of a sample to the first sorbent material, a second sorbent material applied to at least a distal area of the first tine and a distal area of the second tine, where the second sorbent material is adapted to collect one or more second analyte molecules on introduction of a sample to the second sorbent material and an atmospheric ionizer, where the atmospheric ionizer is adapted to generate a plurality of ions when directed at one or both the first sorbent material and the second sorbent material.

In an embodiment of the invention, an ionization system comprises two or more connected metal tines, a sorbent material applied to the two or more connected metal tines, where the sorbent material is adapted to collect one or more analyte molecules and an atmospheric ionizer, where the atmospheric ionizer is adapted to generate a plurality of ions when directed at the sorbent material of one or more of the proximate area of a first tine of the two or more connected metal tines, the distal area of the first tine, the proximate area of a second tine of the two or more connected metal tines, and the distal area of the second tine.

In an embodiment of the invention, an ionization system comprises two or more connected metal tines, a sorbent material applied to the two or more connected metal tines, where the sorbent material is adapted to collect one or more analyte molecules and an atmospheric ionizer, where the atmospheric ionizer is adapted to generate a plurality of ions when directed at the sorbent material of one or more of the proximate area of a first tine of the two or more connected metal tines, the distal area of the first tine, the proximate area of a second tine of the two or more connected metal tines, and the distal area of the second tine, where the one or more analyte molecules collected on the sorbent material are one or more of absorbed, adsorbed and condensed on the sorbent material In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material.

In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material, where one or both the one or more first analyte molecules collected on the first sorbent material and the one or more second analyte molecules collected on the second sorbent material are one or more of absorbed, adsorbed and condensed.

In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material.

In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material, where one or both the one or more first analyte molecules collected on the first sorbent material and the one or more second analyte molecules collected on the second sorbent material are one or more of absorbed, adsorbed and condensed, where the length of one or both the first tine and the second tine is between a lower limit of approximately 1 mm and an upper limit of approximately 150 mm.

In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material, where one or both the one or more first analyte molecules collected on the first sorbent material and the one or more second analyte molecules collected on the second sorbent material are one or more of absorbed, adsorbed and condensed, where the width of one or both the first tine and the second tine is between a lower limit of approximately 0.03 mm and an upper limit of approximately 1 mm.

In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material, where one or both the one or more first analyte molecules collected on the first sorbent material and the one or more second analyte molecules collected on the second sorbent material are one or more of absorbed, adsorbed and condensed, where a distance between the first tine and the second tine is between a lower limit of approximately 1 mm and an upper limit of approximately 1 dm.

In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material, where one or both the one or more first analyte molecules collected on the first sorbent material and the one or more second analyte molecules collected on the second sorbent material are one or more of absorbed, adsorbed and condensed, where one or both the first tine and the second tine comprise a mesh, where the spacing of the mesh is between a lower limit of approximately 0.5 mm and an upper limit of approximately 1 dm.

In an embodiment of the invention, an analyte collection device comprises two or more connected tines, a first sorbent material applied to at least a proximate area of a first tine of the two or more connected metal tines and a proximate area of a second tine of the two or more connected metal tines, where the first sorbent material is adapted to collect one or more first analyte molecules on introduction of a sample to the first sorbent material and a second sorbent material applied to at least a distal area of the first tine and a distal area of the second tine, where the second sorbent material is adapted to collect one or more second analyte molecules on introduction of a sample to the second sorbent material, where one or both the one or more first analyte molecules collected on the first sorbent material and the one or more second analyte molecules collected on the second sorbent material are one or more of absorbed, adsorbed and condensed, where the diameter of the mesh is between a lower limit of approximately 0.03 mm and an upper limit of approximately 1 mm.

In an embodiment of the invention, a collection device comprises two or more connected tines, a first sorbent material applied to at least a proximate area of a first tine of the two or more connected tines and a proximate area of a second tine of the two or more connected tines, where the first sorbent material is adapted to collect one or more first analyte molecules on introduction of a sample to the first sorbent material, a second sorbent material applied to at least an intermediate area of the first tine and an intermediate area of a second tine adapted to collect one or more second analyte molecules on introduction of a sample to the second sorbent material and a third sorbent material applied to at least a distal area of the first tine and a distal area of the second tine adapted to collect one or more third analyte molecules on introduction of a sample to the third sorbent material, where the length of one or both the first tine and the second tine is between a lower limit of approximately 1 mm and an upper limit of approximately 150 mm.

In an embodiment of the invention, a collection device comprises two or more connected tines, a first sorbent material applied to at least a proximate area of a first tine of the two or more connected tines and a proximate area of a second tine of the two or more connected tines, where the first sorbent material is adapted to collect one or more first analyte molecules on introduction of a sample to the first sorbent material, a second sorbent material applied to at least an intermediate area of the first tine and an intermediate area of a second tine adapted to collect one or more second analyte molecules on introduction of a sample to the second sorbent material and a third sorbent material applied to at least a distal area of the first tine and a distal area of the second tine adapted to collect one or more third analyte molecules on introduction of a sample to the third sorbent material, where the width of one or both the first tine and the second tine is between a lower limit of approximately 0.03 mm and an upper limit of approximately 1 mm.

In an embodiment of the invention, a collection device comprises two or more connected tines, a first sorbent material applied to at least a proximate area of a first tine of the two or more connected tines and a proximate area of a second tine of the two or more connected tines, where the first sorbent material is adapted to collect one or more first analyte molecules on introduction of a sample to the first sorbent material, a second sorbent material applied to at least an intermediate area of the first tine and an intermediate area of a second tine adapted to collect one or more second analyte molecules on introduction of a sample to the second sorbent material and a third sorbent material applied to at least a distal area of the first tine and a distal area of the second tine adapted to collect one or more third analyte molecules on introduction of a sample to the third sorbent material, where a distance between the first tine and the second tine is between a lower limit of approximately 1 mm and an upper limit of approximately 1 dm.

In an embodiment of the invention, a collection device comprises two or more connected tines, a first sorbent material applied to at least a proximate area of a first tine of the two or more connected tines and a proximate area of a second tine of the two or more connected tines, where the first sorbent material is adapted to collect one or more first analyte molecules on introduction of a sample to the first sorbent material, a second sorbent material applied to at least an intermediate area of the first tine and an intermediate area of a second tine adapted to collect one or more second analyte molecules on introduction of a sample to the second sorbent material and a third sorbent material applied to at least a distal area of the first tine and a distal area of the second tine adapted to collect one or more third analyte molecules on introduction of a sample to the third sorbent material, where one or both the first tine and the second tine comprises a mesh, where the spacing of the mesh is between a lower limit of approximately 0.5 mm and an upper limit of approximately 1 dm.

In an embodiment of the invention, a collection device comprises two or more connected tines, a first sorbent material applied to at least a proximate area of a first tine of the two or more connected tines and a proximate area of a second tine of the two or more connected tines, where the first sorbent material is adapted to collect one or more first analyte molecules on introduction of a sample to the first sorbent material, a second sorbent material applied to at least an intermediate area of the first tine and an intermediate area of a second tine adapted to collect one or more second analyte molecules on introduction of a sample to the second sorbent material and a third sorbent material applied to at least a distal area of the first tine and a distal area of the second tine adapted to collect one or more third analyte molecules on introduction of a sample to the third sorbent material, where one or both the first tine and the second tine comprises a mesh, where the spacing of the mesh is between a lower limit of approximately 0.5 mm and an upper limit of approximately 1 dm, where the diameter of the mesh is between a lower limit of approximately 0.03 mm and an upper limit of approximately 1 mm.

In an embodiment of the invention, a method of confirming an analysis of a sample at a later time comprises receiving two or more connected bi-sorbent coated tines comprises a first tine and at least a second tine, where a sorbent substrate coating covers a proximate area of the first tine and a proximate area of the second tine, contacting the first tine of the two or more connected bi-sorbent coated tines with a first sample, generating a plurality of first sample ions by directing ionizing species from an atmospheric ionizer operated at a temperature at the proximate area of the first tine, directing the plurality of first sample ions into an analyzer, analyzing the plurality of first sample ions, storing the two or more connected bi-sorbent coated tines in a controlled atmosphere, at a later time contacting the second tine of the two or more connected bi-sorbent coated tines with a second sample, generating a plurality of second sample ions by directing ionizing species from an atmospheric ionizer operated at a temperature at the proximate area of the second tine, directing the plurality of second sample ions into an analyzer, analyzing the plurality of second sample ions, comparing the results of analysis of the first sample ions and the second sample ions.

In an embodiment of the invention, a method of confirming an analysis of a sample at a later time comprises receiving two or more connected bi-sorbent coated tines comprising: a first tine and at least a second tine, where a first sorbent substrate coating covers a proximate area of the first tine and a proximate area of the second tine, where a second sorbent substrate coats a distal area of the first tine and a distal area of the second tine, contacting the two or more connected bi-sorbent coated tines with a sample, generating a plurality of sample ions by directing ionizing species from an atmospheric ionizer operated at a temperature at one or both the first sorbent substrate coating, and the second sorbent substrate coating, directing the plurality of sample ions into an analyzer, analyzing the plurality of sample ions, storing the two or more connected bi-sorbent coated tines in a controlled atmosphere, generating a plurality of sample ions by directing ionizing species from an atmospheric ionizer operated at a temperature at one or both the first sorbent substrate coating of the second tine and the second sorbent substrate coating of the second tine, directing the plurality of sample ions into an analyzer, analyzing the plurality of sample ions.

In an embodiment of the invention, a method of preparing a bi-sorbent coated tine comprises receiving a tine, immersing a first portion of the tine into a first slurry containing a first sorbent, where a second portion of the tine is not immersed into the first slurry and immersing the first portion and the second portion of the tine into a second slurry containing a second sorbent.

In an embodiment of the invention, a method of preparing a bi-sorbent coated device with two or more tines comprises receiving a device with two or more tines, immersing a first portion of a first tine and at least a first portion of a second tine into a first slurry containing a first sorbent, where a second portion of the first tine is not immersed into the first slurry, where a second portion of the second tine is not immersed into the first slurry and immersing at least the second portion of the first tine and at least a second portion of the second tine into a second slurry containing a second sorbent.

In an embodiment of the invention, a method of preparing a bi-sorbent coated device with two or more tines comprises receiving a device with two or more tines, immersing a first portion of a first tine and at least a first portion of a second tine into a first slurry containing a first sorbent, where a second portion of the first tine is not immersed into the first slurry, where a second portion of the second tine is not immersed into the first slurry and immersing at least the first portion of the first tine, the second portion of the first tine, the first portion of the second tine, the second portion of the second tine into a second slurry containing a second sorbent.

In an embodiment of the invention, a method of preparing a bi-sorbent coated device with two or more tines comprises receiving a device with two or more tines, applying to a first portion of a first tine and at least a first portion of a second tine a coating of a first sorbent, where a second portion of the first tine is not coated with the first sorbent, where a second portion of the second tine is not coated with the first sorbent and applying to the second portion of the first tine and at least the second portion of the second tine a coating of a second sorbent.

In an embodiment of the invention, a method of preparing a tri-sorbent coated device with two or more tines comprises receiving a device with two or more tines, immersing a first portion of a first tine and at least a first portion of a second tine into a first slurry containing a first sorbent, where a second portion of the first tine is not immersed into the first slurry, where a second portion of the second tine is not immersed into the first slurry, where a third portion of the first tine is not immersed into the first slurry, where a third portion of the second tine is not immersed into the first slurry, immersing at least the first portion of the first tine, the second portion of the first tine, the first portion of the second tine, the second portion of the second tine into a second slurry containing a second sorbent, where a third portion of the first tine is not immersed into the second slurry, where a third portion of the second tine is not immersed into the second slurry and immersing at least the third portion of the first tine and at least a third portion of the second tine into a third slurry containing a third sorbent.

In an embodiment of the invention, a method of preparing a tri-sorbent coated device with two or more tines comprises receiving a device with two or more tines, applying to a first portion of a first tine and at least a first portion of a second tine a coating of a first sorbent, where a second portion of the first tine is not coated with the first sorbent, where a second portion of the second tine is not coated with the first sorbent, where a third portion of the first tine is not coated with the first sorbent, where a third portion of the second tine is not coated with the first sorbent, applying to a second portion of a first tine and at least a second portion of a second tine a coating of a second sorbent, where a third portion of the first tine is not coated with the second sorbent, where a third portion of the second tine is not coated with the second sorbent and applying to a third portion of a first tine and at least a third portion of a second tine a coating of a third sorbent.

In an embodiment of the invention, a method of preparing a tri-sorbent coated device with two or more tines comprises receiving a device with two or more tines, applying to a first portion of a first tine and at least a first portion of a second tine a coating of a first sorbent, where a second portion of the first tine is not coated with the first sorbent, where a second portion of the second tine is not coated with the first sorbent, where a third portion of the first tine is not coated with the first sorbent, where a third portion of the second tine is not coated with the first sorbent, applying to a second portion of a first tine and at least a second portion of a second tine a coating of a second sorbent, where a first portion of the first tine is not coated with the second sorbent, where a first portion of the second tine is not coated with the second sorbent, where a third portion of the first tine is not coated with the second sorbent, where a third portion of the second tine is not coated with the second sorbent and applying to a third portion of a first tine and at least a third portion of a second tine a coating of a third sorbent.

Embodiment 1. A device for analyzing ions of a heterogeneous sample from a container comprising: a sample collection system comprising: a first tine with a first major axis adapted for insertion into a container; a first sorbent material applied to a first area of the first tine; and a second sorbent material applied to a second area of the first tine, where the first sorbent material is adapted to collect a first sample molecule present in the heterogeneous sample on insertion of the tine into the container, where the second sorbent material is adapted to collect a second sample molecule present in the heterogeneous sample on insertion of the tine into the container; a mesh in proximity with the tine; a holder to position the tine relative to the mesh, where the holder is adapted to adjust one or both the first sorbent material and the second sorbent material in registration with the mesh; a power source electrically connected to the mesh adapted to deliver at least a first current and second current to the mesh; an ionization source directing ionizing species at the first sorbent material or the second sorbent material to generate a plurality of ions of the sample; and a spectrometer adapted to analyze the plurality of ions of the sample.

Embodiment 2. The device of Embodiment 1, further comprising a second tine with a second major axis, connected to the first tine.

Embodiment 3. The device of Embodiment 1, The device of claim 2, where the first major axis is parallel to the second major axis.

Embodiment 4. The device of Embodiment 2, where the first major axis is co-linear with the second major axis.

Embodiment 5. The device of Embodiment 2, where first major axis is not parallel with the second major axis.

Embodiment 6. The device of Embodiment 2, where the first tine is symmetric to the second tine about a $C_n$ axis of rotation.

Embodiment 7. The device of Embodiment 2, where the second tine comprises the first sorbent material applied to a first area of the second tine and a second sorbent material applied to a second area of the second tine.

Embodiment 8. The device of Embodiment 2, where the first tine comprises a first grid.

Embodiment 9. The device of Embodiment 8, where the first grid comprises a plurality of holes.

Embodiment 10. The device of Embodiment 12, where the second tine comprises a second grid.

Embodiment 11. The device of Embodiment 10, where the second grid comprises a plurality of holes.

Embodiment 12. The device of Embodiment 2, where the first area of the first tine comprises a grid with a plurality of holes.

Embodiment 13. The device of Embodiment 2, where the second area of the first tine comprises a grid with a plurality of holes.

Embodiment 14. The device of Embodiment 2, where the first area of the second tine comprises a grid with a plurality of holes.

Embodiment 15. The device of Embodiment 2, where the second area of the second tine comprises a grid with a plurality of holes.

Embodiment 16. A method for analyzing a heterogeneous sample from a container comprising:
receiving a first tine with a first major axis comprising: a first sorbent material applied to a first area of the first tine; and a second sorbent material applied to a second area of the first tine, where the first sorbent material is adapted to collect a first sample molecule present in the heterogeneous sample on insertion of the tine into a container, where the second sorbent material is adapted to collect a second sample molecule present in the heterogeneous sample on insertion of the tine into the container; positioning the tine in proximity to the mesh, where a holder is adapted to adjust one or both the first sorbent material and the second sorbent material in registration with the mesh; applying a first current and second current to the mesh with a power source electrically connected to the mesh; generating a plurality of ions of the sample by directing ionizing species at the first sorbent material or the second sorbent material; and analyzing the plurality of ions of the sample with a spectrometer.

Embodiment 17. The method of Embodiment 16, where the first current heats the mesh with the first sorbent material in registration with the mesh.

Embodiment 18. The method of Embodiment 17, where the second current heats the mesh with the second sorbent material in registration with the mesh.

Embodiment 19. The method of Embodiment 17, where the ionizing species are generated with an ionization source selected from the group consisting of DART source and a DESI source.

Embodiment 20. A system for vaporizing a sample comprising: a first tine with a first major axis;
a first sorbent material applied to a first area of the first tine, where the first sorbent material is adapted to collect one or more sample molecules on the first sorbent material; a second sorbent material applied to a second area of the first tine, where the second sorbent material is adapted to collect one or more sample molecules on the second sorbent material; a mesh in proximity with the tine; and a power source electrically connected to the mesh to heat the mesh, where the mesh transfers heat to the tine to vaporize the sample.

Embodiment 21. A system for generating ions of a sample comprising: a first tine with a first major axis; a first sorbent material applied to a first area of the first tine, where the first sorbent material is adapted to collect one or more sample molecules on the first sorbent material; a second sorbent material applied to a second area of the first tine, where the second sorbent material is adapted to collect one or more sample molecules on the second sorbent material; a mesh in proximity with the tine; a power source electrically connected to the mesh; and an ionization source directing ionizing species at the first sorbent material or the second sorbent material to generate ions of the sample.

Embodiment 22. The system of Embodiment 21, where the power source heats the mesh.

Embodiment 23. The system of Embodiment 21, where the mesh heats the tine.

Embodiment 24. The system of Embodiment 21, where the power source heats the tine.

Embodiment 25. A system for analyzing a sample comprising: a first tine with a first major axis;
a first sorbent material applied to a first area of the first tine, where the first sorbent material is adapted to collect one or more sample molecules on the first sorbent material; a second sorbent material applied to a second area of the first tine, where the second sorbent material is adapted to collect one or more sample molecules on the second sorbent material; a mesh in proximity with the tine; an ionization source directing ionizing species at the first sorbent material or the second sorbent material to generate a plurality of ions of the sample; a power source electrically connected to the mesh; and a spectrometer adapted to analyze the plurality of ions of the sample.

Embodiment 26. The system of Embodiment 25, where the power source heats the mesh.

Embodiment 27. The system of Embodiment 25, where the mesh heats the tine.

Embodiment 28. The system of Embodiment 25, where the power source heats the tine.

Embodiment 29. A device for generating ions of a sample from a container comprising: a sample collection system comprising: a first tine with a first major axis adapted for insertion into a container; a first sorbent material applied to a first area of the first tine; and a second sorbent material applied to a second area of the first tine, where one or both the first sorbent material and the second sorbent material are adapted to collect sample molecules on insertion of the tine into the container; a mesh in proximity with the tine; a power source electrically connected to the mesh adapted to heat the mesh; and an ionization source directing ionizing species at the first sorbent material or the second sorbent material to generate a plurality of ions of the sample.

Embodiment 30. A method for generating ions of a sample from a container comprising: receiving a first tine with a first major axis comprising: a first sorbent material applied to a first area of the first tine, where the first sorbent material is adapted to collect one or more sample molecules on the first sorbent material; a second sorbent material applied to a second area of the first tine, where the second sorbent material is adapted to collect one or more sample molecules on the second sorbent material; sampling the container with the first tine; and generating a plurality of ions of the sample by directing ionizing species at the first sorbent material or the second sorbent material.

Embodiment 31. A method for generating ions of a sample from a container comprising: receiving a first tine with a first major axis comprising: a first sorbent material applied to a first area of the first tine, where the first sorbent material is adapted to collect one or more sample molecules on the first sorbent material; a second sorbent material applied to a second area of the first tine, where the second sorbent material is adapted to collect one or more sample molecules on the second sorbent material; sampling the container with the first tine; orienting the first tine in proximity to a mesh; heating the mesh with a power source electrically connected to the mesh; and generating a plurality of ions of the sample by directing ionizing species at the first sorbent material or the second sorbent material.

Embodiment 32. A device for analyzing ions of a sample from a container comprising: a sample collection system comprising: a first tine with a first major axis adapted for insertion into a container; a first sorbent material applied to a first area of the first tine; and a second sorbent material applied to a second area of the first tine, where one or both the first sorbent material and the second sorbent material are adapted to collect sample molecules on insertion of the tine into the container; a mesh in proximity with the tine; a power source electrically connected to the mesh adapted to heat the mesh; an ionization source directing ionizing species at the first sorbent material or the second sorbent material to generate a plurality of ions of the sample; and a spectrometer adapted to analyze the plurality of ions of the sample.

Embodiment 33. A method for ionizing a sample from a surface comprising: receiving a first tine with a first major axis comprising: a first sorbent material applied to a first area of the first tine, where the first sorbent material is adapted to collect one or more sample molecules on the first sorbent material; a second sorbent material applied to a second area of the first tine, where the second sorbent material is adapted to collect one or more sample molecules on the second sorbent material; sampling the surface with the first tine; and generating a plurality of ions of the sample by directing ionizing species at the first sorbent material or the second sorbent material.

Embodiment 34. A device for analyzing ions of a heterogeneous sample from a container comprising: a sample collection system comprising: a first tine with a first major axis adapted for insertion into a container; a first sorbent material applied to a first area of the first tine; and a second sorbent material applied to a second area of the first tine, where the first sorbent material is adapted to collect a first sample molecule present in the heterogeneous sample on insertion of the tine into the container, where the second sorbent material is adapted to collect a second sample molecule present in the heterogeneous sample on insertion of the tine into the container; a mesh in proximity with the tine; a power source electrically connected to the mesh adapted to heat the mesh; an ionization source directing ionizing species at the first sorbent material or the second sorbent material to generate a plurality of ions of the sample; and a spectrometer adapted to analyze the plurality of ions of the sample.

Embodiment 35. A device for collecting a sample comprising: a first tine with a first major axis;

a first sorbent material applied to a first area of the first tine, where the first sorbent material is adapted to collect one or more sample molecules on the first sorbent material; and a second sorbent material applied to a second area of the first tine, where the second sorbent material is adapted to collect one or more sample molecules on the second sorbent material.

Embodiment 36. The device of Embodiment 35, further comprising a second tine with a second major axis, connected to the first tine.

Embodiment 37. The device of Embodiment 36, where the first major axis is parallel to the second major axis.

Embodiment 38. The device of Embodiment 36, where the first major axis is co-linear with the second major axis.

Embodiment 39. The device of Embodiment 36, where first major axis is not parallel with the second major axis.

Embodiment 40. The device of Embodiment 36, where the first tine is symmetric to the second tine about a $C_n$ axis of rotation.

Embodiment 41. The device of Embodiment 36, where the second tine comprises the first sorbent material applied to a first area of the second tine and a second sorbent material applied to a second area of the second tine.

Embodiment 42. The device of Embodiment 36, where the first tine comprises a first grid.

Embodiment 43. The device of Embodiment 42, where the first grid comprises a plurality of holes.

Embodiment 44. The device of Embodiment 36, where the second tine comprises a second grid.

Embodiment 45. The device of Embodiment 44, where the second grid comprises a plurality of holes.

Embodiment 46. The device of Embodiment 36, where the first area of the first tine comprises a grid with a plurality of holes.

Embodiment 47. The device of Embodiment 36, where the second area of the first tine comprises a grid with a plurality of holes.

Embodiment 48. The device of Embodiment 36, where the first area of the second tine comprises a grid with a plurality of holes.

Embodiment 49. The device of Embodiment 36, where the second area of the second tine comprises a grid with a plurality of holes.

Embodiment 50. A system for vaporizing a sample comprising: a first tine with a first major axis; a first sorbent material applied to a first area of the first tine, where the first sorbent material is adapted to collect one or more sample molecules on the first sorbent material; a second sorbent material applied to a second area of the first tine, where the second sorbent material is adapted to collect one or more sample molecules on the second sorbent material; a mesh in proximity with the tine; and a power source electrically connected to the mesh.

Embodiment 51. The system of Embodiment 50, where the power source heats the mesh.

Embodiment 52. The system of Embodiment 51, where the mesh heats the tine.

Embodiment 53. The system of Embodiment 50, where the power source heats the tine.

Thus, the breadth and scope of the present invention should not be limited by any of the above-described exemplary embodiments, but should be defined only in accordance with the following claims and their equivalents.

What is claimed is:

1. A system for analyzing a sample comprising:
    a sample collection device comprising:
        a first tine with a first major axis adapted for insertion into a container;
        a first sorbent material applied to a first area of the first tine; and
        a second sorbent material applied to a second area of the first tine, where the first sorbent material is adapted to collect a first sample molecule present in the sample, where the second sorbent material is adapted to collect a second sample molecule present in the sample;
    a mesh in proximity with the first tine;
    a power source electrically connected to the mesh adapted to deliver at least a first current to the mesh;
    an ionization source directing ionizing species at the first area to generate a plurality of ions of the sample; and
    a spectrometer adapted to analyze the plurality of ions of the sample.

2. The system of claim 1, further comprising a holder to position the first tine relative to the mesh, where the holder is adapted to adjust at least the first area in registration with the mesh.

3. The system of claim 1, where a distance between the first area and the mesh is between:
    a lower limit of approximately $10^{-5}$ m; and
    an upper limit of approximately $10^{-2}$ m.

4. The system of claim 1, where a distance between the first area and the mesh is between:
    a lower limit of approximately $10^{-4}$ m; and
    an upper limit of approximately $10^{-3}$ m.

5. The system of claim 2, where the holder can adjust a distance between the first area and the mesh between:
    a lower limit of approximately $10^{-4}$ m; and
    an upper limit of approximately $10^{-3}$ m.

6. The system of claim 2, where the holder can adjust a distance between the first area and the mesh such that the energy reaching the first area is between:
    a lower limit of approximately $10^{-6}$ W; and
    an upper limit of approximately $10^{-1}$ W.

7. The system of claim 1, further comprising a second tine with a second major axis.

8. The system of claim 7, where the first major axis is parallel to the second major axis.

9. The system of claim 7, where the first tine is co-planar with the second tine.

10. The system of claim 7, where the second tine comprises the first sorbent material applied to a first area of the second tine and the second sorbent material applied to a second area of the second tine.

11. The system of claim 7, where one or both the first tine and the second tine comprise a grid.

12. The system of claim 11, where the grid comprises a plurality of holes.

13. The system of claim 1, where the first area of the first tine comprises a grid with a plurality of holes.

14. The system of claim 1, where the second area of the first tine comprises a grid with a plurality of holes.

15. A method for analyzing a sample comprising:
    receiving a first tine with a first major axis comprising:
        a first sorbent material applied to a first area of the first tine; and
        a second sorbent material applied to a second area of the first tine, where the first sorbent material is adapted to collect a first sample molecule, where the second sorbent material is adapted to collect a second sample molecule;
    positioning the first tine in proximity to a mesh;
    applying a first current to the mesh;
    directing an ionizing species at one or both the first area and the second area;
    generating a plurality of ions from one or both the first area and the second area; and
    analyzing the plurality of ions with a spectrometer.

16. The method of claim 15, where the first current heats the mesh with the first area in registration with the mesh.

17. The method of claim 16, where a second current heats the mesh with the second area in registration with the mesh.

18. The method of claim 15, where the ionizing species are generated with an ionization source selected from the group consisting of Direct Analysis Real Time (DART) source, a Dielectric barrier discharge (DBDI) source and a Desorption Electrospray Ionization (DESI) source.

19. A system for vaporizing a sample comprising:
    a tine with a first major axis;
    a first sorbent material applied to a first area of the tine, where the first sorbent material is adapted to collect one or more first sample molecules;
    a second sorbent material applied to a second area of the tine, where the second sorbent material is adapted to collect one or more second sample molecules, where the one or more first sample molecules are not the same as the one or more second sample molecules;
    a mesh in proximity with the tine; and
    a power source electrically connected to the mesh to heat the mesh, where the mesh transfers heat to the tine to vaporize the sample.

20. The system of claim 19, further comprising an ionization source directing ionizing species at the first area or the second area to generate ions of the sample.

* * * * *